US010962416B2

(12) United States Patent
Kawabata et al.

(10) Patent No.: US 10,962,416 B2
(45) Date of Patent: Mar. 30, 2021

(54) COLOR CONVERSION SYSTEM, COLOR CONVERSION APPARATUS AND COLOR CONVERSION METHOD

(71) Applicant: PROSPER CREATIVE CO., LTD., Tokyo (JP)

(72) Inventors: Hideki Kawabata, Tokyo (JP); Akira Kijima, Tokyo (JP)

(73) Assignee: PROSPER CREATIVE CO., LTD., Tokyo (JP)

( * ) Notice: Subject to any disclaimer, the term of this patent is extended or adjusted under 35 U.S.C. 154(b) by 172 days.

(21) Appl. No.: 16/314,238

(22) PCT Filed: Jun. 30, 2017

(86) PCT No.: PCT/JP2017/024271
§ 371 (c)(1),
(2) Date: Dec. 28, 2018

(87) PCT Pub. No.: WO2018/004005
PCT Pub. Date: Jan. 4, 2018

(65) Prior Publication Data
US 2019/0301941 A1  Oct. 3, 2019

(30) Foreign Application Priority Data
Jun. 30, 2016  (JP) ................................ 2016-130685

(51) Int. Cl.
*G01J 3/52* (2006.01)
*H04N 1/60* (2006.01)
(Continued)

(52) U.S. Cl.
CPC ................. *G01J 3/52* (2013.01); *G01J 3/462* (2013.01); *G01J 3/463* (2013.01); *G01J 3/524* (2013.01);
(Continued)

(58) Field of Classification Search
CPC combination set(s) only.
See application file for complete search history.

(56) References Cited

U.S. PATENT DOCUMENTS 5,268,754 A * 12/1993 Van de Capelle ........ G01J 3/46
358/500
5,280,348 A * 1/1994 Honma ................ H04N 1/3875
358/401
(Continued)

FOREIGN PATENT DOCUMENTS

EP         2899964 A2    7/2015
JP      2000-337965 A   12/2000
(Continued)

OTHER PUBLICATIONS

Sep. 19, 2017 International Search Report issued in International Patent Application No. PCT/JP2017/024271.
(Continued)

*Primary Examiner* — Iman K Kholdebarin
(74) *Attorney, Agent, or Firm* — Oliff PLC

(57) ABSTRACT

A color conversion system includes a first colorimetric input machine having a first color gamut and performing colorimetry of an object to output a first colorimetric value; an input portion to which the first colorimetric value is input; a converting portion converting the first colorimetric value to a second colorimetric value; and an output portion outputting the second colorimetric value. The converting portion stores a first colorimetric value table having color information about each measurement light source used when performing colorimetry by the first colorimetric input machine, and a second colorimetric value table having color information about each measurement light source used when performing colorimetry by a second colorimetric device having a second color gamut, and converts the first colorimetric value to the second colorimetric value by causing colori- (Continued)

metric values of the first colorimetric value table to correspond to colorimetric values of the second colorimetric value table.

25 Claims, 23 Drawing Sheets

(51) Int. Cl.
  *G06T 1/00* (2006.01)
  *G01J 3/46* (2006.01)
  *H04N 1/46* (2006.01)
(52) U.S. Cl.
  CPC ............... *G06T 1/00* (2013.01); *H04N 1/46* (2013.01); *H04N 1/60* (2013.01)

(56) References Cited

U.S. PATENT DOCUMENTS

| | | | | |
|---|---|---|---|---|
| 2005/0174586 A1* | 8/2005 | Yoshida | ............... | H04N 1/6019 358/1.9 |
| 2015/0161488 A1* | 6/2015 | Okumura | ........... | G06K 15/1868 358/1.9 |
| 2015/0170351 A1* | 6/2015 | Kobayashi | ................ | G06T 7/00 382/165 |
| 2015/0220819 A1* | 8/2015 | Yamamoto | ............... | H04N 1/60 358/1.9 |
| 2015/0371124 A1* | 12/2015 | Okumura | ........... | G06K 15/1878 358/1.9 |
| 2018/0222218 A1* | 8/2018 | Okumura | ............. | H04N 1/0402 |

FOREIGN PATENT DOCUMENTS

| | | |
|---|---|---|
| JP | 2001-004448 A | 1/2001 |
| JP | 2006-200960 A | 8/2006 |
| JP | 2007-104319 A | 4/2007 |
| JP | 2008-278054 A | 11/2008 |
| JP | 2009-93218 A | 4/2009 |
| JP | 2011-89840 A | 5/2011 |
| JP | 2015-139179 A | 7/2015 |
| JP | 2015-196334 A | 11/2015 |
| JP | 2016-66195 A | 4/2016 |

OTHER PUBLICATIONS

Jun. 25, 2019 extended European Search Report issued in European Patent Application No. 17820359.2.

* cited by examiner

+(LIGHT): L*a*b* VALUES BY SPECTROPHOTOMETER
+(DEEP): L*a*b*- CONVERTED VALUES BY ICC (a)                  (b)

(a)               (b)

(a)                    (b)

1,617 COLOR CHART + + SPOT COLOR CHART → EXPANSION OF COLORIMETRY COLOR GAMUT

COLOR CONVERSION SYSTEM, COLOR CONVERSION APPARATUS AND COLOR CONVERSION METHOD

TECHNICAL FIELD

The present invention relates to a color conversion system that enables generation of an RGB image not depending on an RGB input device and realization of color reproduction requested under a different illumination condition by an RGB or CMYK image by converting colorimetric values by various kinds of input devices (such as scanners) on one side to L*a*b* values under various illumination conditions, using a specific color chart for each of various kinds of media and various kinds of color materials, converting the L*a*b* values to L*a*b* values obtained by performing colorimetry by a single dedicated colorimetric device on the other side or L*a*b* values obtained by performing colorimetry based on reference values of a plurality of dedicated colorimetric devices, using the specific color chart for each of the various kinds of media and the various kinds of color materials under necessary illumination conditions, storing colorimetric value tables for both, and converting the colorimetric values of the various kinds of input devices to colorimetric values of the dedicated colorimetric device(s) using a color conversion engine that performs necessary input, selection of a targeted colorimetric value table and conversion of colorimetric values; a color conversion apparatus; and a color conversion method.

BACKGROUND ART

In the case of performing color matching between a sample print and a piece of printed matter outputted from the same data, it is necessary to consider the following factors. For example, difference among input devices and sensors of the input devices (scanner or camera, lenses, light receiving element CCD or CMOS), a colorimetric error, between a colorimetry method of a dedicated colorimetric device and manufacturers or models, influence on colorimetric values by color temperatures of illumination, influence on colors by the spectrums and color rendering properties of illumination, difference in color generation according to printing methods, influence on material color (paper white or the like) and color reproduction by kinds of paper sheets, influence on colors by color materials and color lights, influence on white of material, such as paper white, and color reproduction by surface processing, difference in color matching precision according to ICC profile creation charts such as IT-8 (a lot of color patches constituting the color chart and color gamuts of the color patches) and the like. Because of difference in each factor, it has been indispensable to utilize complicated color management technology related to printing, painting and dyeing.

CITATION LIST

Patent Literature

Patent Literature 1: Japanese Patent Laid-Open No. 2001-004448

SUMMARY OF INVENTION

Technical Problem

An ICC profile and a CMM (Color Management Module) which is a color conversion engine, the ICC profile and the CMM being used for color reproduction correction of scanners and cameras (hereinafter referred to as "a scanner or the like") standardly used at present, are capable of converting a photograph image (an RGB image) of an inputted color target to image data of a device-independent L*a*b* color space by using a color target constituted by 264 colors shown in FIG. 1. However, in the case of such a piece of printed matter that the media, such as paper sheets, to be compared are different or with color material different from the color target or a piece of printed matter outputted by an inkjet printer or the like, there is a problem that, when the piece of printed matter is compared with values obtained by performing colorimetry by the dedicated colorimetric device such as a spectrophotometer, the values of the piece of printed matter is significantly different.

In a case where the color material (such as ink) is different between a medium of the IT8.7/2 color chart (a photographic print) and a medium of a piece of printed matter (printing paper), even if an ICC profile dedicated to the scanner is created to perform color management, L*a*b* values of the white base of the medium are significantly differently inputted due to spectral characteristics of the input illumination light of a scanner or the like and spectral characteristics of a light receiving sensor such as a CCD or a CMOS if the kinds of the paper medium and color materials for input are different from the chart. Therefore, a result as in FIG. 2 is obtained, in which an error occurs. This is because spectral distribution by the input illumination light, color sensitivity of the light receiving sensor and the like are different as shown in FIG. 3.

An object of the present invention is to, by reviewing the weak points of the ICC profile described above, provide a color conversion system capable of performing color conversion under required conditions by inputting conditions and values actually measured under an environmental illumination under which each necessary piece of printed matter or the like is seen, based on a color table by L*a*b* values obtained by performing colorimetry of a specific color chart with a dedicated colorimetric device such as a spectrophotometer or a color luminance meter.

Solution to Problem

In order to solve the above problem, the present invention is a color conversion system comprising: a first colorimetric input machine having a first color gamut and performing colorimetry of an object to output a first colorimetric value; an input portion to which the first colorimetric value is inputted; a converting portion converting the first colorimetric value to a second colorimetric value; and an output portion outputting the second colorimetric value; wherein the converting portion stores: a first colorimetric value table having color information about each measurement light source to be used at the time of performing colorimetry by the first colorimetric input machine; and a second colorimetric value table having color information about each measurement light source to be used at the time of performing colorimetry by a second colorimetric device having a second color gamut; and the converting portion converts the first colorimetric value to the second colorimetric value by causing colorimetric values of the first colorimetric value table to correspond to colorimetric values of the second colorimetric value table.

The color conversion system may comprise the second colorimetric device, and the second color gamut may be a device-independent color gamut.

The first colorimetric value table may have a first color chart having color patches of the first color gamut; and the second colorimetric value table may have a second color chart having the second color gamut that includes an equal number of or more colors than colors included in the color patches of the first color gamut.

The first or second color chart may include a gradation chart in which color continuously changes.

The first color chart or the second color chart may include a spot color chart.

The spot color chart may be configured with a mount and a plurality of spot color chips pasted on the mount.

The colors existing in the second color gamut may include the colors existing in the first color gamut.

The first colorimetric value table and the second colorimetric value table may further have color information about each of media, glossinesses of the media, color materials, spectral values of measurement light sources or color temperatures of measurement light sources at the time of performing colorimetry by the first colorimetric input machine and the second colorimetric device.

The colorimetric value table may have a third colorimetric value table having specific color information that is neither in the first colorimetric value table nor in the second colorimetric value table; and the first colorimetric value may be converted to the second colorimetric value by referring to the third colorimetric value table.

The first colorimetric input machine may be an RGB input machine.

The second colorimetric device may be any of a spectrophotometer, a spectral densitometer, an integrating sphere spectrophotometer and a CIEXYZ input machine.

On a comparison side, the first colorimetric value of the comparison side obtained by performing colorimetry of a color chart may be converted to the second colorimetric value of the comparison side; on a reference side, the first colorimetric value of the reference side obtained by performing colorimetry of the color chart using a colorimetric device different from a colorimetric device of the comparison side may be converted to the second colorimetric value of the reference side; the second colorimetric value of the comparison side and the second colorimetric value of the reference side may be compared to take difference; and the colorimetric device of the reference side may be adjusted so that the second colorimetric value of the reference side becomes substantially the same value as the second colorimetric value of the comparison side.

A plurality of the second colorimetric devices may have a plurality of the second colorimetric value tables that are obtained by performing colorimetry under the same colorimetric conditions; and, by performing statistical processing of a plurality of the second colorimetric value that are calculated for each of the plurality of second colorimetric value tables, the plurality of second colorimetric values may be converted to fourth colorimetric values.

A plurality of the second colorimetric devices may have a plurality of the second colorimetric value tables that are obtained by performing colorimetry under the same colorimetric conditions; and, by performing statistical processing of a plurality of the second colorimetric values that are calculated for each of the plurality of second colorimetric value tables, the plurality of second colorimetric values may be converted to fourth colorimetric values that are $L^*a^*b^*$ values.

The fourth colorimetric values may be further converted to fifth colorimetric values that are RGB values.

A predetermined CMYK conversion profile may be caused to be registered with the colorimetric value tables; and the fourth colorimetric values may be converted to sixth colorimetric values indicated by CMYK halftone dot % values according to the CMYK conversion profile.

The input portion and the converting portion may be provided in the first colorimetric input machine; the first colorimetric input machine may comprise an image capturing portion capturing an image and inputting the image to the input portion; and the first colorimetric value may become a value obtained by further performing RGB conversion of what is obtained by color-converting the second colorimetric value to a reference value obtained by statistical processing using various kinds of colorimetric devices in compliance with ISO, based on a predetermined color temperature.

A colorimetric value of an input device having a color space larger than a device-dependent RGB color space may be a colorimetric value by 4K or 8K of ITU-R Recommendation BT.2020 standard.

The color conversion system may comprise a first sever storing a plurality of the first colorimetric value tables transmitted from a plurality of the first colorimetric input machines; and the color conversion system may be configured to be capable of performing transmission/reception of data with the first server via a network.

The color conversion system may comprise a second sever storing a plurality of the second colorimetric value tables transmitted from a plurality of the second colorimetric devices; and the color conversion system may be configured to be capable of performing transmission/reception of data with the second server via a network.

The color conversion system may further comprise a RIP apparatus performing image conversion from vector data to raster data based on the second colorimetric value; and at the time of performing the image conversion, the RIP apparatus may refer to the colorimetric value tables to perform color correction simultaneously when creating the raster data or at the time of generating a PDF image.

The color conversion system may further comprise a RIP apparatus connected to the output portion, the RIP apparatus performing image conversion from vector data to raster data based on the second colorimetric value; and the RIP apparatus may output the converted raster data to the converting portion via the output portion and causes the converting portion to refer to the colorimetric value tables to perform color correction again.

In another embodiment of the present invention, there is provided a color conversion apparatus for converting a first colorimetric value of a first color space by a first colorimetric input machine that is outputted at the time of performing colorimetry by the first colorimetric input machine to a second colorimetric value of a second color space by a second colorimetric device that is outputted from the second colorimetric device, the color conversion apparatus comprising: an input portion to which the first colorimetric value is inputted; an output portion outputting the second colorimetric value; and the converting portion creates: a first colorimetric value table having color information about each measurement light source to be used at the time of performing colorimetry by the first colorimetric input machine, and a second colorimetric value table having color information about each measurement light source to be used at the time of performing colorimetry by the second colorimetric device, and the converting portion stores the first colorimetric value table and the second colorimetric value table, and converts the first colorimetric value to the second colorimetric value by causing color values of the first colorimetric value table to correspond to color values of the second colorimetric value table.

In another embodiment of the present invention, there is provided a color conversion method for converting a first colorimetric value of a first color space by a first colorimetric input machine that is outputted at the time of performing colorimetry by the first colorimetric input machine to a second colorimetric value of a second color space by a second colorimetric device that is outputted from the second colorimetric device, wherein the color conversion method creates a first colorimetric value table having color information about each measurement light source to be used at the time of performing colorimetry by the first colorimetric input machine; the color conversion method creates a second colorimetric value table having color information about each measurement light source to be used at the time of performing colorimetry by the second colorimetric device; and the color conversion method converts the first colorimetric value to the second colorimetric value by storing the first colorimetric value table and the second colorimetric value table and causing color values of the first colorimetric value table to correspond to color values of the second colorimetric value table.

Advantageous Effects of Invention

In the present invention, as for a specific color chart for each of various kinds of media and various kinds of color materials, colorimetric values of an image acquired by various kinds of input devices, which are input-device dependent values, are converted to colorimetric values of L*a*b* values once using the RGB scanner or the like, and color conversion of the L*a*b* values is performed as colorimetric values of the same color system obtained by performing colorimetry of the various kinds of media and the various kinds of color materials by a reference spectrophotometer. Thereby, even in a different colorimetric device, color conversion to the L*a*b* colorimetric values of the dedicated colorimetric device can be easily performed. Further, it is possible to add an illumination environment at the time of performing color evaluation to color conversion conditions.

DESCRIPTION OF EMBODIMENTS

Figure 1:
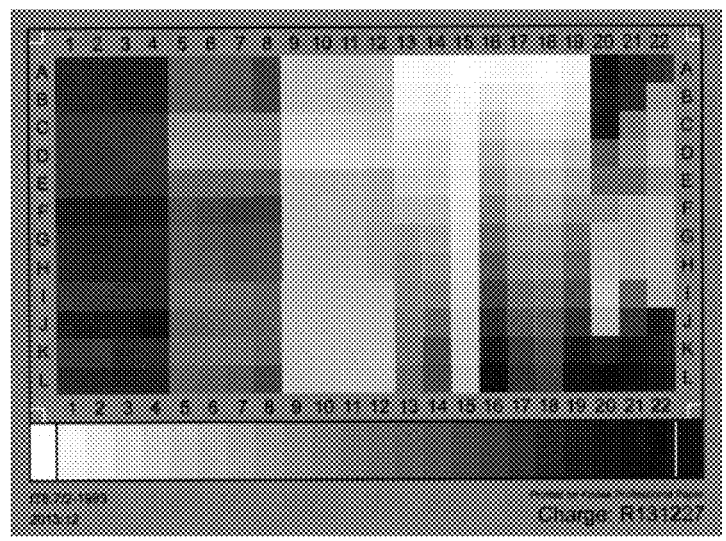
FIG. 1 is a diagram showing an IT8.7/2 color target used in an ICC profile.
Figure 2:
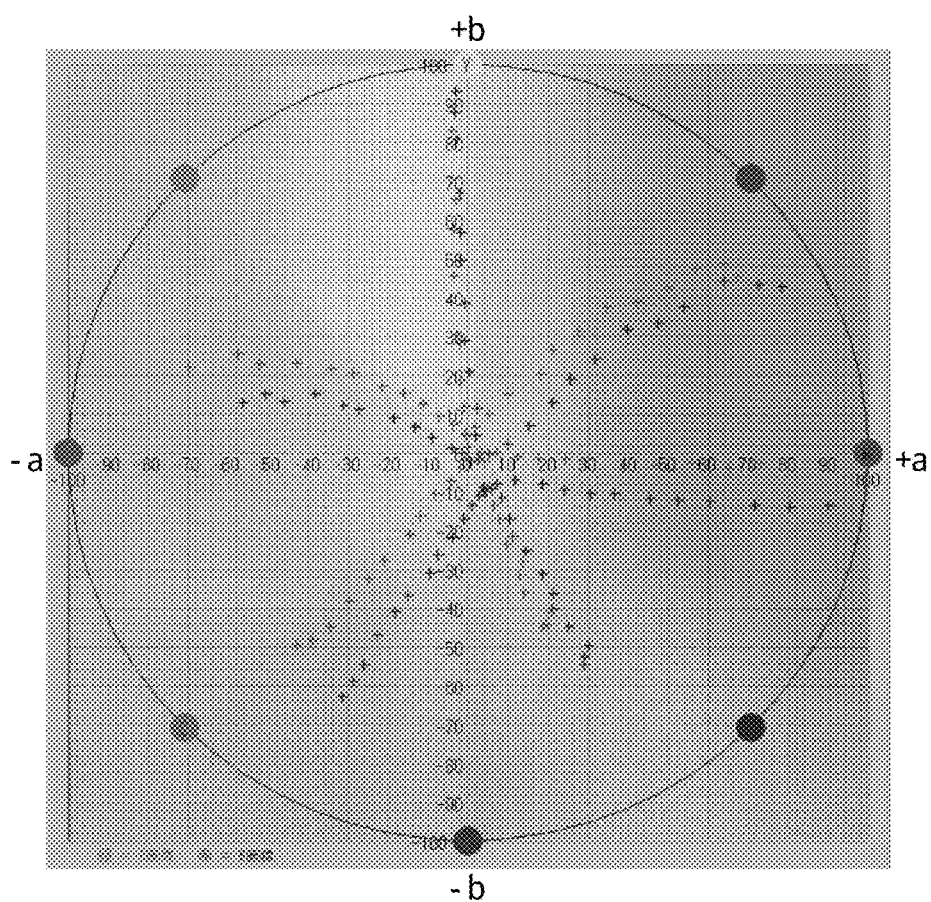
FIG. 2 is a graph showing an error between L*a*b*-converted values by a spectrophotometer and by an ICC.

Embodiments of a color conversion system, a color conversion apparatus and a color conversion method according to the present invention will be described below in detail with reference to accompanying drawings.

Definition

First, definitions of some terms used in the description of the embodiment below will be described.
(Media)
Media indicate support bodies that are impressed or colored with, or made luminous by color material and include paper such as art coated paper, matte coated paper and high quality paper, cloth, metal, film and a display. When the same color material is printed on different kinds of paper sheets, a color represented by blended halftone dot % by a combination of C, M, Y and K inks may be different between color perception by eyes and a colorimetric value even if the printing is performed with the same density. In ICC (International Color Consortium), a print profile in which paper (a medium) and color material are set as one set is created. The same medium has a property that color reproduction changes according to printing methods (for example, offset, gravure, flexographic, inkjet and toner methods), and color materials, a halftone dot shape and the like accompanying the printing method.

(Color Materials)

Color materials refers to components for coloring various objects in a broad sense, that is, natural or artificial "coloring matter" and "coloring materials" created from those coloring materials. In a narrow sense, printing ink, coating materials, paint and the like are referred to "color materials". Color materials are classified as "dye" that permeates among fibers used for dyeing and insoluble "pigment" that is used for coloring color materials in the narrow sense. The printing ink is classified in gravure ink, offset ink and flexographic ink, and the offset ink is further classified in oily ink, UV ink, waterless ink and the like. In addition, there are water-based ink, toner and the like, and there are also light-resistant ink, heat-resistant ink and the like according to use purposes. The inks are different in the spectral reflection characteristics and the color gamut.

(CMYK Process Ink)

CMYK process ink refers is such printing ink that four colors of primary colors of subtractive color mixture, three colors of Y (yellow), M (magenta) and C (cyan), plus K (black) are generally set as one set, and the colors are overprinted to reproduce all colors.

(Color Gamut)

A color gamut is a range of colors generated by applying white color illumination to a picture of a piece of printed matter or the like, or an object that is created by specific color materials and a specific medium, or colors represented by a color space identifying all the colors generated by a color monitor (such as CIEXYZ, L*a*b* or the like).

(Surface Treatment)

Surface treatment refers to various kinds of treatments applied to the surface of a medium, such as glossy finishing, matting/foil pushing, varnishing, PP pasting and ink application.

(Illumination Environment)

An illumination environment refers to a situation in which color reproduction looks different according to difference in lighting in an environment in which a piece of printed matter or the like is seen. In general, the characteristics are indicated by a spectrum, a color temperature and a color rendering property.

(Illumination Spectrum)

An illumination spectrum indicates spectral distribution of light and is an electromagnetic wave with a wavelength visible to human eyes among electromagnetic waves. The lower and upper bounds of the wavelength of electromagnetic waves corresponding to visible rays are about 360 to 400 nm and about 760 to 830 nm, respectively. Electromagnetic waves with a wavelength shorter or longer than the wavelength of visible rays are not visible to human eyes. Electromagnetic waves with a wavelength shorter than the wavelength of visible rays are called ultraviolet rays, and electromagnetic waves with a wavelength longer than the wavelength of visible rays are called infrared rays.

(Color Rendering Property)

A color rendering property refers to difference between "light color" that is "color of a light source" and "how color of an object illuminated by the light source looks". "The color rendering property" changes according to a ratio of components of each wavelength that light emitted from a light source has. The light color influences an impression of space, and the color rendering property influences how colors of an object look. The color rendering property is indicated by a general color rendering index (Ra). The general color rendering index indicates how natural colors an object looks in when the object is illuminated by illumination. For example, Ra100 means that colors similar to colors when natural light is applied are reproduced. If the components of each wavelength are flat, the color rendering property is as high as Ra95 or Ra98, and such illumination is used as standard illumination. An ordinary fluorescent lamp, which lacks light components at some positions on its wavelength, the color rendering property is as low as Ra60 to Ra75, which is a cause of colors not looking good, for example, colors being cloudy. Further, the color rendering property is influenced by a lack of a specific wavelength of a spectrum of, for example, a halogen lamp, a fluorescent lamp or an LED, and is also influenced by presence/absence of ultraviolet light rays and the like.

(Color Temperature)

Some colors of lights of lighting light sources are bluish or yellowish. These are referred to as light colors of the light sources. Color temperature refers to the temperature when carbon is heated and a color emitted thereby, and objectively indicates the light color of the light source. Light colors of light sources can be roughly classified in white light and colored light. It is only to the white light that the concept of color temperature can be applied. As for the colored light, it is not possible to determined color temperature. The color temperature of sun light changes according to the latitude of the earth. Typically, the color temperature is 5,500K during the daytime. The color temperature of a strobe and a monitor is typically 6,000K to 6,500K. In the printing industry, 5,000K is the standard. The color temperature of an incandescent light bulb is about 3,000K.

(Colorimetric Conditions of Spectrophotometer)

Depending on whether a fluorescent whitening agent is applied to paper or not, correlation deviation is generated between measured values of the paper and observed "appearances". This happens because, when a fluorescent whitening agent is included in paper, a UV amount of light used for the light source of a colorimeter and a UV amount of light used for observation illumination are different, and the wavelength of UV light changes to a different wavelength, being influenced by the difference. Therefore, in ISO, M factors (M0 to M3) are added, and a function of controlling a measured value by each filter according to illumination conditions is provided (ISO-13655-2009). Here, M0 indicates no filter; M1 indicates Part-1: D50; M2 indicates a UV cut filter; and M3 indicates a polarizing filter.

(Ambient Light)

Ambient light refers to a spectrum of illumination in an environment in which an object, a piece of printed matter or a print is seen. Generally, the ambient light refers to natural light and light of electric lights and the like outdoors and indoors.

(Memory Color)

Colors that human beings have in their memories as almost common color perception are called memory colors. The memory colors are colors that can be reminded of or recalled in association with real colors. Generally, a memory color is often remembered with its characteristics emphasized more than the actual color. In many cases, memory colors differ according to differences among countries and life cultures, and it is said that memory colors are similar within a country and among regions.

(CMM)

A CMM (Color Management Module) is a color conversion engine based on ICC which is incorporated in an OS such as ColorSync2.0/2.5 and ICM2.0. ICM2.0 is an abbreviation of a system-level color conversion program using CMM which is mounted on Windows OS, and ColorSync2.0/2.5 is an abbreviation of a system-level color conversion program using CMM which is mounted on Mac OS. It is a characteristic that, by using the CMM, it is possible to perform color conversion of an image among different color spaces based on CIEXYZ, CIELAB, CMYK and the like for adjusting colors among various different media and devices.

(Calibration)

Depending on whether an RGB input apparatus is a scanner, a digital camera or a video camera (hereinafter generically referred to simply as a camera), and because of difference in spectral sensitivity characteristics, color gamut and gamma among sensors, influence by difference in spectral characteristics of a colorimetric chart that is a medium targeted by colorimetry. Furthermore, difference in radiation unevenness, sensitivity unevenness and contrast in illumination light occurs. Calibration refers to contrast correction, gamma correction and unevenness correction performed for an RGB input apparatus in advance at the time of creating an input profile or at the time of inputting an image in order to correct influence by the above.

(Reference Color Chart Such as IT-8.7/2 and IT8.7/4)

In the case of creating a colorimetric value conversion (substitution) table, colorimetry of a dedicated large-number-of-specific-colors chart, an 265 color chart of IT-8.7/2 for input device, or a dedicated large-number-of-specific-colors chart constituted by color patches of 1,617 colors, such as IT8.7/4, which is used to create an ICC profile for a printing or output device is performed by a high-precision dedicated colorimetric device (such as a spectrophotometer) first. Then, data in which L*a*b* values obtained by giving an ID to each color patch (each small individual piece of a color sample constituting the color chart) and performing colorimetry are stored is stored as a table of colorimetric values by a dedicated colorimetric device.

(Colorimetric Value Table)

The colorimetric value table stated here refers to colorimetric values (referred to as an input color table) obtained by converting each of patches obtained by inputting the same color chart as reference values (referred to as a target color table) obtained by performing colorimetry of each of patches of a dedicated large-number-of-specific-colors chart by a spectrophotometer, by a scanner or the like, which are necessary of performing color conversion the present system, to L*a*b* value.

(Device-Dependent)

The term refers to a color space specific to a device. Specifically, a color space and color reproduction characteristics of an inputted image differ according to a light receiving sensor of the device. The device-specific color reproduction is referred to device-dependent color. For example, an RGB camera and scanner are examples thereof. A 4K or 8K camera with a wide color gamut defined by BT.2020 is similarly an example. In the present invention, these device-dependent input devices will be called specific RGB input devices and the like.

(Colorimetric Device)

As a colorimetric device, in addition to a spectrophotometer (or a spectral densitometer) of a spectroscopic colorimetric device and a CIEXYZ input machine, those by an RGB input machine, which is an input device, and a BT.2020-based 4K or 8K video input machine with a color gamut wider than the Adobe-RGB color gamut and narrower than a visible light region can be utilized.

(Dedicated Colorimetric Device)

"A dedicated colorimetric device" stated in the present specification generally refers to a device that calculates a colorimetric value from a spectral reflectance like a spectrophotometer and a device that calculates a colorimetric value from a tristimulus value like a CIEXYZ camera and a colorimeter. As a colorimetry method of these colorimetric devices, for example, a method using a spectral filter or a CIEXYZ filter can be given.

(CIP3 and CIP4)

CIP3 is a standard for data linkage among three processes with an initial of P, prepress, press and postpress which was created for the purpose of utilizing image density information, page allocation, bookbinding specifications and the like in a prepress process of printing for initial adjustment of a printing machine and a processing machine. A lot of prepress device, printing machine and processing machine manufacturers in the world participate in CIP3. A standard format for data exchange defined by CIP3 is PPF (Print Production Format). CIP3 contributes to significant reduction in printing time by using image area data for prepress for ink key control of a printing machine. In 2000, "process" was added, and the name was changed to CIP4.

(L*a*b* Color Space)

The L*a*b* color space is a color space that is defined by the CIE (The International Commission on Illumination) and is such that color differences are equally converted to numerical values by human eyes relative to the CIEXYZ color space similarly defined by the CIE (the CIEXYZ color space is a diagram three-dimensionally represented with X, Y and Z axes, which has been improved to be numerically easy to handle so that a negative value does not occur for a color matching function determined by experiments so that a color seen when a unit indicating white light of 5,000K or 6,500K is applied to each color of the visible light region that can be recognized by human eyes can be represented by mixing three RGB lights, the intensities of the RGB lights being changed. The CIEXYZ color space is obtained by replacing brightness with a two-dimensional chromaticity diagram. The CIEXYZ color space is represented by color temperature of K=kelvin indicating color of white light, and becomes bluish when the color temperature is high and becomes reddish when the color temperature is low). The L* value indicates brightness as a coordinate on a vertical axis, and the a* and b* values indicate hue and saturation as a plane perpendicular to the L* axis. The L*a*b* color space refers to a color space representing each color with coordinates.

(IT8.7/2 Chart)

The IT8.7/2 chart is a color chart in a format defined by the IT8.7/2-1993 standard by ANSI (American National Standards Institute) and is a color chart constituted by about 250 various color patches having different luminosities, saturations and hues to obtain color gamut information about an RGB input apparatus. Here, the color patches are individual small color-sample pieces constituting the color chart.

Figure 4:
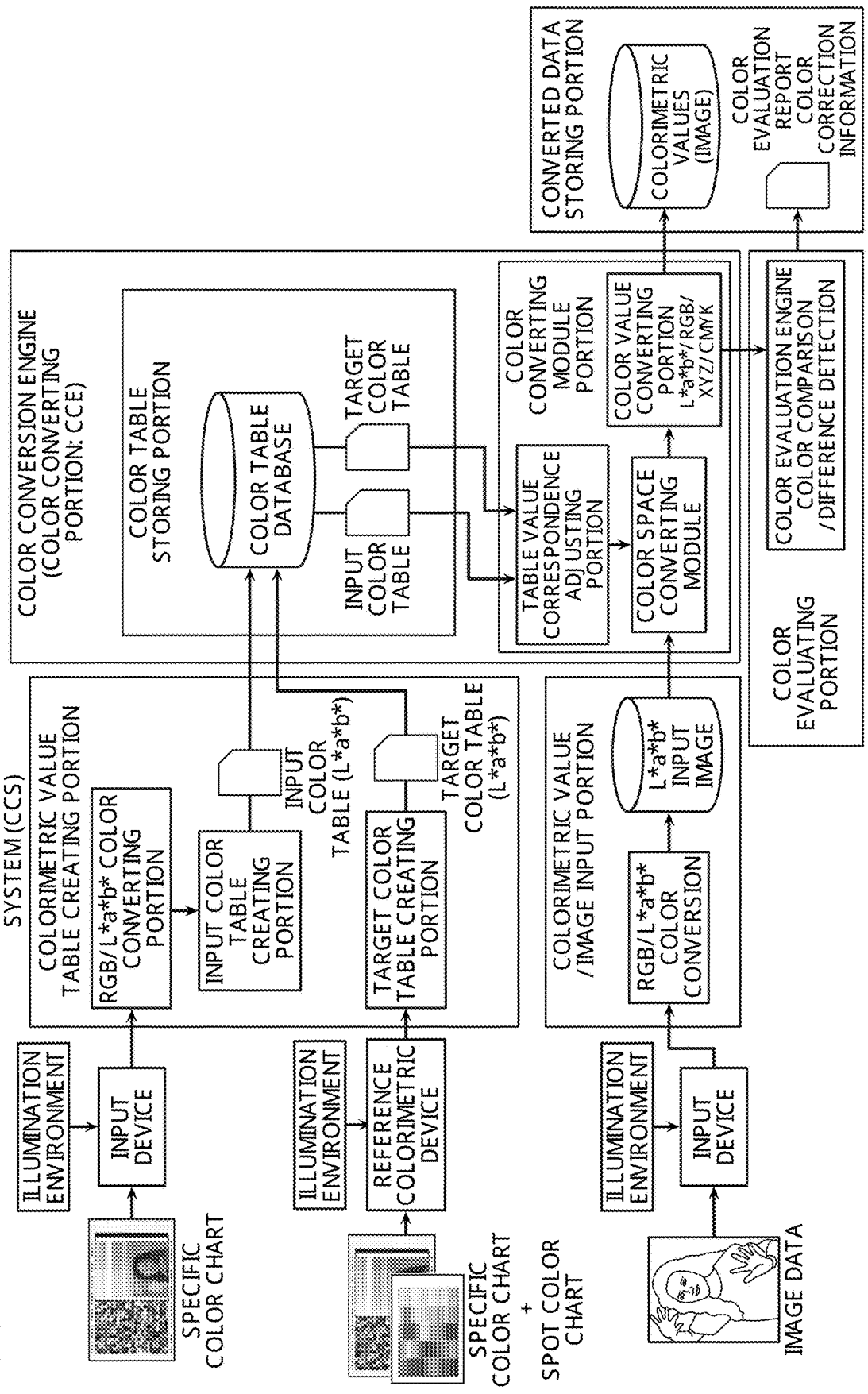
FIG. 4 is a block diagram showing an overview of a color conversion system according to the present invention.

FIG. 4 is a block diagram illustrating an overview of the color conversion system according to the present invention.

As shown in FIG. 4, the color conversion system (hereinafter referred to as the CCS) according to the present invention has a colorimetric value table creating portion to which first colorimetric values outputted from various kinds of input devices are inputted; a colorimetric value storing portion/color converting portion (a color conversion engine; hereinafter abbreviated as a CCE) that converts the first colorimetric values to second colorimetric values; and a color table storing portion that stores a color table of colorimetric values of a second specific color chart. The color table storing portion has an input color table having color information for each of measurement light sources (color temperature and illumination spectrum) used at the time of performing colorimetry by the various kinds of input devices and a target color table having color information for each light source used at the time of performing colorimetry by a reference dedicated colorimetric device. Furthermore, the CCE further has a table value correspondence adjusting portion that stores the input color table and the target color table and causes color values of the input color table and color values of the target color table to mutually correspond to create a database. The color conversion system converts the first colorimetric values to the second colorimetric values by referring to the colorimetric value tables.

It is assumed that color values include all of values of colors obtained from a measuring instrument. As representative color values, there are RGB, CMYK density, CIEXYZ, and, as values indicating difference between two compared colors, density difference, ΔE, CIEDE2000 and the like.

The color patches are square planes in various uniformed colors in a size that can be measured by a colorimetric device. The XYZ camera is such that an image by values similar to L*a*b* colorimetric values by a spectrophotometer can be obtained by performing photographing with a CIEXYZ filter (configured with three filters having spectral characteristics close to those of eyes).

Figure 3:
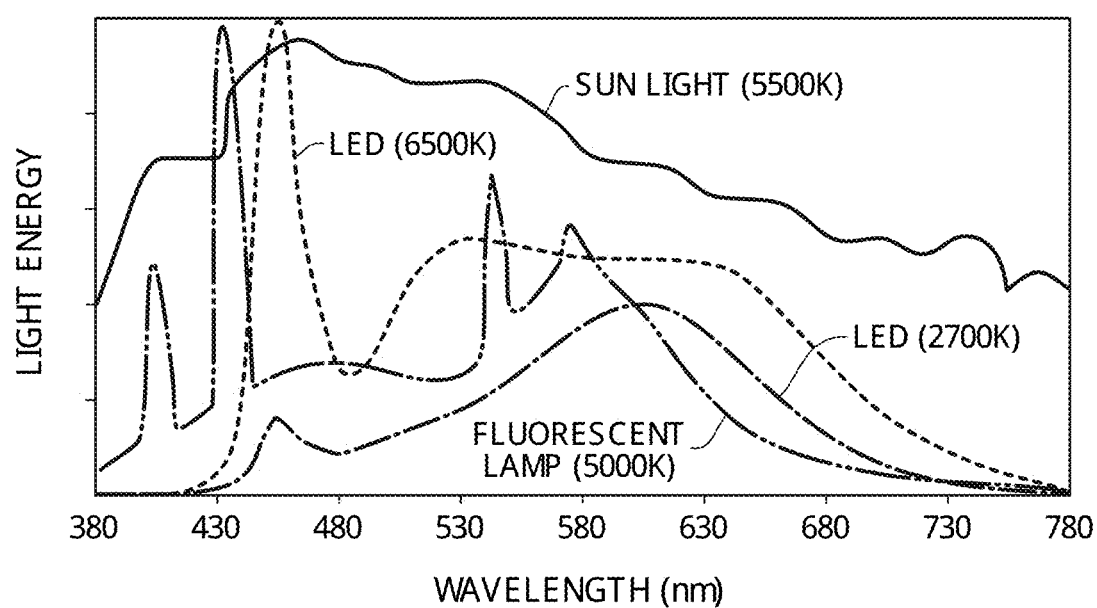
FIG. 3 shows graphs showing differences among spectral distributions by various kinds of illumination.

In the color conversion system (CCS) shown in FIG. 4, a spectroscopic spectrum (see FIG. 3) is measured under various kinds of ambient lights such as a fluorescent lamp, LED lighting and sun light using a reference dedicated colorimetric device, such as a spectrophotometer, and, using the spectral data, colorimetry of a large-number-of-specific-colors chart on which a lot of color patches more than IT8.7/4 are arranged is performed by a dedicated colorimetric device. A file dedicated for the present system in which all these colorimetric values are written is set as a target color table. Further, it is also possible to set a file that is created by performing colorimetry of the specific color chart on which a lot of colors more than IT8.7/4 are arranged, by various kinds of illumination lights using a CIEXYZ camera with color characteristics close to color characteristics visible to eyes, as the target color table. Further, it is possible to, using input devices capable of performing input of a wide color gamut, such as a spectrophotometer, a CIEXYZ camera, an RGB scanner or an RGB camera and a 4K/8K input machine based on BT.2020 as colorimetric devices for various pieces of printed matter, convert device-dependent colorimetric values obtained from the input devices to values equal to colorimetric values of the reference dedicated colorimetric device, such as a spectrophotometer. Therefore, the color conversion system is a color conversion system having a high-precision color conversion engine.

A color evaluating portion inputs an image to be compared with a reference image such as a sample, by the input device of the present system, performs colorimetry of two input images stored in "a colorimetric value/image input portion" with correct colorimetric values, indicates color difference with color difference (ΔE) or difference by CMYK %. Then, based on the difference, a result of performing color estimation is indicated by numerical values or by various color judgment methods, and "a color evaluation report" is outputted. Furthermore, "color correction information" for causing a compared image to be close to a reference image such as a sample is outputted.

In the color conversion engine (the color converting portion: CCE) in FIG. 4, at the time of inputting or performing colorimetry of a small-number-of-specific-colors chart configured with a small number of color charts less than IT8.7/4, an image/images obtained with "a single medium, color material and illumination light" or "a plurality of different media, color materials and illumination lights" inputted using "a single input machine or a plurality of different individual input machines is/are used. Then, by, after performing color conversion of the image obtained by inputting the small-number-of-specific-colors chart to L*a*b* values, performing colorimetry of a large-number-of-specific-colors chart including colors of the small-number-of-specific-colors chart using a reference dedicated colorimetric device, taking into account spectral data of ambient lights corresponding to various kinds of illumination environments, colors adjusted to a spectral reflectance for each spectrum (wavelength of light) that the ambient lights have are calculated. Next, corresponding colors of the large-number-of-specific-colors chart for which colorimetry has been performed under the same colorimetric conditions as the small-number-of-specific-colors chart, including colors that are not included in the small-number-of-specific-colors chart, are converted to L*a*b* values of the input color table and allocated.

Then, after the number of corresponding color patches of the charts is adjusted, a color space converting module of the CCE sets values of one of two different sets of color space values, which are L*a*b* values, as conversion-destination reference colorimetric values and converts the other set to the reference colorimetric values to enable conversion to necessary colorimetric values (for example, different colorimetric values under different illumination conditions) with a high precision.

Furthermore, in the case of using the small-number-of-specific-colors chart, the large-number-of-specific-colors chart is inputted using a dedicated colorimetric device, and reference values of the large number of specific colors are stored into the CCS first, in order to similarly perform color conversion with high-precision colorimetric table values by the CCS. By doing so, it becomes possible to predict the colors of the large-number-of-specific-colors chart that are not included in the small-number-of-specific-colors chart more accurately than the case of inputting only the small-number-of-specific-colors chart. Next, similarly, it is possible to, by the CCE, compare colorimetric values of the color patches of the small-number-of-specific-colors chart and colorimetric values of corresponding color patches of the large-number-of-specific-colors chart, perform conversion to the values of the large-number-of-specific-colors chart obtained by performing colorimetry by the dedicated colorimetric device; and, furthermore, perform accurate conversion to specific colorimetric values with a targeted medium and color materials under a specific illumination environment.

Figure 5:
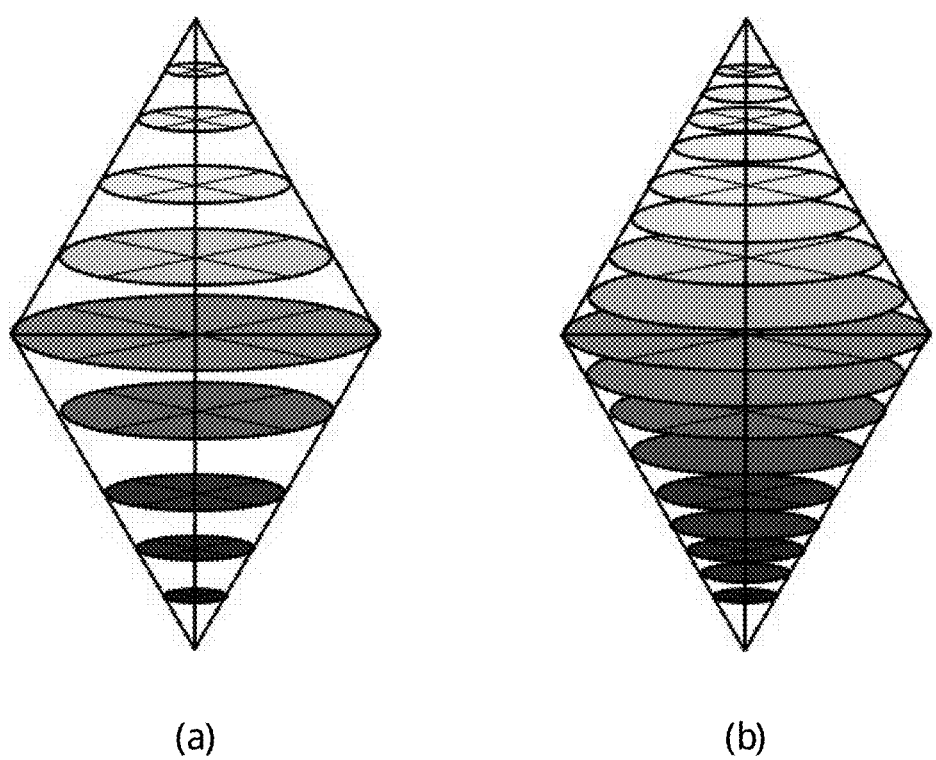
FIG. 5(a) is an image diagram showing a small-number-of-specific-colors chart used in the present invention.
FIG. 5(b) is an image diagram showing a large-number-of-specific-colors chart used in the present invention.

The large-number-of-specific-colors chart is a chart having specific colors required to perform color conversion, and it is desirable that the small-number-of-specific-colors chart has a color gamut that is basically equal to the patches of all colors of the large-number-of-specific-colors chart. FIG. 5 is an image diagram showing color spaces of the small-number-of-specific-colors chart and the large-number-of-specific-colors chart and difference in the number of pieces of colorimetric value data. FIG. 5(a) shows the small-number-of-specific-colors chart in the color space, and FIG. 5(b) shows the large-number-of-specific-colors chart in the same color space.

As understood from FIG. 5, the number of colors of the large-number-of-specific-colors chart included in the color space is larger than the number of colors of the small-number-of-specific-colors chart included in the same color space. Further, though the color spaces are the same, the large-number-of-specific-colors chart includes all the colors of the small-number-of-specific-colors chart. That is, the colors of the small-number-of-specific-colors chart existing in the color space also exist in the large-number-of-specific-colors chart.

By creating a specific color chart for each medium and each color material and storing data obtained by performing colorimetry by various kinds of colorimetric devices and illumination lights of the devices, and colorimetric value tables configured with colorimetric values of corresponding color patches obtained by performing colorimetry under various kinds of different illumination environments in the CCS as a database, it becomes possible to call a colorimetric value table of necessary data anytime to reproduce colorimetric values under a necessary colorimetric environment using the CCE.

As for the colorimetric values obtained here, by not only using a reference colorimetric device based on the ISO-13655-2009 standard as colorimetric conditions but also using colorimetric devices capable of being based on colorimetric conditions by other illumination lights, it becomes possible to create a database of a wide range of colorimetric value tables. It is possible to obtain a target color table of high-precision colorimetric-device-independent colorimetric values adjusted to an illumination environment.

Even in the case of using a general-purpose scanner dependent on an RGB color gamut device as a colorimetric device, it becomes possible to perform L*a*b* colorimetry with precision equal to the precision of colorimetric values of a high-precision dedicated colorimetric device by the CCE. That is, by fabricating a large-number-of-specific-colors chart, for example, with 1,617 colors or more including all the colors of IT8.7/4, which is created for each medium (paper sheet) or color material targeted by colorimetry and creating an input colorimetric value color table as a reference specific color chart, it becomes possible to obtain accurate colorimetric values even from colorimetric values from a piece of printed matter by a different medium or color material. Further, by performing input with a calibration-adjusted RGB scanner, camera or the like (hereinafter referred to as a scanner or the like) and performing color conversion to re-correct values obtained by performing L*a*b* conversion with an ICC profile and a CMM (color management module), more accurate L*a*b* colorimetric values, color difference and the like (ΔE, CIEDE2000 or the like) can be obtained. As for the scanner or the like to use the present system, a CCD scanner or the like with a wide color and density ranges and little noise which additionally makes it possible to obtain reproduction of smooth and sufficiently wide color gradation for each color is desired. In addition to a calibration-adjusted RGB camera, an input device, such as a scanner or a camera with a CCD/CMOS contact sensor of 4K/8K specifications, is also possible. In the printing industry, color evaluation is performed based on color difference (ΔE) indicating difference between colors and CIEDE2000 indicating color difference by sensitivity by human eyes.

The overview and functions of the present system (an apparatus to perform colorimetry, color conversion, color evaluation and color correction) that includes a color conversion engine (CCE) that inputs printed matter or the like with an RGB scanner and so forth and performs color conversion for correcting L*a*b*-converted values are as follows.

(1) Each RGB image input apparatus has device-specific color reproduction characteristics, and color reproduction of an input image also changes according to the kind of medium or color material for input. This is because the spectral sensitivity of a used sensor and the spectral wavelength distribution of illumination differ according to scanners and the like. This is the same for a digital camera and a smartphone camera and is also the same for a 4K/8K video camera and a 4K/8K camera of specifications with a wider color gamut based on the Recommendation ITU (International Telecommunication Union)-R BT.2020.

The spectral sensitivity of a scanner or the like is also different from the spectral sensitivity of eyes and actual illumination, and this causes difference between color recognition by eyes and colorimetric values of an input image by a scanner or the like. In order to correct such color difference, it is necessary to create an input color table for each input apparatus and for each medium and color material to be targeted by colorimetry. Therefore, the CCS has a matrix colorimetry function of inputting all individual color patches (the number of color patches is not especially restricted) of a large-number-of-specific-colors chart at once and performing colorimetry in a short time of about ten seconds.

Figure 6:
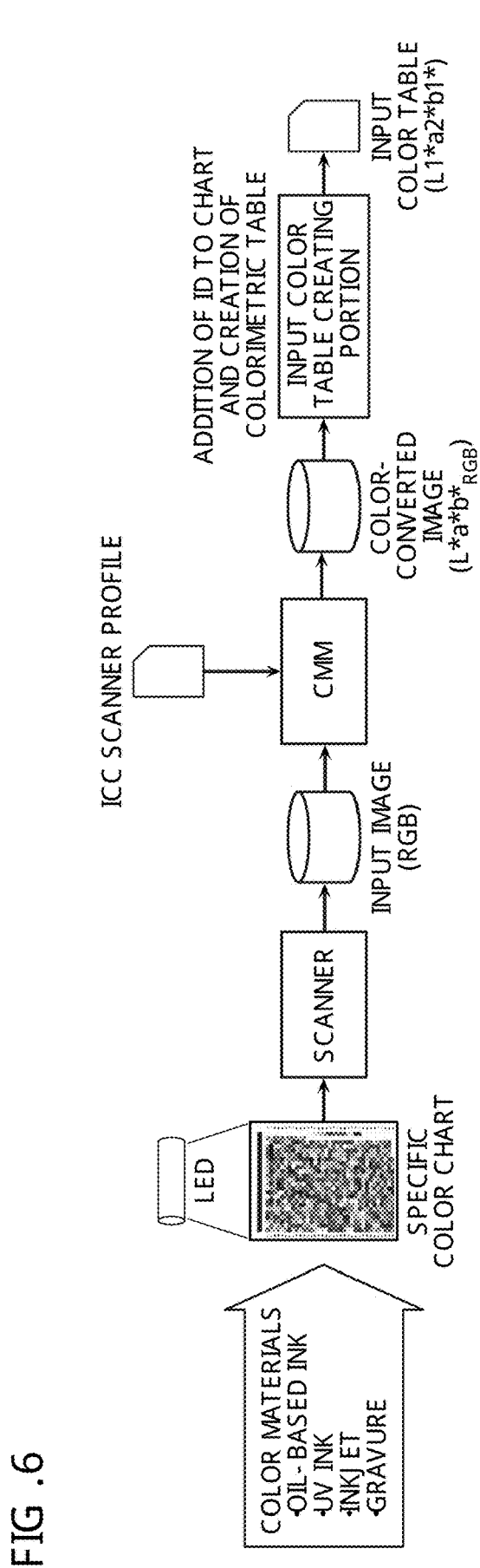
FIG. 6 is a flow diagram for creating an input color table according to one embodiment.

(2) As shown in FIG. 6, color patches of and color information about a color chart such as an image of a specific color chart inputted by a scanner or the like (with IT8.7/4 (1,617 colors) are converted to L*a*b* values using a CMM mounted on the present system CCS and an input profile of the scanner or the like itself. However, the L*a*b* values are still device-specific L*a*b* values (expressed as $L*a*b*_{RGB}$). Therefore, colorimetry of the colorimetric values of the specific color chart obtained here is performed, and an input color table creating portion (see FIG. 4) of the CCS creates an input value color table in which an ID number is given to each color patch.

Figure 7:
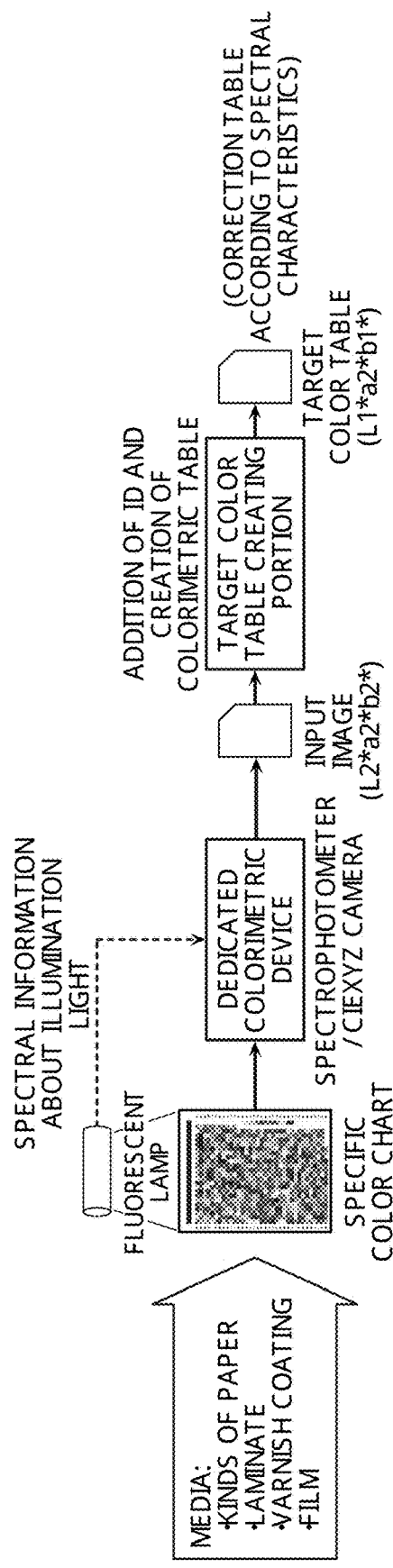
FIG. 7 is a flow diagram for creating a target color table according to the one embodiment.

(3) Next, as shown in FIG. 7, by adding spectral data of illumination light to colorimetric values obtained by a reference dedicated colorimetric device (a spectrophotometer or a CIEXYZ input apparatus) and giving ID numbers to L*a*b* values obtained by performing colorimetry of the same specific color chart described above, a target color table creating portion (see FIG. 4) of the CCS creates a target color table. At this time, by giving spectral data of illumination light used for color evaluation to perform colorimetry, colorimetric values specific to the ambient light can be obtained, and the target color table created here can be used as a table for correcting spectral characteristics of the illumination light.

Figure 8:
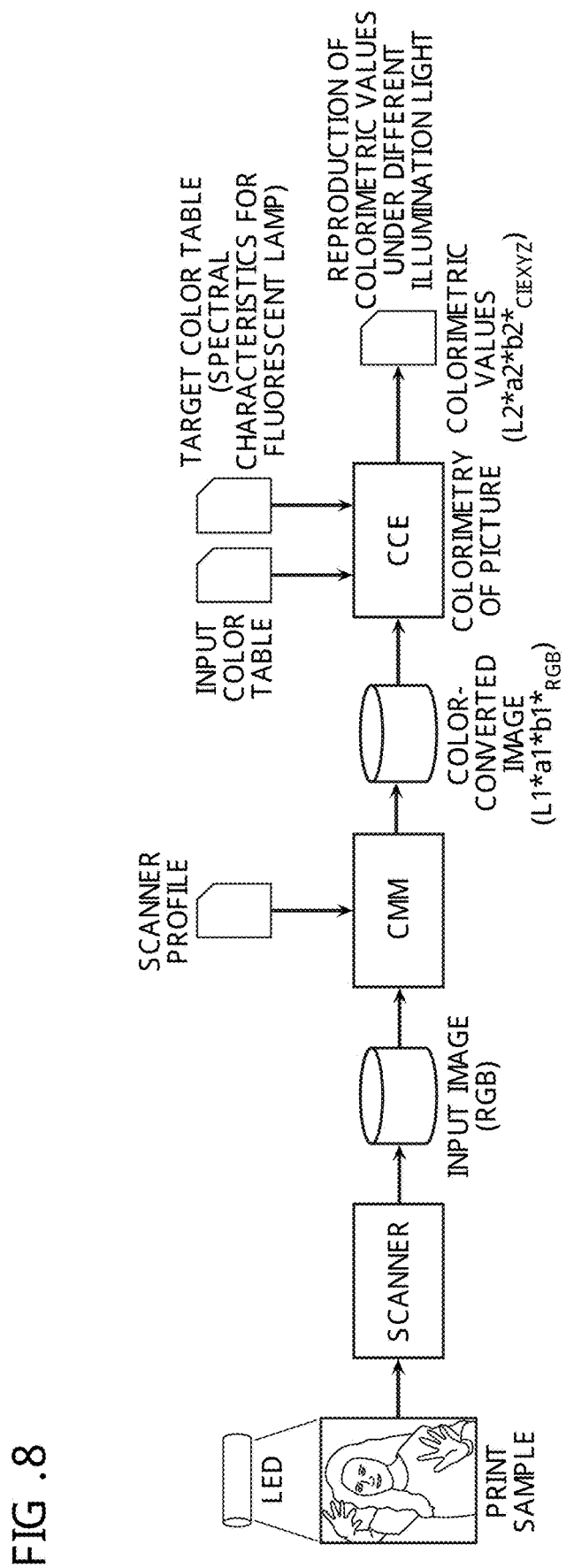
FIG. 8 is a flow diagram illustrating a flow of converting a certain colorimetric value to another colorimetric value under a different illumination environment according to the one embodiment.

(4) As shown in FIG. 8, by setting the two color tables, the input color table and the target color table, for the CCS, the L*a*b*-converted values ($L1*a1*b1*_{RGB}$) of the image of the print sample which has been RGB-inputted by the scanner or the like that performs color conversion according to a medium, color material and ambient light targeted by colorimetry are converted to colorimetric values ($L2*a2*b2*_{CIEXYZ}$) by the dedicated colorimetric device.

Thereby, when colorimetry of an input image by a scanner or the like is performed, colorimetric values of a reference dedicated colorimetric device such as a spectrophotometer can be obtained.

In the case of comparing pieces of printed matter with the same medium and the same color material but with different ambient lights, it is possible to, by individually selecting two target color tables corresponding to the pieces of printed matter, respectively, perform comparison with colorimetric values (L*a*b*) taking into account the influence of the medium, color material and ambient lights. That is, it is possible to reproduce measured values under the two kinds of illumination lights. Thereby, it becomes possible to, about how colors look different when the same piece of printed matter is seen, indicate color evaluation close to visual inspection with numerical values.

Figure 9:
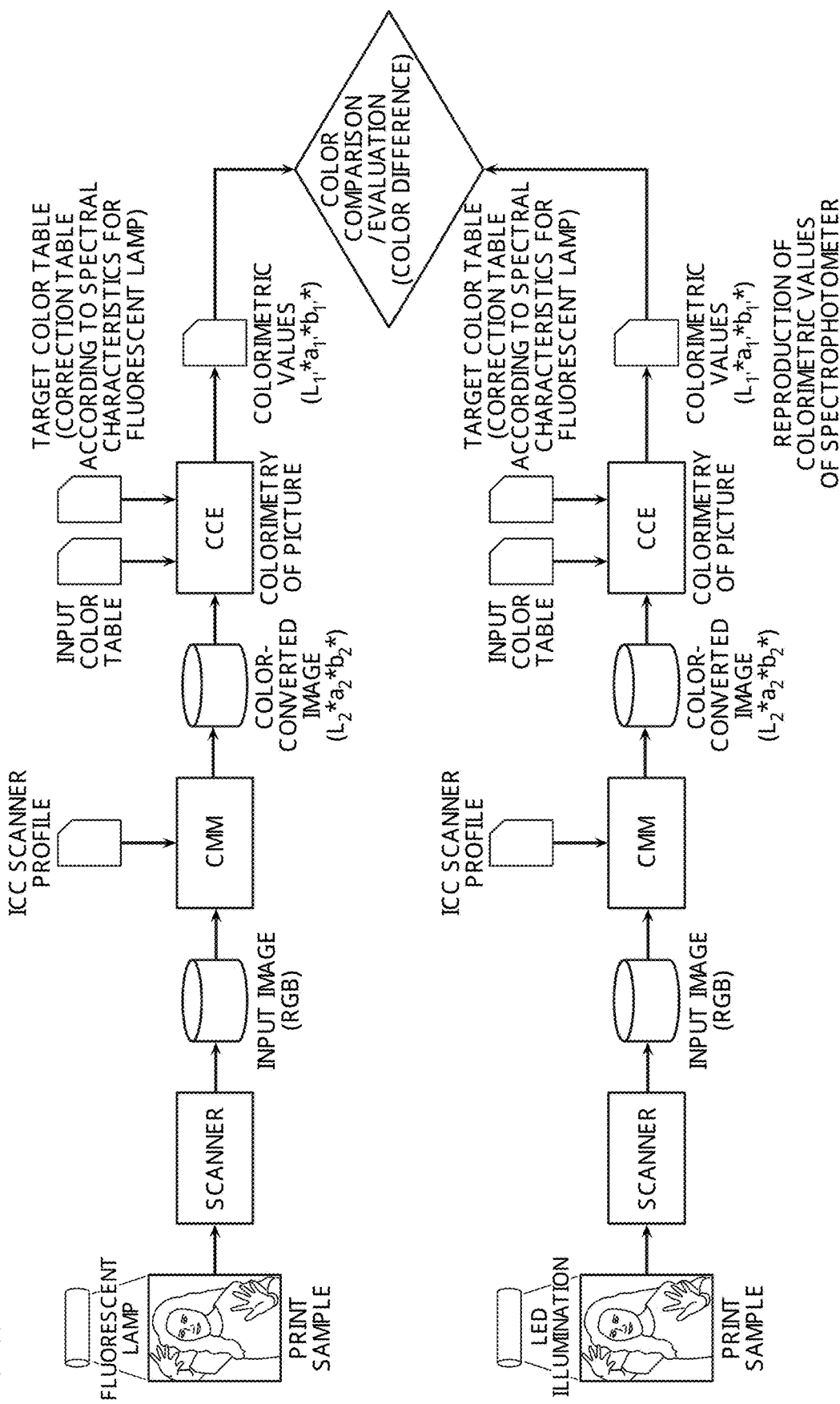
FIG. 9 is a flow diagram for comparing colorimetric values with different illumination, media and color materials, according to the one embodiment.

FIG. 9 is a flow of comparing colorimetric values with "different illumination, media and color materials" to show color comparison among pieces of matter under different illumination environments. When scanners are used as colorimetric devices for input, the same values are shown by both scanners, including values of an L*a*b*-converted input color table and matter targeted by colorimetry, such as a print sample, because illumination of the scanners is the same. However, by using values obtained by performing colorimetry by a spectrophotometer or the like, using different pieces of spectral data by a fluorescent lamp and LED illumination, for a target color table, it is possible to easily convert difference in color reproduction of the matter targeted by colorimetry between the environments to numerical values.

Next, a relationship between ambient light and color management will be described. Conventionally, in the case of performing color evaluation of printed matter, a fluorescent lamp excellent in color reproduction, with an illumination color temperature of 5,000K and an illumination color rendering property of Ra98 or more has been used as a standard light source in the printing industry because how color looks changes accompanying change in an illumination environment. On the side that makes a final judgment about whether color is good or bad, such as an orderer or a design company, a fluorescent lamp may be used as general illumination light to evaluate printed matter, or, recently, color confirmation may be performed under LED illumination. Therefore, since color looks different because of the difference between illumination environments, a trouble that re-printing becomes necessary often occurs.

In the case of a general fluorescent lamp, daylight color is about 6,500K, day white color is about 5,000K, white color is about 4,200K and warm white color is about 3,500K. White points of a part in white color, which is the color of a medium to be a reference, also change. That is, the color of the same printed matter looks significantly different depending on difference in the color temperature of a fluorescent tube. For example, blue colors of the sky, trees and the like look more brilliant by the daylight color, but colors of a person and red fruit look pale and dull. For example, in the case of emitted light color of a fluorescent tube of white color or warm white color, the colors of a person and red fruit look brilliant on the contrary.

In many cases, a consumer who actually gets printed matter sees color in an illumination environment similar to that of the orderer of the printing. For example, in the case of a poster, the poster may be pasted under various illumination environments, such as outdoors or on a wall in a subway station, in the current situation. It is not wrong to perform certain color evaluation with a D50 standard light source by ISO in order to improve such a problem, but this standard light source environment is different from an illumination environment under which a consumer usually sees. Furthermore, when increase in male-order sales and net shopping is taken into account, a mechanism enabling color confirmation under various illumination environments, including color reproduction on a monitor or the display of a smartphone or a tablet terminal, evaluation of difference in color when the color is seen under various kinds of illumination environments by conversion of the difference to numerical values, and color management according to illumination environments are said to be important.

In the case of obtaining more precise colorimetric values, it is better to perform colorimetry of "a large-number-of-specific-colors chart (about 1,617 to 5,000 colors)" having a large number of colors by a dedicated colorimetric device. Simultaneously with colorimetry of the color chart, colors corresponding to color patches are arranged at the same positions, or IDs are registered to the color patches to associate L*a*b* values obtained by performing colorimetry by the dedicated colorimetric device with L*a*b*-converted values of the color patches inputted by a different input apparatus (such as an RGB input machine).

Figure 10:
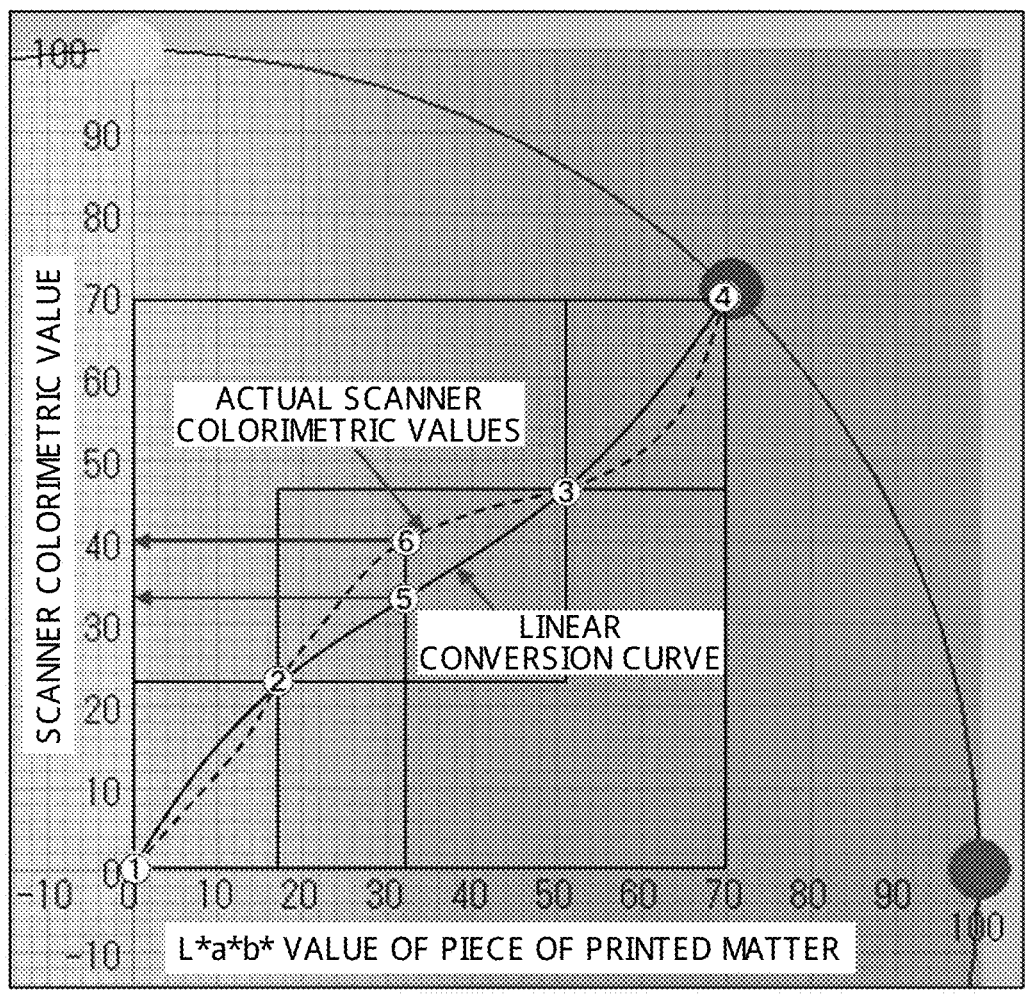
FIG. 10 is a model diagram showing that a color that is not in a colorimetric chart is determined using an interpolation curve from values of two color spaces.

Next, an error in the case of using an ICC profile, which is just to be solved in the present embodiment, will be described. FIG. 10 is a model diagram showing that a color that is not in a colorimetry chart is determined from values of two color spaces. Color gradation obtained by performing colorimetry of color patches of similar colors indicates 1 to 4 in FIG. 10. A curve obtained by linear transformation is indicated by a solid line. When colorimetry of a color that is not included in the color patches is performed, a point of reference number 5 is predicted by a color reproduction curve presumed by linear interpolation. However, if the color of a color patch shows a value at the position indicated by reference numeral 6 when an RGB value obtained by a scanner or the like is color-converted to an L*a*b* value with an ICC profile, then a large error occurs.

Meanwhile, in color conversion by the CCS, it is possible to easily obtain accurately converted values by directly coordinate-converting actually measured values by a scanner or the like to L*a*b* values, which are a target color table created from colorimetric values of a dedicated colorimetric device such as a spectrophotometer. Irrespective of whether the CMM or the CCS, it is possible to reduce the color conversion error by further increasing the number of colors of color patches of neutral colors. However, it is clear that, if there are actually measured values by a large-number-of-specific-colors chart with 1,617 or more colors as described before, the CCS that adopts a color coordinate conversion method by an xyz small color solid is more precise.

If conversion between two color spaces for color correction is performed using only a small-number-of-specific-colors chart, the number of specific colors to be reference points should be increased to 1,600 or more because the number of reference points for color conversion decreases according to the smaller number of color patches. In this case, it is possible to predict intermediate points of specific colors by linear conversion. Intermediate points similarly determined for a large-number-of-specific-colors chart with about 1,600 colors by linear conversion in advance may be set as a specific color chart. However, since there may be a case where an expected colorimetry result is not obtained as described above, it is also possible to perform color conversion by the CCS using average values obtained by combination of both. In this case, by finding color patches close to colorimetric values (L*a*b*-converted values) by a scanner or the like based on an input color table in which the number of color patches (points) of a specific color chart has been increased in advance, and then similarly converting the color patches to color patch IDs of a target color table to perform conversion of the colorimetric values using an xyz small color solid, it is possible to narrow down a color difference range for detecting a color patch with a close color difference. Therefore, there is a merit that it is possible to increase the speed of detecting an approximate color.

Next, "the large-number-of-specific-colors chart" used in the present invention will be described. A specific color chart is one of the most important factors to perform color conversion in the present embodiment with a high precision. The large-number-of-specific-colors chart is an important factor essential for color conversion having color information by patches or gradation of about 1,617 to 5,000 colors. The number of colors of the large-number-of-specific-colors chart is not limited to the above.

Specifically, for example, in addition to the color patches of 1,617 colors of the IT8.7/4 chart, new color patches are further added. A gradation chart of continuous gradation may be added. By shortening a colorimetry distance interval at the time of performing colorimetry of a gradation part of the gradation chart, the number of colors corresponding to color patches can be freely increased as a result. Additionally, an image of a person, a flesh color indicating the color of the skin of the person, and memory colors remembered in the brain as images common to people, for example, memory colors of an image showing colors and the like held as various memories, such as green of grass and trees and blue of the sky of a natural landscape, food and luxury goods or color chips corresponding to the image, or a photograph may be incorporated. The memory colors are used to create an input color table and an output color table required to perform color conversion by the CCE of the CCS. Details and usage methods of the various kinds of charts will be described below.

In the case of using the CCE also, the number of colors of a specific color chart is an important factor because a larger number of colors make it possible to improve color correction precision and expand a color gamut for which colorimetry can be performed. This is because, since, in the case of performing colorimetry a color that is not in the chart, color difference between corresponding color charts in a color space is smaller as the number of colorimetry points is larger, and a distance between an L*a*b* value of a colorimetry point and a reference point having an ID is closer in the color space, it is possible to enhance precision at the time of predicting color values.

In order increase the number of color charts to be created, based on the blending percentage of CMYK ink, the size of each color patch, ordinarily, a square of 6 mm or larger is reduced to be as small as half. However, the color patch size for which colorimetry can be performed is limited according to colorimetric devices. Therefore, in order to increase the number of colors targeted by colorimetry per unit area of chart, a gradation chart for each color ink of R, G, B, C, M, Y, K and spot colors. Then, though, in the case of ordinary color patches, only about 800 colors and about 1,600 colors are arranged practically for the A4 size and the A3 size, respectively, colorimetry of gradation with a finer colorimetry pitch becomes possible by using additional patches and the gradation charts. In the case of a specific color chart, about 5,000 colors are practically obtained in combination with patches even for the A3 size. Accordingly, distances between colorimetry points and colors of the specific color chart in a color space become close, and thus an effect that correction value errors are reduced is obtained.

In a conventional color patch colorimetry method, a practically large colorimetry chart has 1,617 colors of IT8.7/4. Therefore, as for intermediate colors not included in the colorimetry chart, intermediate values are created by interpolation calculation. Though it is necessary to cause an interval between reference colorimetry points to be half or less in order to obtain high interpolation precision, reference colorimetry points of 10,000 or more colors are required therefor.

Figure 11:
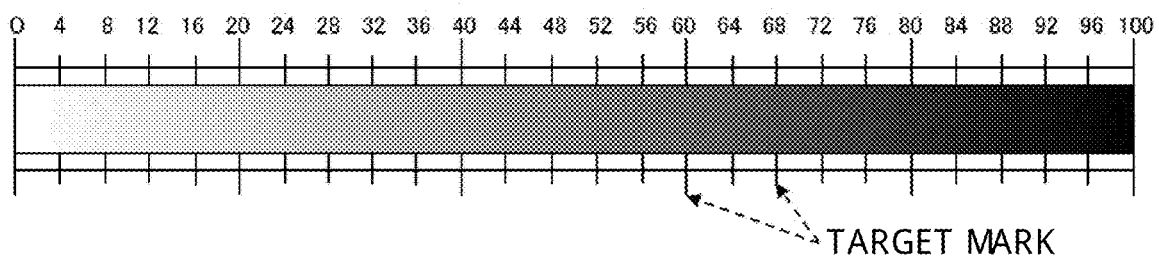
FIG. 11 is a diagram showing an example of a gradation chart.

In order to precisely measure colorimetric values at positions of a gradation chart for which colorimetry is to be performed, it is more efficient to user an automatic colorimetry robot to input coordinates of the colorimetry positions and perform continuous colorimetry. However, it is possible to always obtain constant values irrespective of whether automatically or manually, by placing ruled lines (+ marks) as target marks outside the chart as in FIG. 11. In order to create a target color table by the CCS, accurate colorimetry by a dedicated colorimetric device is required. Therefore, one or more screen-tint patches (an example) to be specific colors are placed on gradation and used as check points for confirming whether there is not an error in colorimetry of the gradation chart before and after the screen-tint patches.

Figure 12:
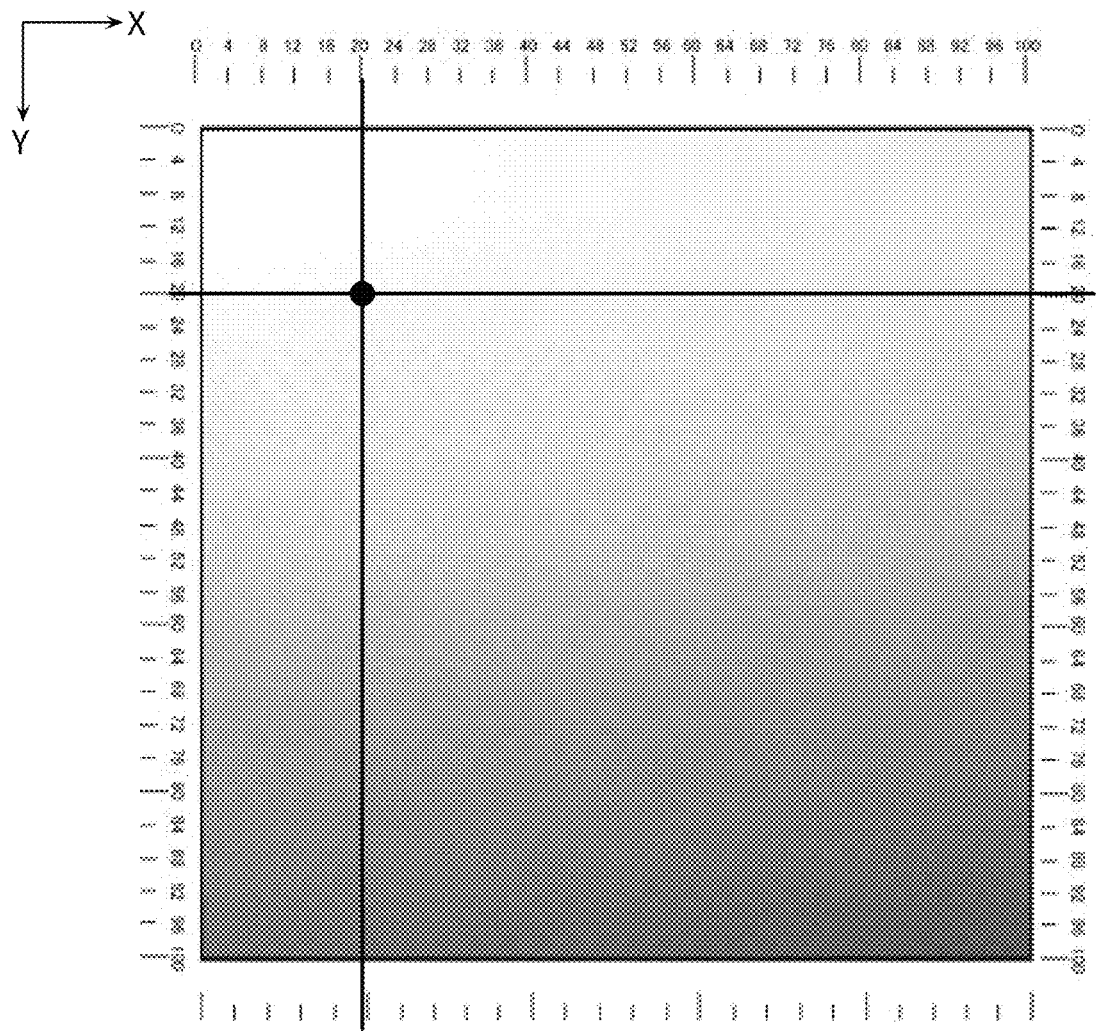
FIG. 12 is a diagram showing an example of a gradation surface chart.

In the case of performing colorimetry of a chart with a wide surface on which gradations in different colors are vertically and horizontally overprinted as shown in FIG. 12, it is necessary to specify both of x and y coordinates. Therefore, it is not possible to manually perform colorimetry. An example using an automatic colorimetry robot will be described. First, a gradation chart targeted by colorimetry is placed on and fixed to a colorimetric value table of the automatic colorimetry robot. By selecting the origin on the upper left of the chart and a corner on the opposite side of the origin, a position, a size and an inclination correction angle of the chart are inputted on the measurement table. In the figure, by inputting "x=0; y=0" of the origin and coordinates "x=0; y=100" and "x=100; y=0", an image of the chart inputted by a scanner or the like is displayed on the monitor of an automatic colorimetric device. Then, by inputting target mark positions of the coordinates of the same positions on the displayed image, the coordinate positions of both are caused to mutually correspond. Thereby, it is possible to specify coordinates of measurement positions manually or with numerical values.

Figure 13:
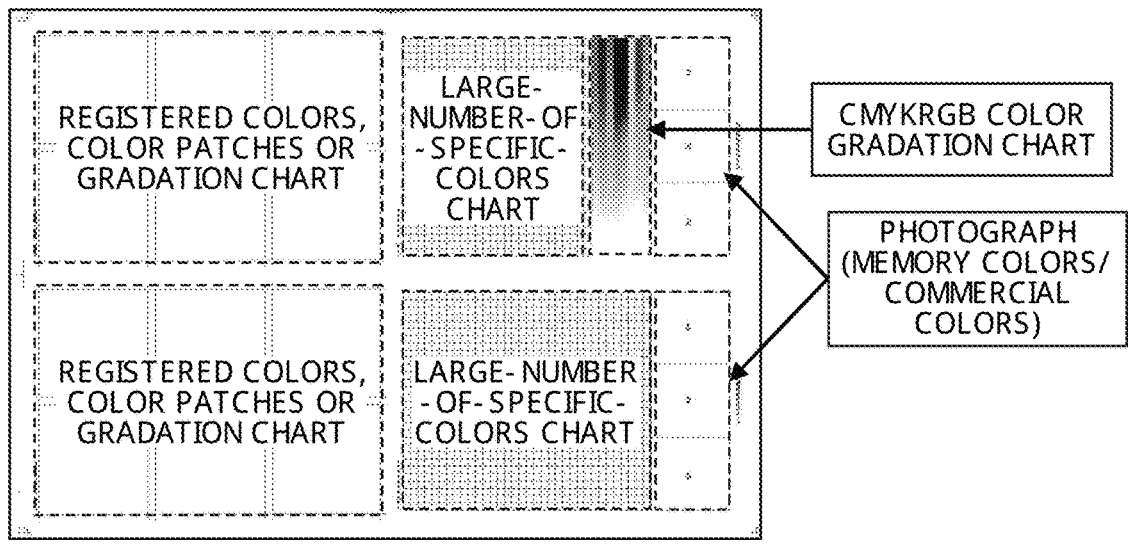
FIG. 13 is a diagram showing an example of a configuration of 5000-color chart.

On both of the specific color charts, the first large-number-of-specific-colors chart and the second small-number-of-specific-colors chart, memory colors of nature and the like, a product, a logo and the like related to color adjustment work are arranged so that they are adjusted to be the same colors, and, furthermore, L*a*b* colorimetric values by a reference dedicated colorimetric device are registered with a colorimetric value table of the CCS as a registered table/colors. It is important to further arrange pictures of printed matter such as a photograph, a drawing, and a logo (hereinafter referred to simply as pictures) because it is useful for color evaluation by eyes. FIG. 13 is an example of a configuration diagram of a 5,000-color chart.

By creating "a second large-number-of-specific-colors chart" configured with gradation and pictures in addition to color patches, creating "a first small-number-of-specific-colors chart" configured with "second colorimetric values" obtained by colorimetry with "a second dedicated colorimetric device" and a part of colors of "the second large-number-of-specific-colors chart", associating colorimetric value tables of corresponding colors of "the second large-number-of-specific-colors chart" and "the first small-number-of-specific-colors chart", and replacing and converting corresponding "second colorimetric values" with and to "first colorimetric value" obtained by performing colorimetry by "a first (alternative) colorimetric device" (including a general-purpose (RGB) input machine), the high-precision "second colorimetric values" are obtained from "the first small-number-of-specific-colors chart" and "the first (alternative) colorimetric device". By adjusting the number of color patches of the first colorimetric values to the number of color patches of the second colorimetric values, it becomes possible to cause IDs of all the color patches constituting the color charts to mutually correspond, and color conversion between two color spaces becomes possible. Of course, the large-number-of-specific-colors chart and the small-number-of-specific-colors chart may be configured with only color patches.

Figure 14:
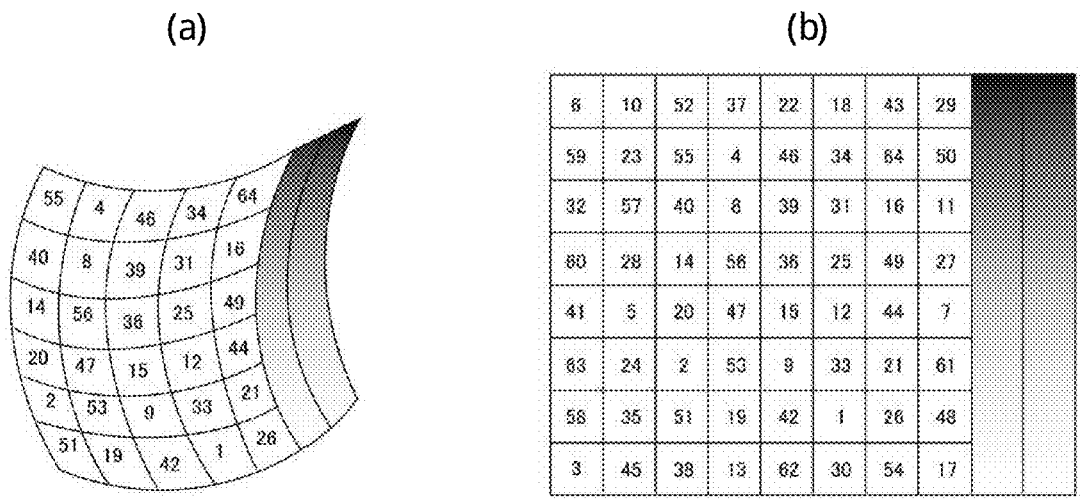
FIG. 14(a) is an image diagram showing distortion of a color space by an input device.
FIG. 14(b) is an image diagram showing a CIEXYZ color space indicating absolute values.

By using the two kinds of specific color charts described above, colorimetric value conversion of the present invention becomes possible. FIG. 14(*a*) is an image diagram showing distortion of a color space by an input device, and FIG. 14(*b*) is an image diagram showing an XYZ (an abbreviation of CIEXYZ) color space indicating absolute values. The attached numbers indicate addresses of color patches. That is, patches given the same number in FIGS. 14(*a*) and 14(*b*) correspond to each other one to one.

The first small-number-of-specific-colors chart is configured with minimum necessary colors from the second large-number-of-specific-colors chart. Further, spot colors, typical pictures or a client's own pictures of a person, a landscape, still life and the like and a logo may be added to the first and second specific color charts.

The second large-number-of-specific-colors chart is basically configured with an IT8.7/4 (1,617 colors) color chart and additional color patches that are not included in IT8.7/4. By adding typical pictures (such as photographs) of a person, a landscape and still life, adding a gradation chart in order to increase the number of colors targeted by colorimetry of the chart, adding a chart for adjusting spot colors inside and outside the color gamut of the CMYK ink, and adding the color of a logo remembered in a person who sees, and memory colors of a product, nature and the like, it is possible to expand a color gamut for which colorimetry can be precisely performed. As for the pictures (illustrations, photographs and the like of printed matter or the like), specific parts of the pictures is measured. As for such an image that evaluation is performed by coloring the density of the obtained image, such as a medical image, measurement is performed for the colored image.

Figure 15:
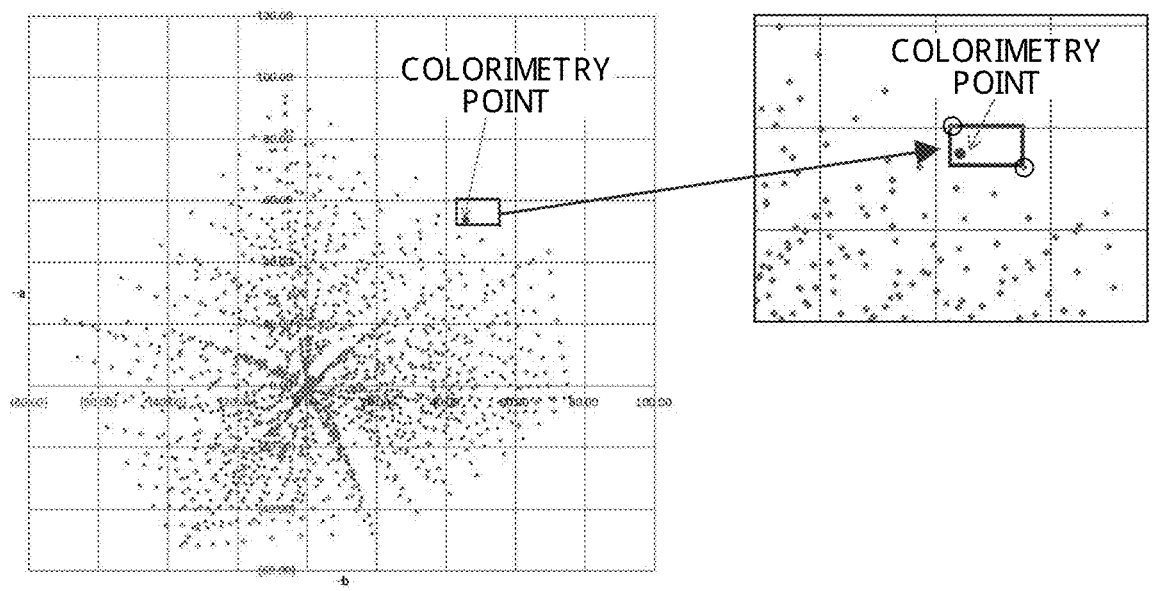
FIG. 15 is a diagram for illustrating how to determine a colorimetric value according to the one embodiment.

Next, description will be made on how to determine a colorimetric value of a color that is not included in a specific color chart. FIG. 15 is an a*b* graph at a certain luminosity L* and shows colorimetry points of 1,617 colors. As shown in FIG. 15, when, in the case of a PC, a colors of an image (a color of a color patch, a picture or the like) on a monitor screen inputted by an RGB input machine is clicked by a connected input device such as a mouse, a touch panel, a keyboard or the like, and colorimetry is performed, two colors that are closest to the L*a*b* value of the position for which colorimetry has been performed, from an input color table, which is colorimetric values of the specific color chart. However, there are a lot of other colorimetric values of color patches of the specific color charts around the L*a*b* value of the colorimetry point. If all the points are confirmed each time, it takes extra measurement time inefficiently. Therefore, color difference of about ΔE3 is detected first so that a point with the closest color difference can be immediately found. If the color difference is not detected, ΔE is gradually increased, for example, up to 5, and the detection is repeated until two points are detected. A formula for color difference can be expressed by the following formula.

$$\Delta E^*ab=[(\Delta L^*)^2+(\Delta a^*)^2+(\Delta b^*)^2]^{1/2}$$ [Formula 1]

Figure 16:
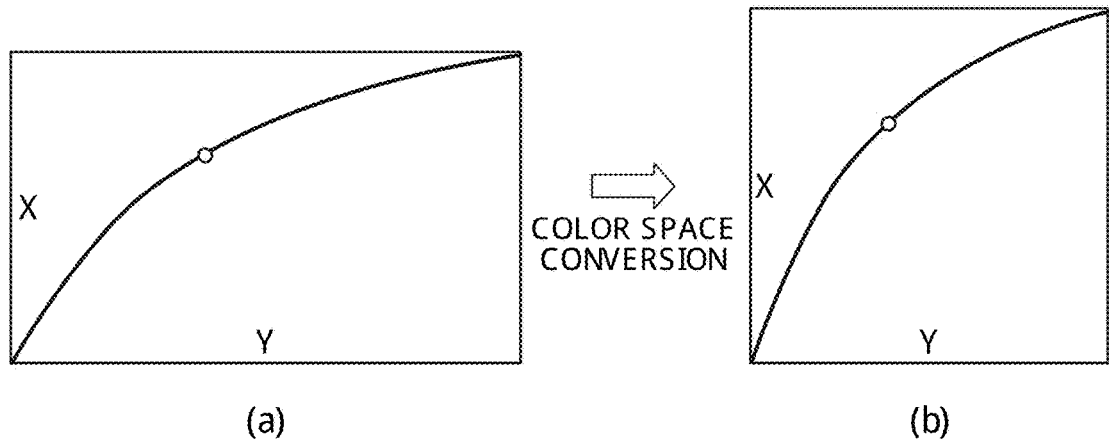
FIG. 16 shows graphs for explaining a method for converting a colorimetric value between different color spaces according to the one embodiment.

If colors of specific patches of two points with the least color difference are detected from the input color table, two corresponding colors (L*a*b* values) are found from a corresponding target color table. A small color solid depicted with two sets of color coordinates is created for each of a color space of the input color table and a color space of the target color table. FIG. 15 is a graph showing only a* values and b* values. However, actually, an L*a*b* color solid is configured by reading difference in the L* value (density). Furthermore, where in the color solid by a scanner or the like the colorimetric values exist is converted to xyz coordinates of the color solid as in FIG. 16, and the xyz coordinates are replaced with xyz coordinates by a target color table. By further converting the obtained coordinates to L*a*b* values, it is possible to easily obtain accurate colorimetric values which have been obtained by performing colorimetry by a spectrophotometer. More precise colorimetric values may be determined from colors of specific patches at three points with the least color difference, from the input color table.

The reason why "the CCS" can perform conversion to more accurate colorimetric values is that (it uses a large-number-of-specific-colors chart such as a 5,000-color chart, and) instead of predicting non-existent coordinates of a color that is not included in a reference color chart by linear interpolation like a conventional calculation method, but performs conversion to xyz coordinates in a color space (and possibly outside the color space) within a narrow range near an actually existing colorimetric value that has been obtained from an input image by a scanner or the like, and performs coordinate conversion in a color space within the same narrow range of a reference colorimetric device at the same ratio. Since direct coordinate conversion of a slight color change can be performed, it is possible to finely respond even when a nonlinear gradation change has occurred. That is, it is a characteristic that, since it is possible to perform color conversion while maintaining a correlation relationship with values of two color spaces, more accurate color conversion can be performed.

Further, since the first colorimetric values by a general RGB or BT.2020-based 4K or 8K camera or scanner can be converted to the second colorimetric values obtained by colorimetry of a large-number-of-specific-colors chart by a dedicated colorimetric device such as a spectrophotometer and used, inexpensive, simple and high-precision colorimetric values can be obtained.

When colorimetry of (a client's) first small-number-of-specific-colors chart is performed by an RGB or BT.2020-based 4K or 8K input device, conversion to L*a*b* values is performed (by a printing company) using an input profile and the like of the input device. (In the printing company) colorimetry (L*a*b*) of a second large-number-of-specific-colors chart is performed by a dedicated colorimetric device such as a spectrophotometer or a CIEXYZ input device, and, for colorimetric values of (the client's) first small-number-of-specific-colors chart, colorimetric values of missing color patches are created by conversion from values of the large-number-of-specific-colors chart. In a case where colorimetry of (the printing company's) first small-number-of-specific-colors chart is performed by another (different) RGB or BT.2020-based 4K or 8K input device also, colorimetric values of missing color patches are created by conversion from the values of the large-number-of-specific-colors chart for (the printing company's) first small-number-of-specific-colors chart similarly.

In a case where a picture is included in the first small-number-of-specific-colors chart, by performing image matching processing for adjusting the same picture part of the first small-number-of-specific-colors chart and the second large-number-of-specific-colors chart at a pixel level, performing colorimetry of the same points of the picture part to convert obtained values to L*a*b* values, and converting colorimetric values of the first small-number-of-specific-colors chart to color coordinates corresponding to colorimetric values of the second large-number-of-specific-colors chart, values at the time when the colorimetric values of the picture are converted to the color space of the large-number-of-specific-colors chart can be obtained.

As for a color that is included in the large-number-of-specific-colors chart but is not included in the small-number-of-specific-colors chart, a colorimetric value of the large-number-of-specific-colors chart can be added to the small-number-of-specific-colors chart that lacks the value by applying a common conversion factor to L*a*b* values obtained by performing beforehand colorimetry of colors corresponding to the large-number-of-specific-colors chart. The conversion factor stated here is obtained by, based on values obtained by performing colorimetry of the large-number-of-specific-colors chart once, detecting two or three color patches near the color that is missing in the small-number-of-specific-colors chart obtained by performing colorimetry by the colorimetric device of the large-number-of-specific-colors chart from among the colorimetric values of the large-number-of-specific-colors chart, and setting a positional relationships among coordinates in an xyz small color space obtained therefrom as a variable.

Furthermore, in colorimetry of the picture also, colorimetric values of the picture in a targeted color space may be determined by calculating colorimetric values of the picture among coordinates in a small xyz color space created from two sets of color coordinates similarly, and, in the large-number-of-specific-colors chart also, converting sets of coordinates with the same ratio in a small xyz color space created from two colors with the same ID to colorimetric values.

A large-number-of-specific-colors chart fabricated at the same time may be used in combination with an input color table created by the own company by receiving provision of a target color table of colorimetric values from a third party (a remote place or overseas such as a third country). Though the large-number-of-specific-colors chart may be different, it is not possible to mix conditions of a large-number-of-specific-colors chart other than conditions of a large-number-of-specific-colors chart created under the same illumination environment and with the same medium such as paper and the same color material such as ink.

Colorimetry of the large-number-of-specific-colors chart is performed with a reference colorimetric device for which color calibration (calibration of reference color values) has been performed with color tiles to be a color evaluation reference (white, black and color tiles with excessive little aging color change that are to be reference color patches) in advance, and colorimetric values are recorded and registered. In consideration of an expiration date when it is not ensured any more that color of the specific color chart itself, which is printed or digitally printed on paper or plastic, does not change, the specific color chart is generally newly created again every year. However, even if the color changes only slightly at the time of annual creation, a new specific color chart is created. At this time, the above-described colorimetric device to be a colorimetry reference is used to acquire color difference data showing a change in the colorimetric value of each color patch, and color difference data of color difference from the previous chart is attached to the new large-number-of-specific-colors chart. Since it is possible to correct target color data values by inputting the color difference data to (a reference data correction function of) the CCS, it is also possible to omit re-colorimetry of the new large-number-of-specific-colors chart by a spectrophotometer or the like. The specific color charts include painted charts and dyed charts.

In an input device such as a scanner, since color reproduction of the device itself may change over time, re-colorimetry is necessary. This is usually required, but it is not a big problem because image input and colorimetry can be performed in a short time less than one minute even in the case of 5,000 colors, and effort is not required almost at all.

Meanwhile, as for color correction of a camera of a smartphone or the like, by fabricating a handy card-sized specific color chart and uploading data obtained by performing re-colorimetry of an input color table of the card-sized specific color chart for each model to a web server or the like in advance, it is possible to, by, at the time of obtaining a new card-sized specific color chart, selecting the serial number thereof (of the new card-sized specific color chart), use the input color table of new colorimetric values.

A method for color adjustment between a printing company and a client will be described.

The first large-number-of-specific-colors chart and the second small-number-of-specific-colors chart are different in the number of colors. Therefore, in the case of performing color adjustment of a colorimetric device, the large-number-of-specific-colors chart is outputted by the client's printer first, and the printing company receives image data inputted by the client's scanner or the like as preliminary setting. Colorimetry of the image data of the color chart is performed by the printing company's CCS. A color chart of the printed matter becomes a reference of the printing company, and colorimetry is performed by a colorimetric device different from the colorimetric device on the client side. Furthermore, each of colorimetric value tables of the digital image and the printed matter are separated into a large-number-of-specific-colors chart and a small-number-of-specific-colors chart to create two kinds of input color tables and two kinds of target color tables. Then, in the printing company, by performing predictive calculation of colorimetric values of color patches that are not included in the second small-number-of-specific-colors chart, which is outputted matter of the client's printer, by the CCS using the method described before, an input color table corresponding to the second large-number-of-specific-colors chart is created. Next, an actual measurement value and a predicted value of the same patch color of the large-number-of-specific-colors chart are compared, and difference is recorded as a correction value. Thereby, from next time, only by receiving a print sample outputted by the same printer as RGB image data obtained by inputting a second small-number-of-specific-colors chart outputted by the client's printer, it is possible to create an input color table for performing correction to correct predicted values taking into account fluctuation in the scanner or the like and confirm color evaluation of pictures with correct L*a*b* values.

Similarly, the above-described two kinds of large-number-of-specific-colors charts by the client's printer and the printed matter are RGB-image-inputted by the printing company's scanner or the like. Patches of each color chart are divided into color patches by matrix colorimetry, and colorimetry of the color patches is performed. Then, conversion to L*a*b* values of all the color patches is performed. Each of the client's printer and the two kinds of large-number-of-specific-colors charts of the printed matter is set as "an input color table for RGB input image". By further dividing each table into a small-number-of-specific-colors chart and a large-number-of-specific-colors chart, four kinds of colorimetric value tables are created. By storing the tables, it is possible to refer to the lot of colorimetric value tables anytime. Therefore, after that, accurate color conversion to the lot of colorimetric value tables is possible even if there are only a small number of colorimetric value tables.

As described above, it is essential in performing accurate color adjustment not only to accurately causing reproduction of a printer or a printing machine to be a profile (converting a color gamut to numerical values) but also to, in the case of using a scanner or the like as a colorimetric device, finely grasp reproduction characteristics adjusted to input characteristics of the scanner or the like, by using the first large-number-of-specific-colors chart as preliminary work for creating a lot of colorimetric value table from a small number of colorimetric value tables.

The reason why an input color table obtained by performing colorimetry of a small-number-of-specific-colors chart is created is as follows. Since the color of a sample print outputted by a client's printer is not necessarily always stable, the small-number-of-specific-colors chart is printed together at the same time the color sample print is outputted. Thereby, only by receiving RGB image data inputted by the client's scanner or the like together with the small-number-of-specific-colors chart printed first, each time, it is possible to accurately read change in the color of the scanner or the like and the current color reproduction of the printer.

Furthermore, only by receiving only an RGB image inputted by the client's scanner or the like, it becomes possible to, without performing colorimetry of the actual sample print by a spectrophotometer, perform L*a*b* colorimetry of colors of the color sample image which has been printer-outputted and perform comparison/confirmation of reproduction with numerical values.

In the printing company also, for color reproduction by the company's printing machine, by outputting the client's image data using a proofer for which color matching has been performed (a high-precision color printer for color proofing), inputting the image data by the company's scanner or the like and performing colorimetry of the image, L*a*b* values are calculated, and difference from the client's print-outputted color sample is converted to difference indicated by color difference ΔE or a CMYK % value. Thereby, it is possible to easily confirm difference in printing reproduction and an amount of color correction.

Thereby, it becomes possible to perform color correction based on color sample data from the remote client. In the case of performing colorimetry of images to compare the images, it is possible to cause the colorimetric error between the two images to be about 0.1 or less by ΔE, by setting the pixel shift to be 1 pixel or less by "an image-matching processing function" for performing alignment of images.

Reference image resolution is 200 dpi as an example. Colorimetry precision may change at positions where resolution differs or where a picture includes patterns or a gradation change, and it is desirable that the same image resolution is set.

The above-described two specific color charts, the second large-number-of-specific-colors chart and the first small-number-of-specific-colors chart, are different in the number of color patches. However, as for a part of the first corresponding color chart, by performing coordinate conversion to L*a*b* values of colorimetric values from a colorimetric value table of the large-number-of-specific-colors chart obtained by performing colorimetry of an input image by a scanner or the like, it becomes possible to, from colorimetric values of the first small-number-of-specific-colors chart, create high-precision color retouching data or color correction data such as a CTP (Computer To Plate) curve and, in printing, perform color reproduction just corresponding to a sample.

Next, description will be made on a method for managing spot colors outside a color gamut that are not included in a specific color chart. The present invention is characterized in being capable of adjusting colors existing in a color gamut of colorimetric values of a specific color chart with a high precision. As one embodiment of the present invention, it is possible to individually perform colorimetry of a plurality of color charts having different color gamuts and colors by a dedicated colorimetric device and add the obtained colorimetric values to one input color table and one target color table to perform color management of spot colors. Thereby, even when colorimetry of a color beyond a color gamut of colorimetric values of a specific color chart is performed, a high-precision colorimetric value can be obtained.

Figure 17:
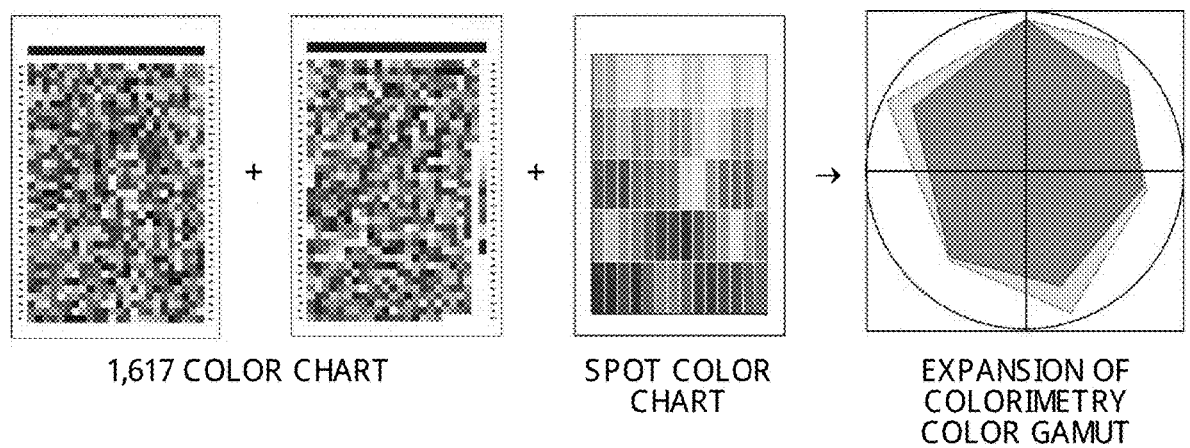
FIG. 17 is an image diagram for illustrating expansion of a colorimetry color gamut in the case of using a spot color chart according to the one embodiment.

Thereby, it becomes possible to expand such a color space that, even for a spot color beyond the color gamut of the CMYK process ink, colorimetry can be precisely performed. Then, by performing colorimetry using a color chart or the like with a wide color gamut printed with spot color ink or a color chip of a spot color is pasted on a chart mount, it is possible to easily respond to the spot color. FIG. 17 shows an image of expansion of a colorimetry color gamut in a case where large-number-of-specific-colors charts (IT8.7/4+gradation chart) and a spot color chart showing shade of spot color ink of each color are combined. Here, the spot color chip refers to such a color sample chip that what is provided with spot color ink that is printed 100%-solid or partially halftone dotted can be cut small. The spot color chart is herein configured with a lot of color patches for representing solid halftone dot 100% of spot color ink with a high saturation and a plurality of gradation gradients of colors between 100% and 0%.

However, if only spot colors extremely away from the conventional CMYK colorimetric values in a color space are inputted to a spot color chart on which spot colors to be added are arranged, colors with a large color difference of the color space cannot be detected in many cases, and there is a possibility that precision of a correction value deteriorates. Therefore, it is desirable to arrange spot colors so that each color difference between color patches obtained by calculation excluding an L value is ΔE5 or below. Though colorimetry of colors outside a color gamut of an input color target (IT8.7/2) like colors of a spot color chart can be performed by a conventional method by the ICC, it is predicted values that can be obtained.

Therefore, the present system adopts a scheme in which, for colors that are not in the color gamut of a color chart by the CMYK process colors, a color space of the spot colors can be supplemented using a target color table by colorimetric values of a spot color chart (It is necessary to use a scanner capable of numerically discriminating color difference in a color space with a wide color gamut sufficiently).

The ICC does not provide such a method, and there may be a case where color matching precision for colors of a wide color gamut is insufficient.

As for colorimetry of individual colors having a high luminosity and saturation outside a color gamut such as spot colors, which are not included in the second large-number-of-specific-colors chart or the first small-number-of-specific-colors chart, a spot color chart (provided with extended IDs) obtained by expanding the color gamut of the first and second colorimetric value tables is expanded is used, and table conversion is performed so that first colorimetric values obtained by performing colorimetry by an image input apparatus with a narrow color gamut such as the RGB color gamut, are converted to first colorimetric values measured by a dedicated colorimetric device with a wide colorimetry color gamut. Further, by supplementing spot colors to the colorimetric values of the first small-number-of-specific-colors chart, it is enabled to respond to colorimetry for a wider color gamut not only for the large-number-of-specific-colors chart but also for the small-number-of-specific-colors chart. However, it is difficult to perform colorimetry of almost all practical spot colors outside the color gamut. Therefore, by performing colorimetry of a color chart showing the whole color gamut including a lot of spot color patches by a CIEXYZ input apparatus and additionally supplementing obtained colorimetric value to the colorimetric values of the first small-number-of-specific-colors chart, the precision of colorimetry outside the color gamut is increased.

When colorimetry is performed for brilliant colors existing outside color gamuts of an input color table created using a specific color chart by CMYK process ink and a target color table by a spectrophotometer or the like, the precision of values beyond the color gamuts among colorimetric values decreases. Therefore, it is necessary to create a new colorimetric value table using a spot color chart by spot color ink having a high saturation and add/integrate the colorimetric value table to/with the input and target color tables to increase the precision of colorimetry in wider color gamuts.

Since there are a lot of spot color inks of more brilliant colors than CMYK process inks, a spot color mixed color chart in which a color chart obtained by blending spot color and CMY ink is added is used in some cases. For example, at the time of creating a chart, printing is performed using spot color ink instead of K ink. A colorimetric value table of a specific color chart created by performing colorimetry with an RGB input device, and a spectrophotometer or the like and a colorimetric value table created by performing colorimetry with a spectrophotometer or the like similarly are created.

The created colorimetric value table by the spectrophotometer or the like and the colorimetric value table created from a spot color chart image inputted by the input device are separately stored without being integrated with a colorimetric value table for the CMYK process ink for the same printing medium. Then, by comparing colorimetry positions by overlapping original-version TIFF image data that includes the spot colors, about whether "the colorimetry positions are only by the CMYK ink" or "by the CMY color obtained by blending with spot colors", any of "the colorimetric value table including the spot colors" and "the colorimetric value table only by CMYK" is automatically selected, and optimal colorimetric values are displayed. By performing conversion of the colorimetric value tables based on the L*a*b* values obtained in this way, it becomes possible to calculate halftone dot % and an amount of ink correction for the CMYK and the spot colors. In the case of using a CIP3-PPF file (job management information to be handed to a printing machine, which includes an image obtained by roughing printing plate data, the job management information being for obtaining an area of pictures of an CMYK image required to calculate an amount of ink) as a reference file, colorimetry of the pictures is performed after image matching processing such as positioning relative to an image inputted by an input device because spot colors are included in an image file in the CIP3-PPF file. Thereby, it is possible to judge whether spot colors are included in the actual image data by performing comparison with the PPF, and, therefore, separation between spot colors and a sumi version can be easily performed similarly to the case of a TIFF image.

A method for fabricating a spot color chart used in the CCS will be described. A conventional spot color chart is printed by ordering spot color ink from an ink manufacturer. Meanwhile, in a spot color system of the present invention, each client or printing company creates a spot color chart by creating a chart mount, and cutting necessary color chips from color chip collection like a color guide that an ink manufacturer fabricates, prints and sells or provides. It is also possible to additionally paste paper pieces in colors desired by a printing orderer on the chart mount to create a spot color chart. Thus, it becomes possible to create a dedicated spot color chart, which is excellent in the precision of printing color and inexpensive, in response to a client's (the printing orderer's) request without spending fabrication time.

By performing colorimetry of the spot color chart by a dedicated colorimetric device and a general-purpose image input device to create a colorimetric value table, and performing color conversion by the CCE, it becomes possible to perform colorimetry of spot color ink with a high precision. Thereby, a spot color chart on which only spot colors for a printing company are collected and which requires significant expenses for fabrication can be inexpensively and easily created. Further, since it is not necessary to print a specially fabricated spot color chart by spot color ink as described before, a long time required to create a chart can be significantly reduced.

By using the CCE, colorimetry of a desired color sample is accurately performed not only at a place where a print orderer (a client) posts a piece of printed matter but also under an illumination environment under which a consumer or the like to be a customer of the print orderer sees the piece of printed matter. For "color chips of a color guide, previous printed matter, printed matter printed by another company or outputted matter by an inkjet printer", colorimetry of colors under an illumination environment specified by the print orderer can be accurately performed. Thereby, it becomes possible to give an order or specification of colors for color correction, which has been communicated by ambiguous words, by numerical values. Furthermore, since it becomes possible to input the above-stated color sample by a scanner or the like and communicate the color sample to a remote printing factory, it is possible to correctly print colors which a client or a print orderer desires color reproduction of and requests (hereinafter referred to as "requested colors"), which are necessary for color management for printing, in a short time.

Even between different device-dependent RGB input devices, it is possible to, by using the CCE, perform accurate colorimetry by setting colors outputted by a first (a client's) color printer as client's requested colors, and performing color space conversion to colorimetric values of a reference dedicated colorimetric device so that the same colorimetric values can be obtained by another RGB input device.

If, by applying this function, colors of a sample print showing colors requested by a client are image-inputted by the client's scanner or the like, and an input color table and a target color table are prepared in advance, it is possible to convert colors of important pictures, logos and the like to numerical values using a scanner or the like instead of a colorimetric device. Further, by preparing an input color table and a target color table in advance, it is possible to, at the time of sending a sample print showing the client's requested colors to a printing process of a printing company, immediately perform color conversion to values obtained by performing colorimetry by a dedicated colorimetric device such as a spectrophotometer, which are a colorimetry basis of the printing company. Therefore, the above-stated colors of important positions of the sample print showing the client's requested colors can be communicated to the printing process as correct numerical values. Similarly, in the printing company also, by adjusting the company's scanner or the like to colorimetric values of a reference colorimetric device, it becomes possible to, by imputing a color sample image and a proof in the company by the printing company's scanner or the like, perform comparison/evaluation of colors of the important points even if there is not a color sample from the client.

Ink manufacturers provide the manufacturers' color chip (color patch) information and ink information from cloud severs. The color chip (color patch) information includes color space information about L*a*b* values based on color chip (color patch) numbers, and the ink information includes C, M, Y and K ink composition/blend ratios, blend ratios of spot colors, or information about whether heat resistance and light resistance functions are provided. A client may create a necessary dedicated spot color chart based on the color chip (color patch) information and the ink information. A printing company can cause the color space information about the L*a*b* values to be a basis of print color reproduction as a client's requested colors. Though these methods can be adopted, the system to realize requested colors realizes color reproduction requested by a client using a color chart of a sample picture or a sample print from a client without using color chips.

Figure 18:
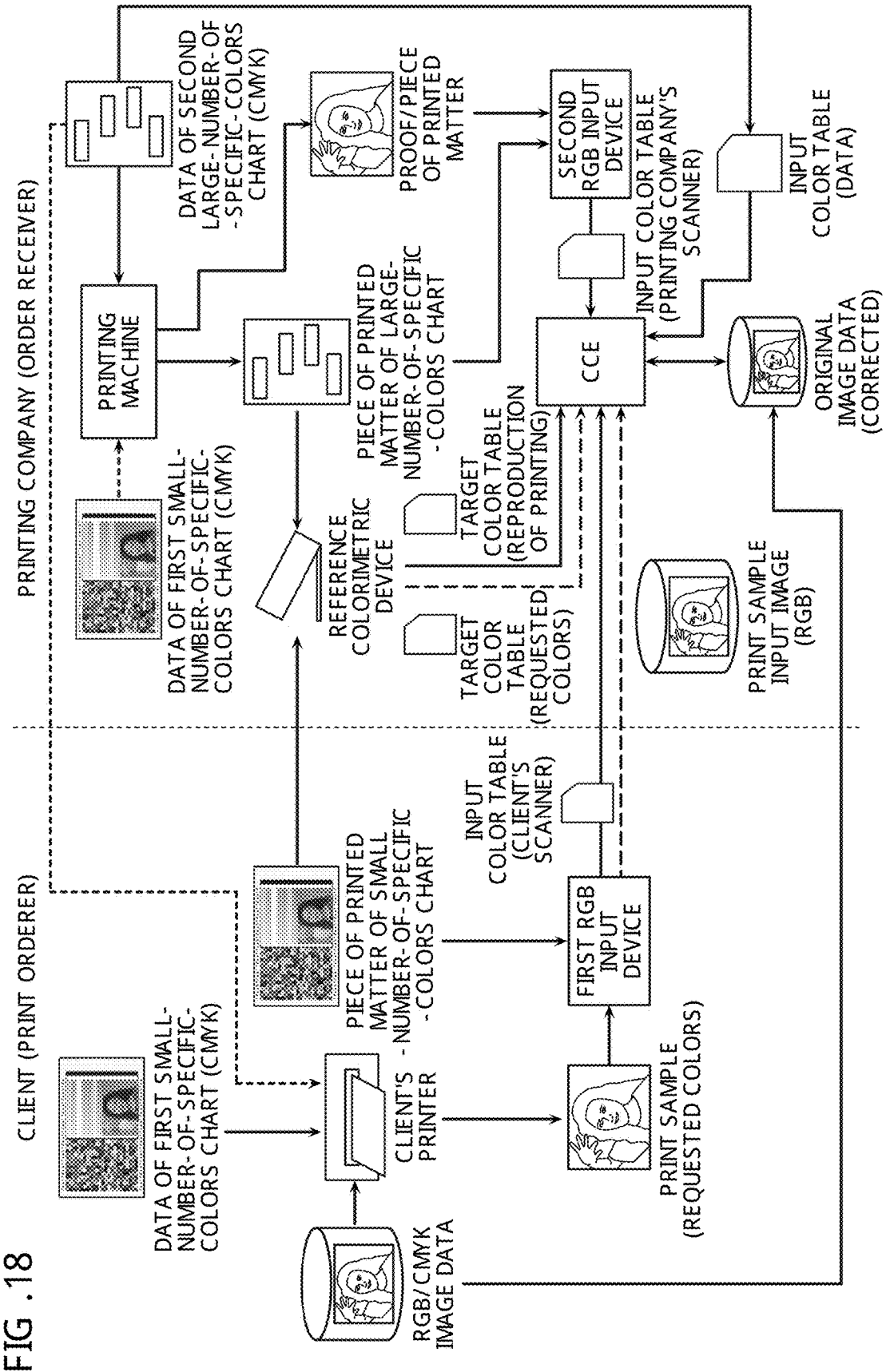
FIG. 18 is a flow diagram for reproducing colors requested by a client according to the one embodiment.

Using FIG. 18 which is a flow diagram for reproducing a client's requested colors, description will be made on a flow of actual image data conversion and how to use a colorimetric value table. In the case of using a client's scanner or the like instead of a colorimetric device, data (CMYK) of a small-number-of-specific-colors chart is a printed as print-output matter by the client's printer or printed by a printing company, and first small-number-of-specific-colors charts of both sides are inputted by a first (the client's) RGB input device. Then, colorimetry of first small-number-of-specific-colors data is performed by a color conversion engine (CCE) to create a first input color table.

Meanwhile, in the printing company, a piece of printed matter of a large-number-of-specific-colors chart obtained by printing second large-number-of-specific-colors chart data by a printing machine is inputted by the company's second RGB input device and converted to colorimetric values by the CCE, and an input color table is created. Next, colorimetry of pieces of printed matter of the first small-number-of-specific-colors chart which has been print-outputted by the client and the second large-number-of-specific-colors chart printed by the printing company is performed by the printing company's reference colorimetric device, and two target color tables are created.

Then, in the case of comparing colors of a print sample, and a proof or the pieces of printed matter, by setting the two input color tables and the two target color tables corresponding to each of images inputted by a first RGB input device and a second RGB input device for the CCE, color difference ($\Delta E$) or CMYK % difference based on L*a*b* values obtained by performing colorimetry by the printing company's reference colorimetric device, and the color difference can be confirmed with first colorimetric values as (the client's) requested colors. If the second colorimetric values have color difference, a color-corrected image can be easily obtained by performing color conversion by the CCE using the input color table for the original image data to for adjustment to the requested colors.

If it is feared that colors outputted from the client's printer may change over time, the client necessarily prints the small-number-of-specific-colors chart at the time of printing the color sample and hands over the print to the printing company. By measuring the print by the printing company's dedicated colorimetric device, change in the colors can be easily recognized. Furthermore, by using an input color table the colorimetric values of which have been corrected, an accurate colorimetry result can be obtained. In a case where a print sample is printed by a third party, small-number-of-specific-colors charts printed on various kinds of paper sheets in advance are inputted by the client's input device, and, from a created input color table and a target color table created by inputting the lot of printed specific color charts by the third party's input device, paper sheets classified as the same paper sheets or what are classified due to the same paper sheets are selected and set for the CCE. Thereby, accurate colorimetry and color comparison can be performed.

By converting color reproduction characteristics of the print orderer's printer to a profile, it becomes possible to set a print profile of the printing company for the printing orderer's printer and cause color reproduction simulation to be performed on the assumption that print reproduction is performed in colors outputted by the client's printer. Thereby, it becomes possible for a designer, an advertising agency, and the orderer himself to confirm difference between requested colors and the print reproduction colors in advance. In order to ensure it, it is necessary to perform color evaluation of the requested colors under a correct illumination environment. Therefore, color management is performed using the CCS.

In order to obtain confirmation of colors of a proof and final consent to proofing (OK with corrections) from the client, it is necessary to create proof output matter and print data (PDF) and receive a signature for completion of proofing, that is, for OK with corrections before creating print data. In many cases, however, OK with change is obtained after receiving a request for color retouching from the client. However, it is very difficult to verbally communicate the nuance of a color retouching instruction to a printing site.

Therefore, it is also possible to, by installing color retouching instruction communicating means capable of specifying a movement direction in a color space required in color retouching (for example, increase in reddishness of the color of a product) with numerical indication of a color retouching direction and an amount of retouching, color sample chips or color patch data (colorimetric values) and software to write a color proof instruction for color retouching on the client's PC, give the color retouching instruction online via the Internet.

If such a color that a color retouching instruction has been given but color reproduction is not possible is specified, software is developed to perform display on a monitor screen using a monitor display function of displaying an approved image with correction for which the client's consent to color proofing has been obtained and a color part of a color-corrected image using marking display or flashing (blinking) display, or causing a reference image and comparison image to be alternately displayed as single display or displayed as composite display. Further, software is used to make it possible to cause a color retouching condition of a picture to be visually understandable with numerical values and on the monitor screen, for example, by, when relevant parts on the monitor display of the approved image with correction and the color-corrected image are specified by clicking with a mouse, another input device or the like, causing color difference to be shown by color difference ΔE display or comparison display of two colors as color patches arranged side by side. Further, software is used to enable the client himself or everyone to compare colors by numerical values by arranging two pictures, the approved image with correction and the color-corrected image, side by side to perform color comparison and colorimetry to provide color retouching instruction communicating means capable of accurately specifying a color.

In the case of attaching importance to color reproduction using spot color ink, colorimetry of spot color patches is performed by a dedicated colorimetric device or an input device such as a scanner or the like, and, at the time of registering and storing the spot colors, the spot colors can be color-displayed accompanying spot color names and spot color ink color codes. As the color names and the spot color ink color codes, color names and spot color ink color codes of each ink manufacturer may be used. Information registered being accompanied a color name and a spot color ink color code includes L*a*b* values of the spot color, composition (codes, names and a mixing ratio of combined basic inks, and rates of medium and solvent in the case of gravure ink or the like) of ink including information about white ink and sumi ink included in the spot color. The registered spot colors can be used to numerically compare color difference from actual colors in a picture of an actual piece of printed matter as a reference color or can be freely overlapped on the picture as a color chip for comparison.

When color proofing is performed, OK with change is given in a state that specification of some color retouching orders are given for a part of colors in many cases. In the present circumstances, it is a big problem how a sensory amount of color retouching not depending on numerical values is grasped in the case of the OK with change described above, and there are many cases where a complaint is made when printed matter is delivered.

As a method for solving the above problem, software capable of stimulatingly displaying an approved color with correction is developed, the software being called "Color Variation Guide" and being for color reproduction in a case where colors of an image are retouched in various directions in a color space, so that the print orderer can perform output by the print orderer's printer and make a confirmation. Then, by the print orderer judging a color space direction in which color retouching is to be performed, an acceptable color difference range or limit by ΔE and CIEDE2000 for reproduction of the approved color with correction is found out. Further, by handing over a print image in colors targeted by color retouching to a person in charge of color retouching of print data in the printing company when print data is delivered, accurate communication of a color retouching method by numerical values is enabled by communicating the color correction direction to the printing site as a print image or actually performing colorimetry.

Figure 19:
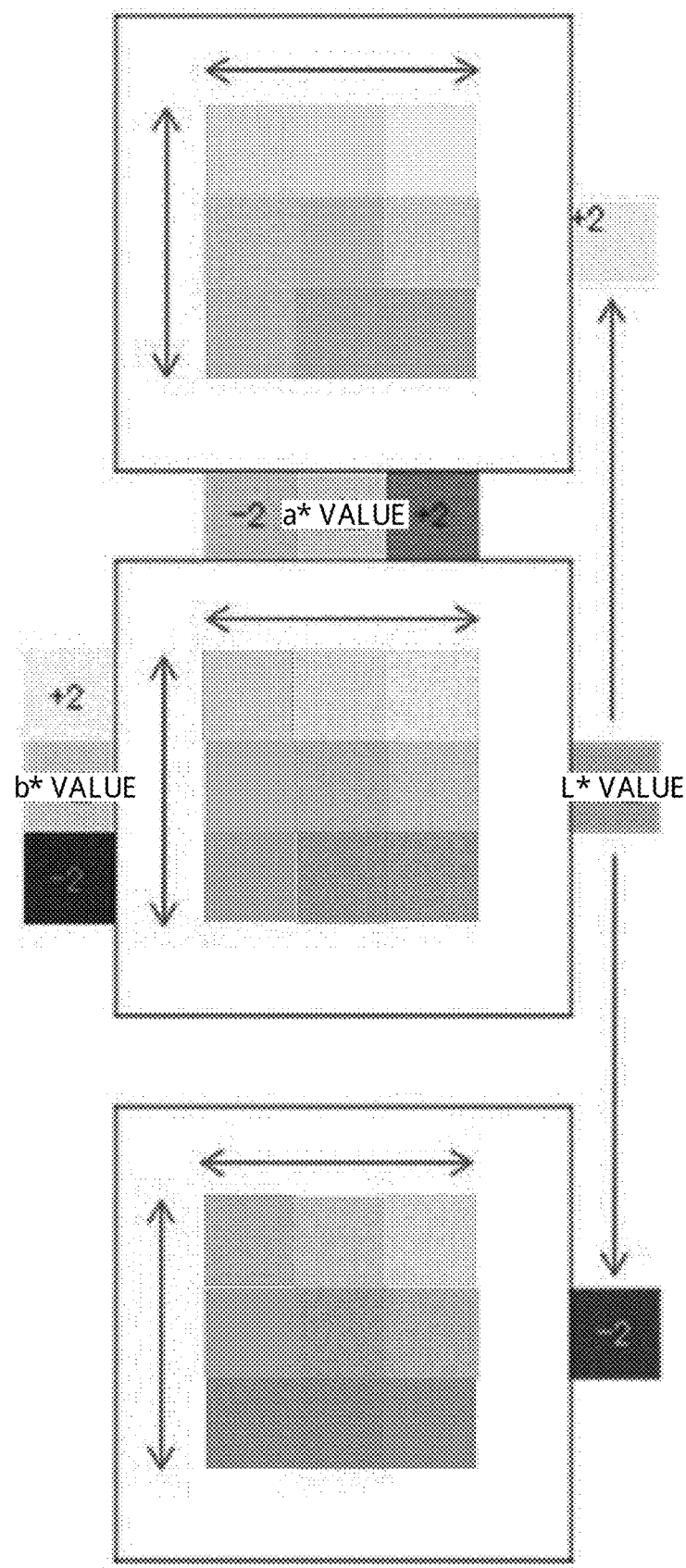
FIG. 19 is a diagram showing Color Variation Guide for color reproduction in the case of retouching colors of an image in various color directions.

Even if color proofing is performed, OK with change is given in a state that some color retouching orders are given for a part of colors in many cases. In the present circumstances, it is a big problem how an amount of color retouching is grasped in the case of the OK with change described above, and there are many cases where a complaint is made when printed matter is delivered. As a method for solving the above problem, Color Variation Guide (see FIG. 19) function of requested color simulation software is developed. Color variation for color reproduction in which a reference color is at the center, and an image color is retouched in various color directions are outputted by the print orderer's printer so that the print orderer can make a confirmation. Then, the print orderer judges a direction in which the color is to be retouched. Thereby, it is enabled to communicate a color correction method to the printing site as a print image and actually perform colorimetry to accurately communicate a color retouching method by numerical values, by finding out expected values for color reproduction, and bringing back a print image in colors targeted by color retouching to the company (the printing company) at the time of delivering the print image.

Figure 20:
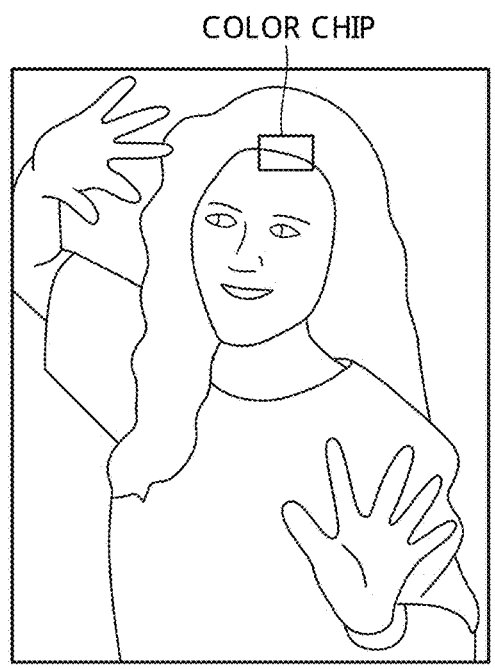
FIG. 20 is a diagram illustrating an example of using Color Variation Guide.

FIG. 20 shows a mechanism in which, in the case of performing colorimetry of a color at a position that a client wants to retouch in a picture of a piece of printed matter using the colorimetric device to confirm a direction in a color space direction for retouching, "a digital color chip" of a desired color is displayed at the center of the picture by selecting the desired color on the monitor of a PC with "Color Variation Guide". The "digital color chip" can be freely moved to a position to be compared. Therefore, by overlapping the digital color chip on the picture at the position where color retouching is to be performed, the color can be further changed by "Color Variation Guide" if the image of color is different. Thus, the color can be freely changed until a desired color is found, and the desired color is decided. When the desired color is decided, the amount of color correction at the time of printing is displayed by color difference of ΔL*, Δa* and Δb*, difference of CMYK %, or luminosity, saturation and hue by Munsell hue circle. At the same time, it is possible to communicate the amount of color correction to the printing process by the above-described L*a*b* values or CMYK % numerical values. If constant color reproduction of the colors of the client's logo and products selected here is required in the future, the selected colors can be registered by "Color Variation Guide" so that the colors can be displayed as "digital color chips" any time.

Figure 21:
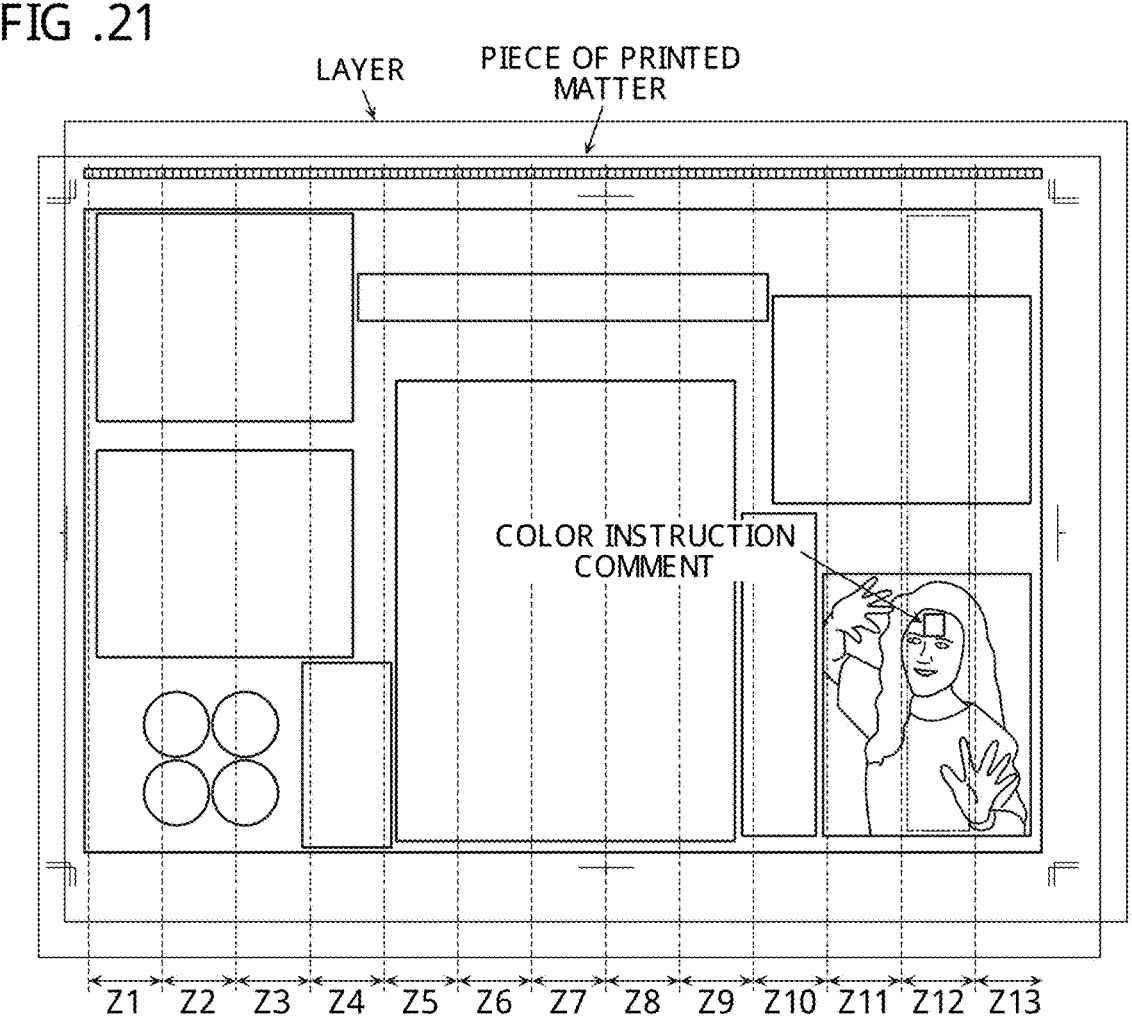
FIG. 21 is a diagram showing a color evaluation screen by a super viewer for printing operator.

Separately developed "Simplified Color Retouching Instruction Software" is software that one layer to which a client freely writes an instruction to retouch colors of a picture and the like is held like an overlay of an image, and it is enabled to, using a function of writing the content of the color retouching instruction, give an instruction on the monitor screen of a PC or give an instruction by manually writing the instruction (see FIG. 21). If "Simplified Color Retouching Instruction Software" is provided, the display of "color retouching instruction image data" and "a color retouching evaluation result viewer image" can be switched and displayed. Images before and after retouching can be confirmed by page turning display or numerically confirmed by color difference between colorimetric values.

"Simplified Color Retouching Instruction Software" may be capable of displaying difference by ΔE, ΔL*, Δa*, Δb* or CMYK %. Further, a super viewer function, which is display software equipped with operations developed for a printing operator and a display switching function, may capable of displaying L*a*b* and CMYK % values of a reference image, dot gain difference, and an amount of ink correction for each ink key and performing simulation of a color of a color retouching instruction.

As described above, in the color instruction work by the CCS, a responsible person in a company or an advertising agency that is a print order client only has to hand over or transmit image data obtained by inputting a piece of printed matter to be a print sample by a scanner or the like of the company to a printing company. In the printing company, color adjustment data is automatically acquired from the received print sample image data using the CCS. Thereby, it is possible to reproduce colors requested by the client on a monitor or a proof, and it becomes possible to perform printing while confirming a result of color retouching adjusted to the colors of the sample. In this case, it is necessary for the printing company to create RGB image data of a specific color chart inputted by the print orderer's scanner or the like in advance, and an input color table obtained by performing colorimetry of the same specific color chart by the printing company's reference colorimetric device (a spectrophotometer or the like).

If there is a color that the printing company cannot reproduce, the printing company can display in a 3D color space which color of which part cannot be reproduced, and display/output a color evaluation report using "Simplified Color Retouching Instruction Software" describe before. Therefore, both of the client and the printing company can confirm a problem of color reproduction and perform further color retouching before printing. In the printing company, it is possible to, by using input color tables (created last time) corresponding to image data obtained by inputting a proof outputted by the printing company's proofer, by the printing company's scanner or the like and the printed image data received from the print orderer, respectively, immediately perform color comparison and color evaluation for the two images on the screen of a monitor connected to the CCE and a PC and output a color evaluation report.

Figure 24:
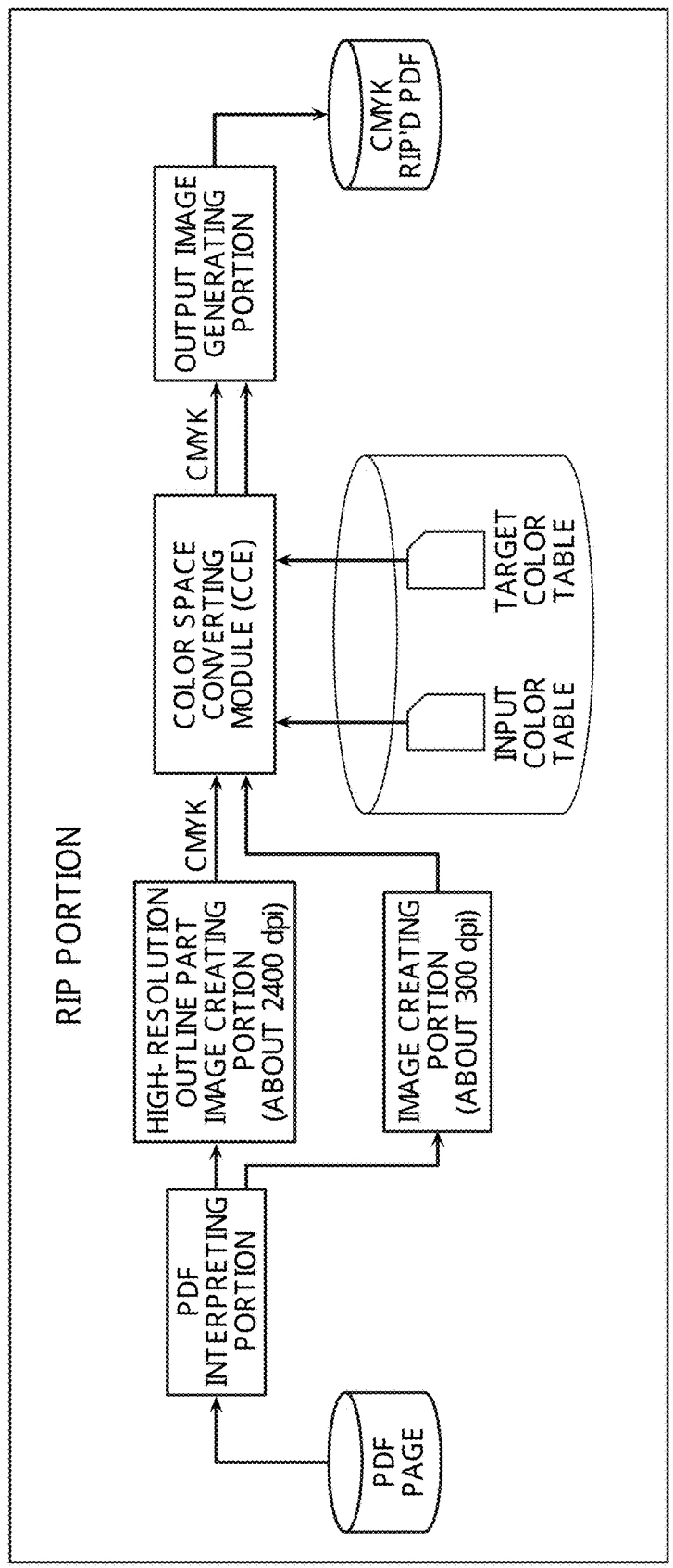
FIG. 24 is a diagram illustrating a concept of RIP used in the present system according to the one embodiment.

When the print orderer's signature is received for OK with corrections for the proof for which automatic color correction has been performed by the CCS, color correction is performed for the actual image data. In this case, a colorimetric value table obtained by performing L*a*b* colorimetry for reproduction of a specific color chart print outputted by the print orderer's printer is converted to a format that profile creation software can accept, and a print profile in which requested colors are converted to target colorimetric values is created. A color-corrected CTP plate is outputted by using the created new print profile and using a function of performing color conversion of the current C, M, Y and K (each halftone dot %) values to C, M, Y and K (each halftone dot %) required for reproduction of the requested colors at the time of RIP output using the created new print profile. Thereby, it becomes possible to start printing based on the requested colors. The series of works are incorporated in or connected to the RIP as a CCS apparatus so that the RIP and the CCS apparatus mutually cooperate in information processing. Then, it becomes possible for the RGB image data to perform color conversion adjusted to a targeted illumination environment with the resolution of the RIP. FIG. 24 shows a concept of the RIP used in the color conversion system according to the present invention. As shown in FIG. 24, a RIP portion may be configured including a color converting module of the present system, or a configuration is also possible in which the RIP and the CCS are independent. The CMM mounted on the current RIP is used to perform color management adjusted to printing conditions and create appropriate print data. The independent CCE of the present system is used as a color conversion engine replacing the conventional CMM for RIP. This color conversion engine is characterized in being capable of creating print data enabling color reproduction close to print reproduction by general 5,000K color temperature according to quite different illumination environments, and it becomes possible to enable color reproduction adjusted an illumination environment of a place where printed matter is seen. Therefore, usefulness of printing is enhanced.

Color reproduction check of printed matter to be delivered to a client is important in the printing company. Since color retouching is automatically performed by using a specific color chart, the necessity of the client' confirmation decreases. However, if the print orderer does not perform colorimetry of important pictures such as photographs and logo mark of printed matter to confirm whether reproduction by printing is possible or not in advance, there is a possibility that a trouble occurs because color reproduction cannot be performed by printing when the pictures are outside a color gamut at the time of being converted from RGB to CMYK. Therefore, it is necessary to explain this to the client before printing to find a compromise or give an advice to select wide-gamut ink or spot colors.

It is possible to prevent the trouble about color by, at the time of comparing color-sample printed matter and DTP data for printing (such as PDF) received from the print orderer with a proof outputted by the printing company's proofer, performing colorimetry of colors of some arbitrary positions in a picture or performing automatic colorimetry for up to about 10,000 positions on the whole surface of the picture at equal intervals and with a specific colorimetry spot size to check an average or maximum color difference, using color evaluation software for confirming whether colors at positions to which the client attaches importance are within an allowable range (for example, color difference $\Delta E$ agreed in advance) and output a result in a form of a color quality evaluation certificate guaranteeing the colors.

If there is such a color that it is not possible to perform color reproduction in advance on a proof, it is important to numerically show color difference indicating to what extent the color is adjusted by a 3D color space, confirm whether there is difference between a printing result and an estimated difference before printing to receive the client's consent. If color retouching is performed, it is similarly confirmed whether colors after the correction are close to colors requested by the orderer. In some cases, a DTP (desktop publishing: page editing by computer) design process and color correction at the time of RIP processing are performed, and then a proof is outputted again. If a color is outside the color gamut of the RGB color space of printing, a complaint about color can be prevented by notifying the limit of reproduction, for example, by communicating a numerical evaluation result of a color quality evaluation certificate for evaluating the color to the client as described before. Further, a result that can be easily understood by the client is obtained by, at the time of performing color evaluation, using a correction table for spectral characteristics adjusted to an illumination environment required by the client to perform conversion to colorimetric values of printed matter or the like under the illumination by the CCS or by asking the client to perform judgment with a notebook PC using color conversion simulation software. A spectral characteristics correction table refers to a combination of an input color table and a target color table for converting colorimetric values obtained under spectral characteristics of illumination light at the time of performing colorimetry by a colorimetric device or at the time of input by an input device to colorimetric values obtained under spectral characteristics of targeted illumination light.

An RGB input device or the like has "a device-dependent color" in a device-specific color space specific to the device. Since colors obtained by the RGB input device or the like are unique colors, they cannot be treated as reference colors. Therefore, colorimetry of each color is performed by various kinds of dedicated colorimetric devices such as a spectrophotometer capable of performing colorimetry under spectral characteristics of illumination light based on M1 of D50 (5,000K) illumination light, which is a new standard of ISO, using a specific color chart for colorimetry to compare a corresponding color, and evaluation is performed by a statistical method to be described later. At the time of performing the colorimetry, a dedicated colorimetric device corresponding to a reference device is selected. For example, several kinds of models are selected, with a dedicated colorimetric device that shows L*a*b* colorimetric values close to L*a*b* colorimetric values obtained by a statistical method among colorimetric values obtained by performing colorimetry of a large-number-of-specific-colors chart by a plurality of various dedicated colorimetric devices of each manufacturer, by each spectrophotometer as a reference dedicated colorimetric machine to be based on. The statistical method stated here includes calculation of various statistical numerical values such as a mean value, a median and a mode.

Then, from L*a*b* values obtained by performing colorimetry by the reference dedicated colorimetric device, models to be reference colorimetric devices are selected. What are obtained by setting L*a*b* values obtained from a statistical median or mode of colorimetric values of these plurality of colorimetric devices as an L*a*b* colorimetry basis are defined as "universal L*a*b* values".

Values converted to a generally defined color space, such as an Adobe-RGB and sRGB color space, based on "the universal L*a*b* values" are defined as "universal RGB values". Furthermore, what is obtained by converting "the universal L*a*b* values" to CMYK values is defined as "universal CMYK values".

A specific color chart is inputted by an RGB input device or the like, converted to device-independent "universal RGB values" by the CCS based on device-specific colorimetric values as described above and utilized for distribution/storage of color information.

In the case of performing input using a CIEXYZ camera for colorimetry of a dedicated specific color chart, CIEXYZ values thereof can be converted to L*a*b* values (taking into account spectral characteristics of illumination light) using a three-dimensional coordinate conversion formula shown below. Further, by creating a colorimetric value table for the above-described dedicated specific color chart by a spectrophotometer or the like, which is set as a reference value, and correcting L*a*b* values, the spectrophotometer or the like can be used as a dedicated colorimetric device enabling universal L*a*b* colorimetry.

$$L^*=116(Y/Yn)^{1/3}-16$$

$$a^*=500\{(X/Xn)^{1/3}-(Y/Yn)^{1/3}\}$$

$$b^*=200\{(Y/Yn)^{1/3}-(Z/Zn)^{1/3}\} \quad \text{[Formula 2]}$$

Under a D50 light source, Xn=98.072, Yn=100, and Zn=118.225 are used. Under a D65 light source, Xn=95.045, Yn=100 and Zn=108.892 are used.

In a conventional RGB input device or the like also, by performing colorimetry of a specific color chart by the medium and color material used at the time of creating various target color tables stored in the CCS and a database the CCS has, by the RGB input device or the like to create an input color table, color conversion is performed by the CCE. Thereby, the RGB input device or the like is enabled to output the "universal RGB values" to be a basis of device-independent colors and can be utilized as a device-independent input device.

Figure 22:
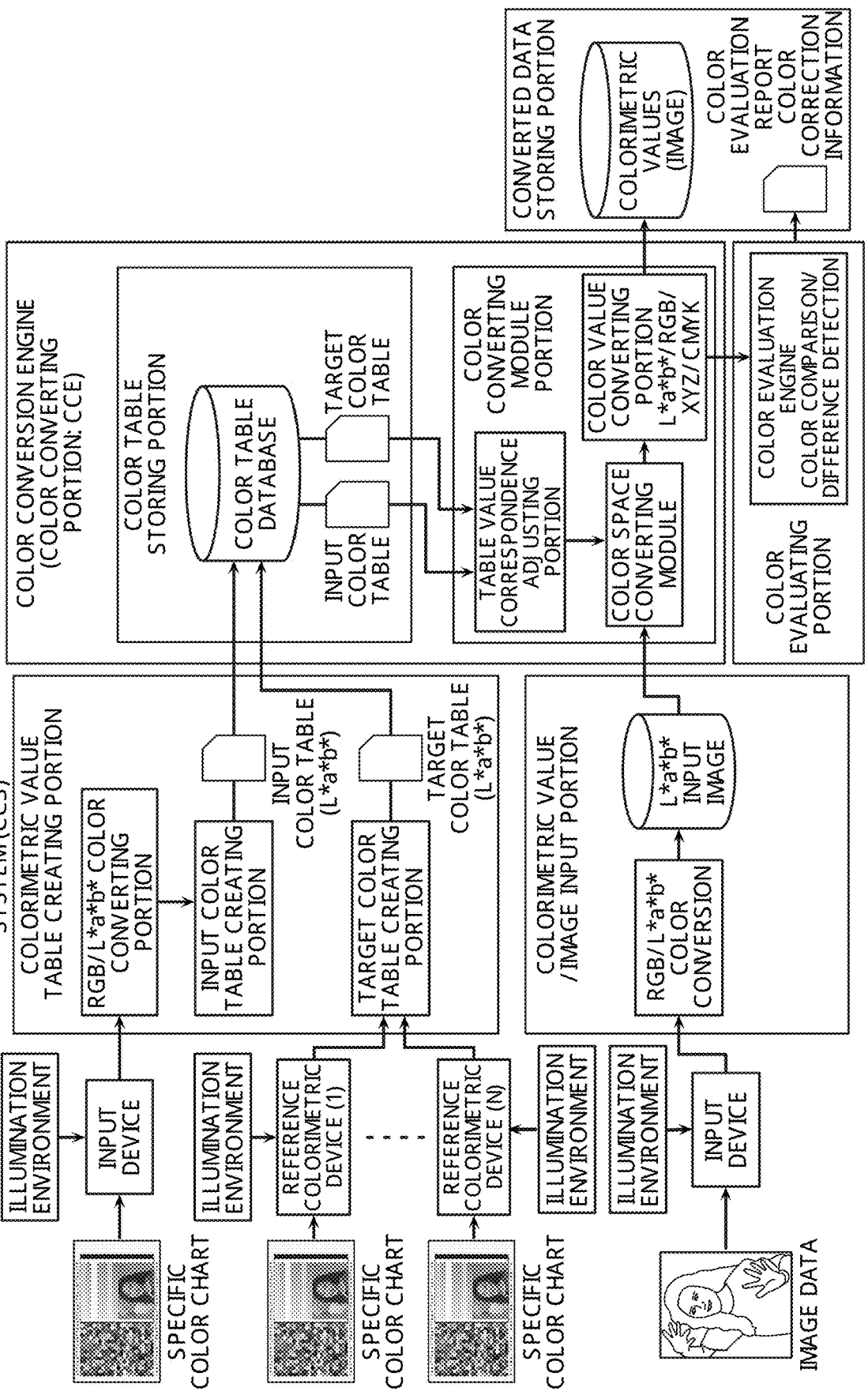
FIG. 22 is a flow diagram showing a method for conversion to universal RGB according to the one embodiment.

FIG. 22 is a flow showing generation of various kinds of universal image data by the CCS. Since an image of a specific color chart obtained by an RGB input device or the like at the upper left of FIG. 22 has RGB colorimetric values specific to each RGB input device, the RGB colorimetric values are converted to specific L*a*b* values by a colorimetric value table creating portion to create an input color table. Next, a reference colorimetric value of each color is obtained by the plurality of dedicated colorimetric devices and statistical method described above.

First, for the above-described specific color chart, a specific color chart by color tiles (color chips with little change over time) that shows difference from colorimetric values of the color tiles to be a color basis, and a colorimetric value table for the specific color chart are further prepared. Next, by performing colorimetry of the large-number-of-specific-colors chart under a reference colorimetry environment and with several ISO-compliant dedicated colorimetric devices and processing difference between colorimetric values by the statistical method, "universal L*a*b* values" are obtained. What is obtained using such a target color table that color difference from the colorimetric values of the color tiles with extremely little color change over time is taken into account as a color standard is to be a color basis of "universal RGB values" common to RGB, which will be described next.

RGB values calculated after further converting "universal L*a*b* values" obtained by causing colorimetric values of a large-number-of-specific-colors chart prepared for each color material and each medium to be a basis by the statistical method described above to a CIEXYZ color space that defines an RGB color space at a specific color temperature are defined as "universal RGB values". In the case of using a first small-number-of-specific-colors chart, colorimetric values obtained by each of a plurality of measurers performing colorimetry by different colorimetric devices, respectively, are converted to the universal standard RGB values. What is converted to each piece of RGB image data using the universal specific color chart table is called "universal RGB image data" and is stored or distributed as image/video information. Colors that are not included in the first small-number-of-specific-colors chart are converted from colorimetric values of a second large-number-of-specific-colors chart and supplemented (replenished).

Further, by performing color conversion to an RGB image by universal RGB values obtained using reference illumination light, such as 5,000K and 6,500K, an absolute value RGB image DB (database) of a common device-independent color space is obtained, and information distribution of RGB images is promoted. Furthermore, since, by using the CCE, conversion to color reproduction under a color temperature and spectral characteristics of different illumination light is possible, reference colors in an absolute value color space are theoretically obtained for an archive image and video. Therefore, by preparing only an output (display) profile of an output printer (monitor) or the like, original data for color reproduction that is accurate even if being stored for a thousand years is obtained.

Figure 23:
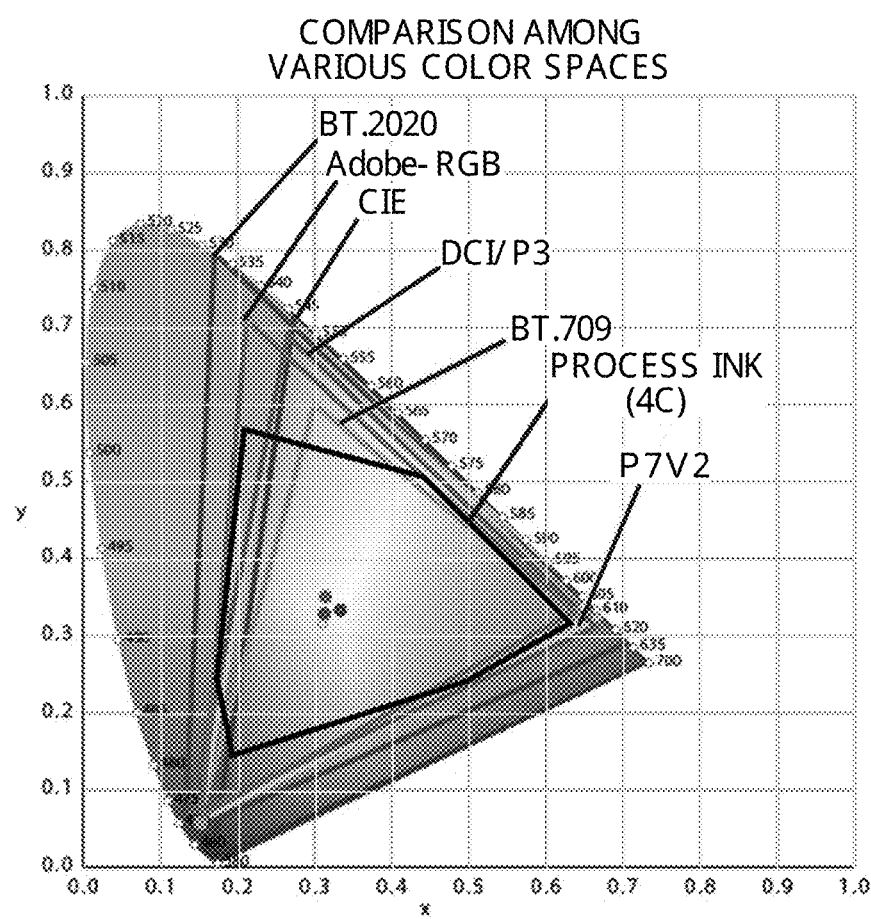
FIG. 23 is a graph showing various color gamuts.

FIG. 23 (a color space diagram comparing difference among various color gamuts) shows various color gamuts of BT.2020 which is a new standard, DCI/P3 which is a color space standard for digital cinema, Adobe-RGB and process ink (CMYK). Many of input devices and the like, such as a general RGB digital camera or RGB scanner and 4K or 8K video camera of BT.2020 which is a wide color gamut standard, perform output, causing the output to be compatible with the sRGB color space, the Adobe-RGB color space or the BT.2020 color space. However, colors of an inputted RGB image differ according to spectral characteristics of a filter, a sensor and a light source of each company. By using the CCS to aim for utilization of "a spectral characteristics correction table" that realizes color reproduction under a targeted illumination environment and standardization of image colors obtained by companies' input devices, it becomes possible to increase reliability of color.

That is, by providing a basis for universal RGB values, it is possible to, by replacing RGB values of each of individual different devices with universal-basis RGB values to standardize image colors obtained by companies' input device and obtaining common RGB values, aim for users' convenience, for example, solving color troubles about a universal RGB database or information distribution of a universal RGB image. As for the above-stated BT.2020 color gamut also, the color gamut is positioned as universal BT.2020 having specifications of a wider color gamut than the RGB color gamut and is treated similarly to universal RGB. Since the reference color temperature of RGB is 5,000K though the reference color temperature of BT.2020 is 6,500K, it becomes necessary to perform color temperature conversion by the CCS. The color temperature conversion is also performed based on a target color table.

The universal RGB to be the basis of RGB is useful in the case of using an input image by an input device as a reference color image. In the case of output also, the universal RGB can be used as a common reference profile or LUT if universal CMYK to be reference colors are provided. The LUT here refers to a lookup table for color conversion processing which is a conversion table having different values corresponding to input values, respectively.

For example, in Japan, however, JAPANCOLOR is used as the standard in the printing industry, and only a part of the printing industry has started to adopt the universal RGB. Similarly, NSAC compatible with web rotary offset presses is used in the newspaper industry, and JMPA Color is used in the magazine/advertisement industry. Thus, even only in Japan, these print color reproductions are not standardized as an integrated device profile. When the world's printing industry is seen, each country has its own standard such as G7 of U.S. (a color printing management law of 2007 in which standards for rotary pressing and standards for commercial sheet-fed printing are integrated) and FOGRA of Germany ("the ISO12647-2" certification is management attaching importance to dot gain based on "ISO12647-2" which is an international standard related to offset printing (150 lines)). In order to perform sales in these countries, output device manufacturers are required to satisfy the standard of each country to aim for integration of these various kinds of printing standards.

Therefore, a specific color chart based on standard CMYK color reproduction, which is the printing standard of each country, is created and converted by the CCE based on universal L*a*b* values obtained by the method described before to obtain universal CMYK values. Then, in order to utilize the universal CMYK values, various kinds of large-number-of-specific-colors charts are printed with various kinds of ink and printing conditions based on various kinds of printing standards. For each of the printing conditions, colorimetry of each color patch of the several kinds of large-number-of-specific-colors charts is performed, and, from obtained several kinds of colorimetric values, standard colorimetric values are obtained by a statistical method. Furthermore, the colorimetric values are converted to a database, being positioned as a standard intermediate print profile, and the print profile is converted to a standard intermediate profile for output of each country and industry and utilized. For this purpose, the universal CMYK and the standard intermediate profile for output of each country and industry are stored in a database of the CCS and utilized. The intermediate profile refers to a print profile enabling common color reproduction.

Thereby, it is enabled to treat universal CMYK values as a more ordinary output color management standard. By converting universal CMYK values to an existing intermediate profile for output and using the intermediate profile for output, it becomes possible to make a bridge to the standard intermediate profiles of each country in the world and of the industry. By performing conversion from the universal CMYK to various kinds of printing standards, it becomes possible to perform color evaluation based on various kinds of printing standards, and it becomes easier to perform color management for printing under various kinds of printing standard environments, such as color retouching instruction information and instructions to correct an amount of correction of dot gain and an amount of ink for printing, and an integrated color management environment in which printing can be performed with the same colors anywhere in the world is prepared. Further, it becomes possible to perform printing work by a printer or a printing machine under the same color management for all areas in the world.

In order to realize the universal CMYK, an RGB input device or the like, L*a*b* (of a spectrocolorimeter) or an XYZ colorimetric device, and the CCE are used to enable L*a*b*-converted values of printed matter obtained by color chart colorimetry by each individual input device or dedicated colorimetric device to be converted to universal L*a*b* values first. That is, an environment under which universal colorimetry can be performed is prepared, and a specific color chart and an IT8.7/4 chart are printed based on the printing standard of each country and various kinds of printing standards (such as L*a*b* values and dot gain of each CMYK solid part) using the environment. Furthermore, by setting what is obtained by performing universal L*a*b* colorimetry and converted to CMYK values as universal CMYK of the printing standard of each country and the various kinds of printing standards, and distributing the universal CMYK as a standard CMYK common profile existing in each country and industry, the L*a*b* reference values can be utilized as a clear and accurate print profile. Even if mutually different printing standards are used, it becomes possible to, by using the universal CMYK, represent various CMYK blended colors by universal L*a*b* values for comparison and perform color conversion between different CMYK standards by combining a company's own input device and dedicated colorimetric device with the CCS. Therefore, it becomes easy to mutually perform color adjustment. In actual operation, input values obtained by a specific input device are converted to L*a*b* values, and the L*a*b* values are converted to universal L*a*b* values obtained by the above-stated method using a target color table for each color material, light source and medium. Then, the universal L*a*b* values are further converted to a CMYK color space represented by standard L*a*b* values of each country and operated.

As described above, as for conversion to CMYK of various kinds of industry standards, such as JAPANCOLOR, for according to industries, it is possible to obtain printed matter that realizes similar color reproduction under a targeted illumination environment by performing conversion from universal CMYK values. Thereby, it is possible to perform colorimetric value conversion of the reference universal CMYK values to a standard print profile of each country using a conversion LUT.

As described above, by using the universal L*a*b*, the universal RGB and the universal CMYK, for example, a specific color chart is printed by each printing machine in a remote printing factory anywhere in the world and sent to a management center, and the management center converts print data of each printer of each factory using the CCS and transmits the converted print data to be used by the printer of each printing factory. Thus, it is possible to construct a print color management network system providing printed matter with almost no color change irrespective of in which printing factory and by which printing machine printing is performed.

Next, description will be made on a case where the CCS is incorporated into a camera. In the case of using a digital camera, a built-in camera of a smartphone, or a BT.2020-based 4K or 8K video camera having a color gamut wider than the color gamut of RGB as a colorimetric device, if an image is captured, targeting the whole angle of view for which photographing (input) is possible, stable colorimetric values cannot be obtained because of illuminance unevenness of illumination light and change in the incidence angle between the center and peripheral parts. Especially in the case of comparing different pieces of paper or color materials, they may be significantly different at the center and the peripheral parts of an object.

Therefore, there is a problem that, no matter how the position of illumination light is adjusted, white unevenness and unevenness in contrast, gradation and color occurs on the whole surface. Therefore, by attaching a long illumination hood to cause the radiation axis of illumination light to be at 45 degrees so that light spreading around is cut, and the light incidence angle is constant on the surface of a piece of printed matter and a specific color chart, or by limiting the colorimetry range to a range where unevenness does not occur (with an average difference ΔE of 0.3 or smaller), the problem is improved.

As another method, in order to correct the difference between the periphery and the vicinity of the center of a photographing screen, the whole screen is vertically and horizontally divided into a matrix shape (example: divided in 7×7=49), and an ID is attached to a color chip of each divided image. Automatic colorimetry of a small-number-of-specific-colors chart is performed for each area, and, if there is difference in color reproduction, "an input color table" is created for each area. That is, by performing color conversion using a different "input color table" for each divided area, it is enabled to correct color reproduction unevenness of the whole photographing screen. When the number of divided matrix squares is decided, a color chart with a percentage of paper white and color material (overlappedly printed CMYK ink) of 5% to 100% (=solid) incorporated in a range of 30×42 mm, which is arranged on the whole surface of the photographing screen as "an unevenness detection chart", is photographed first, and correction values are decided by detecting the size and distribution of unevenness by performing colorimetry of all the patches. Further, it is possible to, by performing color correction for each divided area after performing the above-described incident angle adjustment of illumination light, suppress input unevenness.

General operation cases in a printing company will be shown below. For example, in a printing office, a proof sheet 1 printed from DTP data for printing is brought to a client for proofing. Color confirmation is performed by the color proofing simulator described above based on the client's opinion, and numerical values of CMYK % or color difference are displayed. The color proofing data is transmitted from the printing office to a printing company head office. In the printing company head office, color correction of DTP data is performed based on colorimetric value data of the image color-proofed by the client, and the data is transmitted to the printing office. In the printing office, a proof sheet 2 is printed from the data which has been color-corrected and transmitted, by a printer by which the proof sheet 1 was printed. Colorimetry of colors of the proof sheet 1 and the proof sheet 2 is performed by a colorimetric device, and colorimetric values are compared to confirm whether the colorimetric values are within color difference specified by the color proofing instruction. Then, a staff member of the printing office brings the printed proof sheet 1 and proof sheet 2 to the client, and color proofing is performed again. This color proofing work is repeated. Then, when OK with corrections or OK with change is given based on the client's opinion, it is communicated to the printing company head office that OK with corrections or OK with change has been given.

In the case of OK with corrections, it is communicated to the head office by mail, and a confirmation/reply mail is given. In the case of OK with change, a print part to be color-retouched, L*a*b* values of the part, and color difference or CMYK values are sent to the head office, or correction value data at the time when color simulation was performed is transmitted to the head office. In the printing company head office, color retouching simulation of the print data is performed depending on cases regardless of whether OK with corrections or OK with change, and final check or color correction of the DTP data is performed. Then, RIP processing for performing conversion to raster data forming halftone dots from the image of the print DTP data or vector data. Next, a printing plate is outputted by a CTP (computer-to-plate) recorder, and the printing plate for CMYK ink or the like is wrapped around a printing machine to perform printing. At this time, trial printing in a printing process is performed. That is, advance printed matter and an OK'd proof are inputted by a scanner or the like, and conversion from the inputted RGB images to RGB colorimetric values is performed. Furthermore, input is performed by the scanner or the like based on L*a*b* values of color patches obtained by performing colorimetry by a spectrophotometer, and L*a*b* values of corresponding color patches are converted with a profile or an LUT to perform difference comparison. If the value of color difference ΔE is within acceptable color difference, printing is performed. In the case of color difference beyond the range, which cannot be color-adjusted by the printing machine, data outside the color difference, which cannot be adjusted, is transmitted to a prepress department or a DTP department to perform color retouching. By setting and confirming a color difference criterion in advance for the printing company's proof and the client's print in advance, it is possible to prevent a problem that color is not appropriate at the time of printing.

Next, description will be made on an embodiment in which the color conversion system (CCS) of the present invention is used, utilizing a wide area network or a LAN. Colorimetry is performed by a scanner or the like in which a small-number-of-specific-colors chart is set, the scanner or the like existing at A point, and the data is transmitted to B point or a colorimetry server. At B point, for example, colorimetry of a large-number-of-specific-colors chart is performed, and a result is stored into or transmitted to the colorimetry server. In a CCS at B point, when all pieces of colorimetric data with the same job name are collected in a colorimetry server, a condition table of an illumination environment, medium, color materials and the like for creation of an input color table or a target color table is selected, and colorimetric values and RGB images are converted to L*a*b* values. At this time, another CCS server may be connected via a network, and a target color table for the purpose of output may be selected, downloaded and used. It is also possible to select a target color table for the purpose of output in another CCS server, transmit an input color table and image data of the printing company to the CCS server, perform (request) color conversion processing, and receive and use the image data which has been processed.

Some other methods for performing colorimetry using the Internet will be described.

Operation Example

1. Colorimetry of a chart existing at A point is performed, and the data is transmitted to B point or a colorimetry server.
2. At B point, for example, colorimetry of a large-number-of-specific-colors chart is performed, and a result is stored or transmitted to the colorimetry server.
3. In a colorimetric unit, when all pieces of colorimetric data with the same job name are collected in the colorimetry server, a colorimetric value table adjusted to conditions for an illumination environment, medium, color material and the like for output is selected, and conversion to L*a*b* values for color difference and output is performed.

Description will be made on a method in which colorimetric data of a specific color chart is transmitted through one-way communication together with print data via a network, being encrypted if necessary, and access communication is performed at each process. RGB colorimetric data of a specific color chart is received via a network, and conversion from universal L*a*b* values to universal RGB or universal CMYK colorimetric values is performed by the method stated before. The colorimetric value data of the specific color chart is transmitted to the next process of another company together with the print data, being encrypted if necessary, via the network through one-way communication or by performing communication by sequentially accessing each process. It is recommended to, in order to perform automatic conversion processing of the colorimetric values through the network, transmit the data, adding tag information specifying a conversion table for automatically converting RGB colorimetric data to CIEXYZ colorimetric values.

[Transmission Side (Client Side)]
<1A> Colorimetric values obtained by performing colorimetry of any of a first colorimetry chart or a third card-type color chart by the transmitter's colorimetric device are transmitted to a printing company.
[Receiving Side (Printing Company Side)]
<1B> For corresponding colors between the colorimetric values of the colorimetry chart transmitted from the transmitter and colorimetric values obtained by the receiver performing colorimetry of any of the first colorimetry chart to the third card-type specific color chart by the receiver's colorimetric device, the corresponding colors are color-converted to specific color values based on the transmitter's or receiver's policy of utilization as specific colors.
[Transmission Side (Client Side)]
<2> An image of the first small-number-of-specific-colors chart or the third card-type specific color chart obtained by a first RGB input device or the like (and first colorimetric values obtained by colorimetry) is transmitted to the printing company.
[Transmission Side (Printing Company Side)]
<3> The first small-number-of-specific-colors chart or the third card-type specific color chart are outputted, and first colorimetric values obtained by performing colorimetry of the outputted chart print with a first colorimetric device and the chart print are transmitted to the printing company.
[Receiving Side (Client Side)]
CIEXYZ values: CIEXYZ values
CIEXYZ values: RGB values
RGB values: RGB values By converting colorimetric values by "a different colorimetric device" to colorimetric values of the other side at a remote place, necessary colorimetric values can be easily obtained from any place.

As another usage example, the CCE can take advantage of complete reversibility of color conversion to set color encryption for an output side. That is, reference RGB is converted with an LUT for encrypted conversion to obtain display colors. By adding a password to encrypted conversion, color encryption can be performed in a method in which decoded color conversion cannot be performed without knowing the password.

Since "a color evaluation result viewer image" and "a color instruction simulation display image" are dedicated data, the images cannot be displayed by general image processing software. Even if image data is sent to a different client by mistake, safety can be ensured because the image data cannot be seen unless a password embedded in the image data corresponds to an ID or a password held by "Simplified Color Communication Tool" or "Color Communication Software" that a registered client or a responsible person of the printing company has.

By transmitting the data as the above-described data with a security lock and separately transmitting a password by a separate email, or by performing transmission through a mechanism to prevent information leakage, using a security system by safe encryption, safety is further increased.

It is assumed that a print color management room is located at A point (example: Tokyo) and printing factories are located at B (example: Saitama), C (example: Kumamoto) and D (example: Paris), and that there are several printing machines and several digital printing machines at each point. Then, for example, a fashion manufacturer in Tokyo expects the printing company to perform printing with the same colors irrespective of which printing factory performs the printing. Since it has been impossible to perform such color adjustment so far, it has been necessary to perform printing at one point and deliver the printed matter to each area in the world. In the case of a large amount of printed matter, printing is performed in a country with low wages, and delivery is performed by sea because profitability is ensured even if distribution cost is taken into account. Since there may cases where delivery has to be in a hurry, both of delivery by sea and delivery by air have been adopted. However, clients who order a large amount of printing are limited.

Furthermore, since, due to development of communication networks, reduction in time and reduction in delivery cost can be realized by utilization of networks and on-site printing, the number of clients who order printing, utilizing a network extremely increases. However, a big problem is that color adjustment for printing is not performed in the current situation.

In the present system, for example, in a printing company having a print color management room at A point and having a plurality of printing machines at each of printing factories at B, C and D, what is obtained by performing printing by the printers of each factory using paper a client wants to use for printing and a large-number-of-specific-colors chart is sent to the print color management room at A point in advance. In the print color management room, a printing machine or a digital printing machine that is most sufficiently maintained are set as a reference printing machine or a reference digital printing machine, and printing of a lot of specific color charts is performed by the printing machine. Then, colorimetry is performed by a dedicated colorimetric device of the print color management room, and a reference target color table by L*a*b* values is created. Then, colorimetry is performed for each of pieces of printed matter of a lot of specific color charts of each printing factory which have been transmitted, with the dedicated colorimetric device of the printing color management room, and a target color table showing colorimetric L*a*b* values for each printing machine is created.

Furthermore, in each printing factory, by setting the reference target color table and an input color table created by a scanner or the like for colorimetry installed in the printing factory and a CCE, for the CCE, it becomes possible to perform accurate colorimetry of printed matter by the scanner or the like for colorimetry installed in the printing factory. In actual operation, in each factory, advance printed matter is inputted by the scanner or the like; sample printed matter and the advance printed matter are compared using a colorimetric value table of the CCE sent from the print color management room; and ink control of a printing machine is performed. Since it is possible to confirm the color difference ΔE and the CMYK % difference on monitor display, it becomes easy for a printing operator to perform color management. If an online interface with the printing machine is used, it is enabled to perform printing under automatic ink control after colorimetry and analysis.

Figure 25:
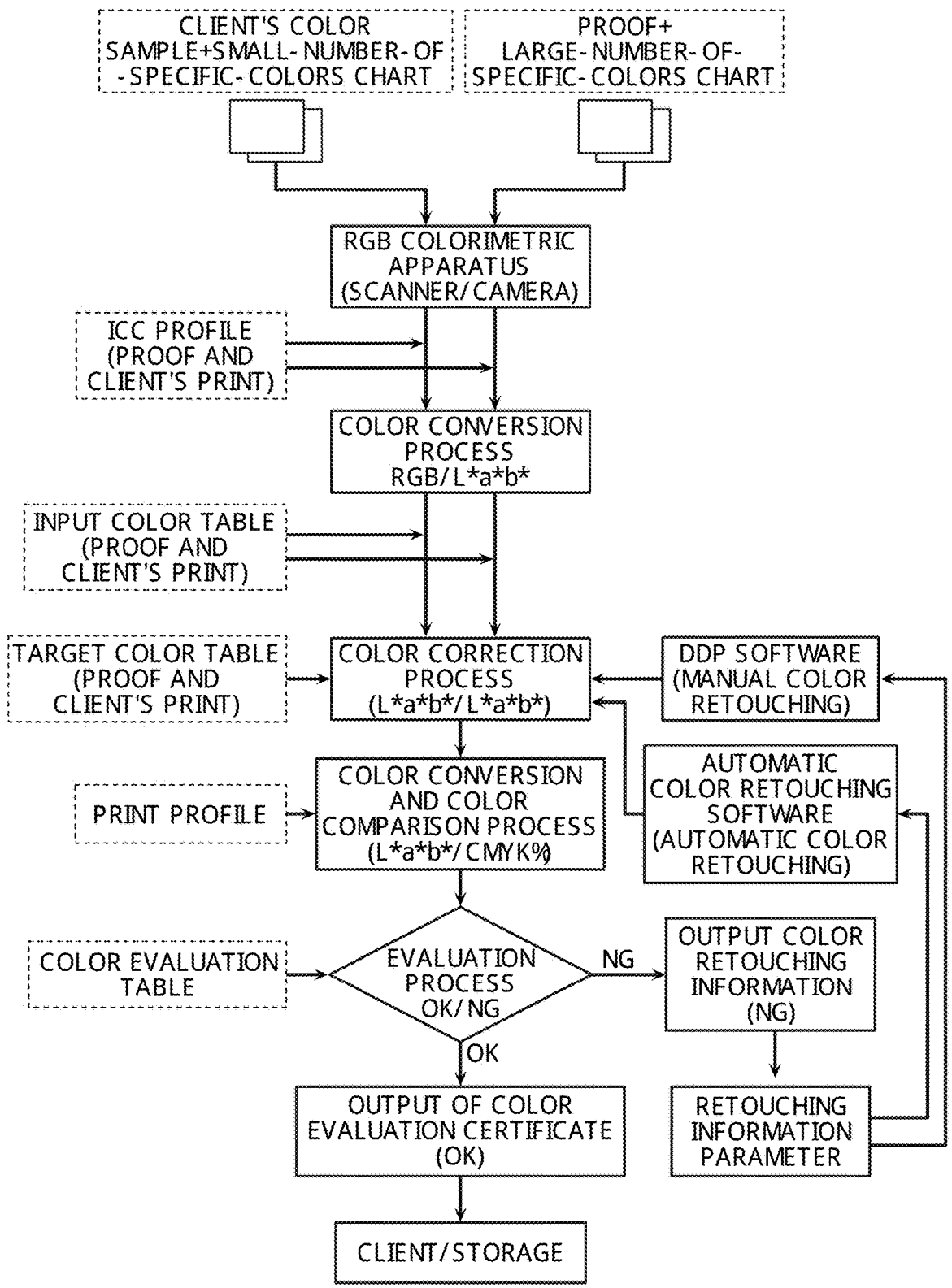
FIG. 25 is a flow diagram showing a color evaluation method according to one embodiment.

Furthermore, FIG. 25 is a flow diagram of, in a color evaluation process, analyzing color difference between the client's color sample and a proof image outputted by the printing company for proofing, using a specific color chart. Based on L*a*b* values and information about difference by CMYK obtained by the process, 1. color correction information is outputted, and retouching information parameters are created by the CCS; and 2. the color correction information and the retouching information parameters are handed over to automatic color retouching software to directly perform color retouching. If partial color retouching is required, then, 3. it is possible to hand over color retouching value information to commercially available DTP software for color retouching to perform color retouching. At this time, by using an RGB image, which is the original image obtained from the client, it is possible to easily perform color conversion of the whole color space such as white balancing, black balancing, gray balancing and color balancing.

Further, by performing conversion of color difference with a profile, it is possible to individually adjust all colors to the color sample in an RGB or CMYK image. In the case of performing such color correction, it becomes possible to, by asking the client to attach not only a print image of the color sample but also "a CMYK specific color chart" print-outputted under the same conditions and performing colorimetry by a dedicated colorimetric device such as a spectrophotometer, perform color retouching, accurately grasping change in color of a printer. Thereby, it is possible to mechanize color retouching which has been performed by skilled technicians so far, and it also becomes possible to eliminate human errors about retouching for taste in color.

As a color evaluation method, specific items of paper white color difference, gray balance, memory colors/logo color, color difference of requested colors, color difference of all colorimetry points, overall evaluation of all colorimetry points, colorimetry evaluation by matrix division of paper surface, and unreproducible color can be evaluated by color difference. Furthermore, difference in gradation reproduction, and balance of overall color reproduction of CMYK ink can be confirmed by comparison of gray balance or dot gain and can be outputted as information for evaluation and image retouching.

Here, description will be made on an actual system configuration and work steps for making it possible to print and reproduce colors of a color sample outputted by the client's printer or the like, by the printing company's printing machine using only a specific color chart.

FIG. 25 is a flow diagram of color adjustment using a large-number-of-specific-colors chart and a small-number-of-specific-colors chart (or card chart) in a case where, instead of a color sample outputted with a client's printer or the like, a specific color chart is outputted by the same printer.

The client performs output using "(small-number-of)-specific-colors chart data" by the orderer's printer, and hands over the print-outputted "input data 1 of the (small-number-of)-specific-colors chart data", "the input data 1 of the (small-number-of)-specific-colors chart data" read by the orderer's scanner or the like, "an RGB scanner input color table" and "image data for printing (individual RGB images)" to a printing company.

The printing company creates, from "the input data 1 of the specific-colors chart" received from the orderer, "a specific color chart colorimetric value table (A)" representing color reproduction of the orderer's scanner or the like with L*a*b* values by "a specific color chart colorimetric value table creation program" using "the input color table by the scanner or the like".

Next, the printing company performs colorimetry of "the specific color chart" print-outputted by the orderer by a spectrophotometer to create "a table of colorimetric values by spectrophotometer or the like" representing color reproduction of the orderer's proof with L*a*b* values by "a program for creating table of colorimetric values by spectrophotometer or the like".

Furthermore, the printing company outputs "the specific color chart data" by the printing company's printer, and reads "the specific color chart data" by the printing company's scanner or the like to create "input data 2 of the specific color chart". The printing company also performs image matching processing of two pieces of data, "the input data 2 of the specific color chart" created by the printing company and "the input data 1 of the (small-number-of)-specific-colors chart data", and RGB values at the same positions are compared for all color patches of the specific color chart.

Next, the RGB values are converted to L*a*b* values, and colorimetry of a color chart of a targeted print medium is performed to create a colorimetric value table representing color reproduction for printing. Colorimetry of colors of different parts is performed with L*a*b* values using the two colorimetric value tables of the data 1 and data 2 described before. The RGB image with RGB-converted values is automatically or manually color-corrected by a gradation correction or color retouching method derived by a color quality management program from among various color retouching functions such as tone-curve (gradation) correction and point color correction (a function of retouching only colors in a specific narrow range).

In the description below, a specific color chart outputted by a printing company's (an undertaker's) proofer represents a color space for which printing is possible, and a specific color chart outputted by a printer of a client who is a print orderer represents a replacement for a picture which is the client's color sample (requested colors). The description is description on a workflow showing a color management method for automating color adjustment for correcting difference between a printable color space and a color sample, displaying, when reproduction is impossible, the degree of the impossibility to the client beforehand, and finding out a point of agreement about a color correction range with the client.

In order to perform colorimetry of a small-number-of-specific-colors chart or a large-number-of-specific-colors chart, the following are required from the printing company:
1. A spectrophotometer and an XY automatic colorimetry robot (or a self-propelled colorimetry system)
2. A color scanner or a camera
3. Matrix division colorimetry/colorimetric value table creation software (dedicated software)
4. Color calibration software for colorimetric device (dedicated software)
5. Color evaluation/color correction software (dedicated software)
6. Color communication software (dedicated software)
7. Print profile creation software
8. A general-purpose PC with an OS such as Windows
9. Others (DTP software, color retouching software, RIP, proofer, CTP, printing machine and the like)
10. A large-number-of-specific-colors chart and a small-number-of-specific-colors chart A device system configuration required from the orderer includes a color scanner or a camera, a general-purpose PC with Windows, a small-number-of-specific-colors chart and the like.

At the time of receiving an order from the client (the print orderer), the printing company (the order receiver) receives the following:
1. A Piece of Printed Matter of a Small-Number-of-Specific-Colors Chart:
A piece of printed matter obtained by outputting second small-number-of-specific-colors chart data (CMYK) the print orderer and the printing company hold in common, by a printer that the client holds
2. DTP Data:
Data obtained by converting a layout for printing that includes characters and images to a file such as a PDF file
3. A Piece of Printed Matter of a Color Sample for Printing (Requested Colors):
A piece of printed matter showing the client's requested colors obtained by outputting DTP data by the client's printer The print orderer print-outputs the small-number-of-specific-colors chart by the printer that the print orderer hold, and the printing company receives RGB image data obtained by inputting the print-outputted small-number-of-specific-colors chart by the scanner or the like that the print orderer holds. The printing company converts the RGB image data to L*a*b* image data with an input profile of the scanner or the like. Next, colorimetry of each of color patches of the specific color chart is performed by "the matrix colorimetry function" of collectively performing colorimetry of all the color patches of the chart is performed to create a third colorimetric value table (FIG. 26) of the print orderer's scanner. This becomes an input color table for the CCE.

By this work, it is possible to convert color reproduction characteristics of the requested colors by the print orderer's scanner or the like in the case of setting the color chart outputted by the print orderer's printer as requested reference colors, to numerical values. Color characteristics of output of the printer held by the print orderer and input image characteristics of the scanner are different according to devices. Therefore, by performing colorimetry of a large-number-of-specific-colors chart in advance by a dedicated colorimetric device (a spectrophotometer, a spectral densitometer, a spectral radiance meter, a CIEXYZ input machine or the like), comparing colorimetric values, selecting an RGB printer and an RGB scanner or the like to be recommended to the client based on a result of colorimetry of the specific color chart performed in advance, and the RGB printer, and the RGB scanner or the like being used, precision of colorimetric values is stabilized.

Figure 26:
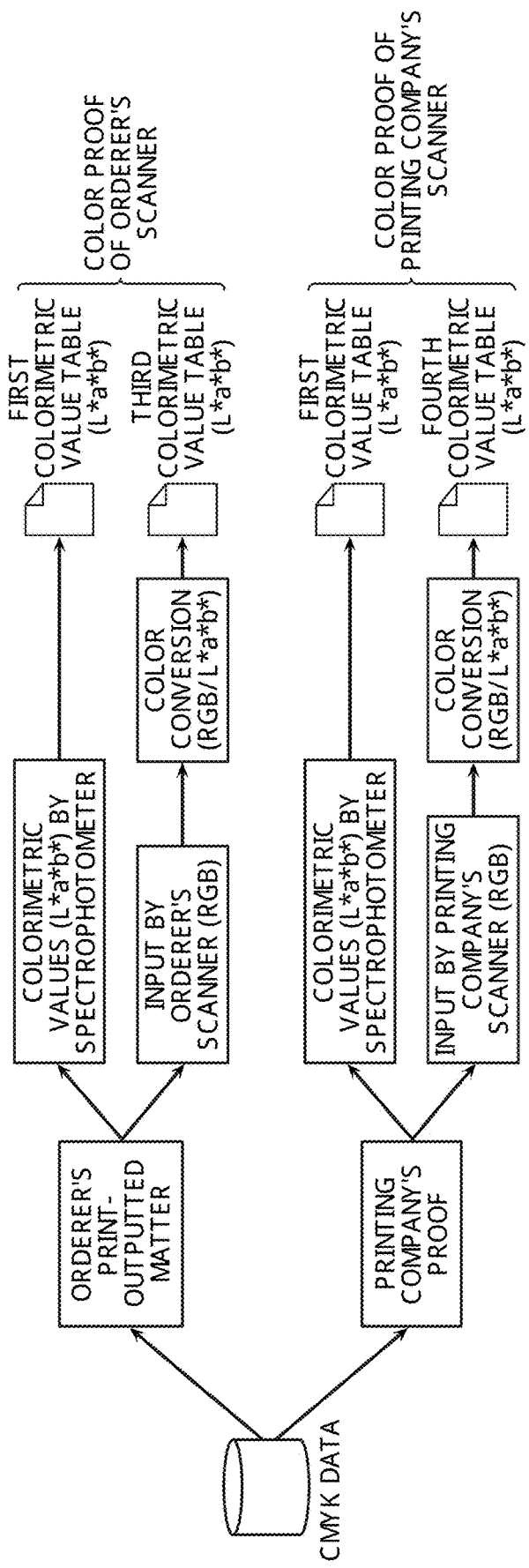
FIG. 26 is a flow diagram for implementing a color management method by requested colors according to the one embodiment.

Similarly, in the printing company, the same data as the small-number-of-specific-colors chart outputted by the print orderer's printer is outputted by the printing company's proofer. Furthermore, RGB image data of the small-number-of-specific-colors chart inputted by the printing company's scanner or the like is converted to L*a*b* image data, using an input profile of the scanner or the like and "a color conversion program (such as ICM2.0)". Next, colorimetry of each of color patches of the specific color chart is performed using "the matrix colorimetry function" of collectively performing colorimetry of all the color patches of the chart to create a fourth colorimetric value table representing a color reproduction area of the printing company's proof (FIG. 26). This also becomes an input color table for the CCE. Thereby, it is possible to convert color reproduction characteristics of the printing company's scanner or the like in the case of setting the color chart outputted by the printing company's proofer as reference colors, to numerical values.

The printing company performs colorimetry of the piece of printed matter of the small-number-of-specific-colors chart outputted by the print orderer's printer, which has been received from the print orderer, and the pieces of proof output matter of the small-number-of-specific-colors chart and a large-number-of-specific-colors chart that the printing company has outputted by the proofer, by a dedicated colorimetric device (a spectrophotometer or a spectral densitometer, a spectral radiance meter, a CIEXYZ input machine or the like) to create first colorimetric value tables (FIG. 26) to be correct L*a*b* for the specific color charts which are the two pieces of outputted matter. The tables are set as target color tables for the specific color charts, respectively. Thereby, it is possible to obtain L*a*b* reference values for each of the color chart outputted by the print orderer's printer and the color chart outputted by the printing company's proofer, and it becomes possible to perform colorimetry of a printed image similarly.

Since it is possible to perform accurate colorimetry even if using an image by a scanner or the like, it becomes possible to create a profile showing requested colors by inputting a colorimetric value table in an IT8.7/4 chart format that can be read by general profile creation software to the general profile creation software and creating an ICC profile for printing. Thus, since colors of a color space of a profile (A) showing the requested colors, which has been created in this way, are reproduced by a color space of a print profile (B) of the printing company, color reproduction in the color space for printing is enabled, for example, by outputting a proof using the two profiles (A) and (B) at the time of RIP processing.

Thereby, at the time of submission of the original for printing to the printing company next time, a piece of printed matter of a small-number-of-specific-colors chart is unnecessary. That is, it is only necessary to hand over only DTP data obtained by converting a layout for printing that includes characters and images to a file such as a PDF file, and a piece of color-sample printed matter showing requested colors, which has been obtained by outputting the DTP data by the client's printer. However, it is necessary that the print orderer's printer, and the scanner or the like always perform constant color reproduction. It is recommended to, if it is difficult, or until the color reproduction become stable, receive a piece of printed matter of a small-number-of-specific-colors chart and an input image of the chart by the scanner or the like each time.

A digital printing machine is capable of performing color reproduction according to a piece of printed matter to some extent if a profile of target printing conditions is selected at the time of creating image data for printing. However, in the case of the digital printing machine, it is not possible to, even if colors of a color sample and a piece of printed matter do not correspond, change the color on the digital printing machine. In the present system, it is possible to directly perform colorimetry of colors of a picture of an RGB image, which is original version data, to perform automatic correction based on color-evaluated and specified colors or OK'd proof and communicate color correction information to an external color retouching program by numerical values. Therefore, it is also possible to return data to a prepress department, which is a pre-process of the digital printing, to manually perform color correction by color retouching software.

In the case of the digital printing machine, a color bar or a control strip is not used for color management, but sufficiently stable color reproduction is possible depending on calibration of the digital printing machine. Therefore, color management of the digital printing machine such as POD (Print on Demand) has to be performed with software for creating print data. Therefore, if a profile created with a color chart of a target medium created by digital printing and profiles of various printing conditions are created, accurate colorimetry becomes possible (by conversion of measurement data). Further, by performing L*a*b* conversion using a profile according to digital printing conditions and then performing color separation with a profile of different printing conditions, correct color conversion data can be created. On the other hand, if color adjustment matching is not sufficient, it is not possible to control color reproduction like a general printing machine, and correction for deepening or lightening color cannot be performed. That is, for all color retouching, it has been necessary to return data to image retouching software on the prepress side to retouch colors of pictures so far.

In a color management function of the CCS, it is possible to perform directly perform colorimetry of colors of a picture of an RGB image, which is original data, to perform automatic correction based on colors or an OK'd proof color-evaluated and specified colorimetric values converted by a dedicated colorimetric device. Further, it is also possible to provide color retouching information to the prepress process by the following method, and it is also possible to thoroughly perform color retouching while confirming a color correction result by a manual operation using the color retouching software. As a color evaluation method, the following color comparison and color evaluation functions are provided. The functions are: color difference of paper white, reproduction of gradation, comparison of gray balance, memory colors, logo color, colorimetry of spots (parts) of important colors of a product or the like, color difference ΔE of each colorimetric position, overall evaluation of all colorimetric points, matrix colorimetry evaluation and the like.

Especially, when color comparison between a piece of printed matter by a conventional printing machine and a piece of printed matter by a digital printing machine is performed, a problem that colors of a product catalog, including colors of a logo and the like, are different easily occurs. Therefore, color check and individual color adjustment of important positions on a printing surface are essential. By feeding back color difference data of the printing surface for color adjustment of the whole printing system, a correct color adjustment method can be derived. Therefore, it becomes possible for printing machines including digital printing machines to switch the picture color management based on visual judgment performed so far from a sensory test to a numerical test.

In "the matrix colorimetry", image matching processing for adjusting sizes and positions of a reference image and a comparison image is performed first. For example, in the case of a printing machine, the whole surface of a picture to be printed is vertically and horizontally divided in a matrix shape by dividing the whole surface into ink zones (the ink zone being the minimum width relative to a paper width of a printing machine for which an amount of ink can be individually controlled, and which refers to the whole picture existing along the width) or more smaller frames to perform colorimetry. An average ΔE in each matrix frame is calculated, and a result of the calculation can be displayed in each matrix frame in each color. It is also possible to, by determining average L*a*b* values in each of the divided matrix frames and performing CMYK conversion with a print profile, determine a difference value of CMYK % by dividing each value by a picture area rate and display the value as the number of ink corrections. A formula for ΔE is shown below.

$$\Delta E^*ab = [(\Delta L^*)^2 + (\Delta a^*)^2 + (\Delta b^*)^2]^{1/2} \qquad \text{[Formula 3]}$$

Calculation of the average ΔE is shown below.

$$\text{Average } \Delta E = \{(\Delta E^*ab)1 + (\Delta E^*ab)2 + (\Delta E^*ab)3 + \ldots (\Delta E^*ab)n\} \div n \qquad \text{[Formula 4]}$$

Furthermore, it is a characteristic that, by performing colorimetry of the whole picture using the matrix colorimetry function, whether a part in an important color has a problem or not can be instantaneously judged by making settings so that, when there is color unevenness on the whole piece of printed matter or there is a position where a specific color is significantly differently printed, matrix frames existing within the range appear to have changed to red on a monitor screen.

By, after performing such analysis for each matrix frame, performing spot colorimetry for a position on an important printed picture, color evaluation and analysis can be performed separately for appropriate parts and abnormal parts. Further, it becomes possible to judge, in a short time, which color correction of which process is necessary, such as whether color adjustment can be performed by correction of the amount of ink or should be performed by correction of a CTP curve, as means for color correction.

By incorporating the CCE of the present embodiment in a part of a structure of a digital camera or a smartphone, the following color management is enabled. First, a small-sized spectrophotometer is built in a camera, and photographing of spectral characteristics of illumination light of a photographing environment for a reference specific color chart under various conditions is performed for colorimetry. By handing a RAW data image obtained by photographing over to the CCS and the CCE for color processing, and setting universal RGB values, a target color table is obtained that has colorimetric values indicating such colors that, when being photographed by the camera according to the various illumination conditions, appear just as the same colors seen by human eyes in the same illumination conditions. Then, by performing photographing under the same environment, a photographed image with universal RGB values is obtained.

Next, when an RGB image of the photographed specific color chart is handed over to the CCE, L*a*b* conversion from the colorimetric values of the color chart registered in advance to a targeted colorimetric value table is performed, and conversion to an input color table is automatically created.

At the same time, the target color table and the input color table created from a combination of illumination light, a colorimetric medium and color materials are paired and stored into a database.

If there is an input color table close to color reproduction of the RGB image of the photographed specific color chart in the database, creation of the input color table is unnecessary. In the case of a camera in which the CCE is built in or which is connected to the CCE, the camera automatically selects an input color table and a target color table from the database immediately. That is, comparison is individually performed for each of all pairs of patches having the same ID, and an average value of color difference is calculated. For example, what has an average color difference of $\Delta E$ 0.3 or less, or minimum is selected. When an object is photographed next, the CCE performs color conversion to be RGB data which should be color-reproduced under the illumination light, using the selected color table, performs conversion to an L*a*b* image or a targeted color space and outputs the image.

Figure 27:
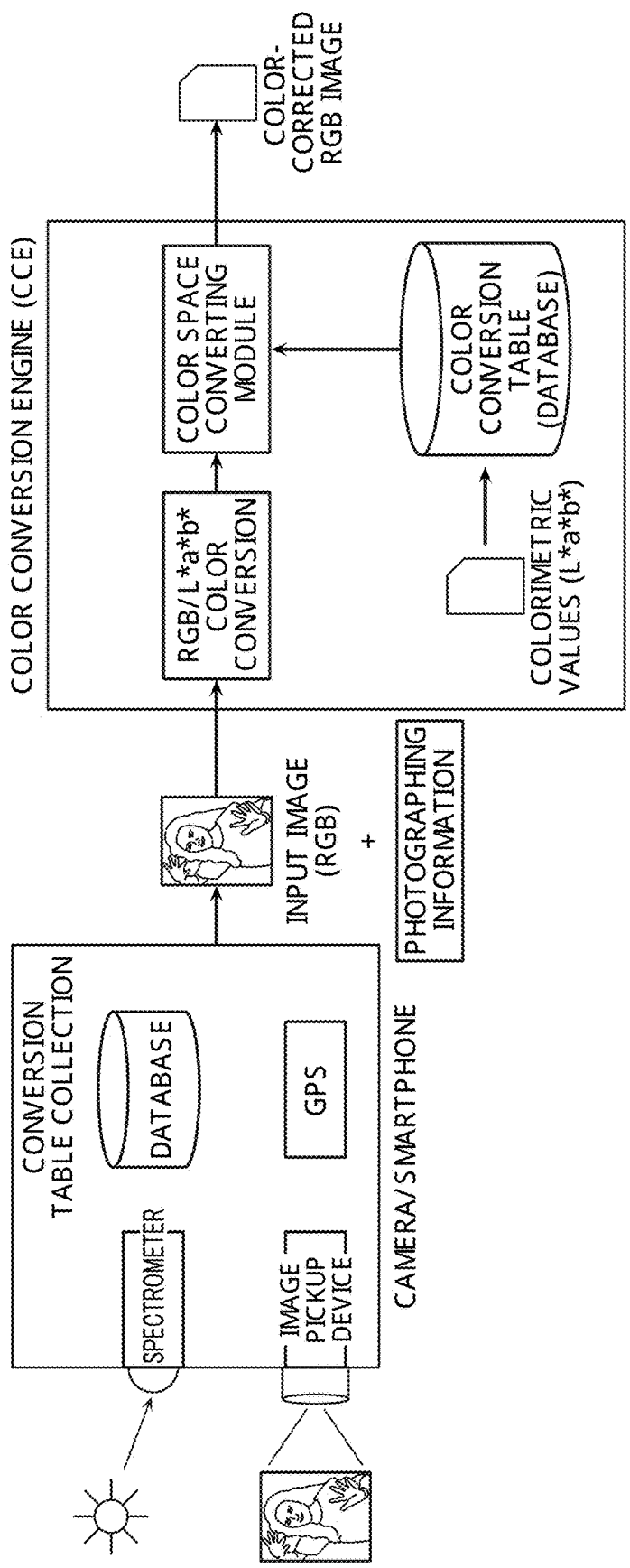
FIG. 27 is a block diagram showing a method for converting a colorimetric value using a camera or a smartphone according to the one embodiment.

FIG. 27 shows the concept of the above description. However, it is not easy for a user to perform color management like a built-in camera of a smartphone, and the user cannot perform high-precision color management. Therefore, basically, various pairs of target color table and input color table are stored in the database of the CCE so that the user uses a simple reference color chart to analyze illumination light in a smartphone.

By holding various color tables representing color reproduction of a reference color chart, including latitude regions, seasons and weathers by GPS, as a database in the CCE, it becomes possible for the smartphone side to, by automatically finding, for an actual target color table and input color table, a targeted actual input color table and target color table from a cloud database or the like connected to the network and performing color conversion, store an RGB image in optimum color that meets the photographing conditions. In this case, it is recommended to, in order to record photographing conditions of the camera to enable correction of change in color reproduction, simultaneously photograph a white color flat plate and a pocket-type color chart.

By applying the CCE to a camera or a smartphone as described above, for example, it becomes possible to confirm how the color of clothes or the like seen in a store looks under sun light outside. Thus, by utilizing the CCE at the time of purchasing a product through the Internet, troubles about color can be reduced.

By mounting the picture colorimetry technique of the present system on smartphones so that the technique can be utilized by more people, anyone can easily see color display on the display of a smartphone with correct colors.

For example, by displaying color difference by numerical values, it becomes possible to photograph a dress, a bag and the like worn or carried currently, store the data, and refer to the colors of the dress, the bag and the like for color coordination with a dress to be purchased or correctly display how the color of a dress or product to be purchased changes according to illumination difference among sun light, an LED, and a fluorescent lamp, on the display of a smartphone. Thereby, it becomes possible to display correct colors on a display though colors have been ambiguously recognized, or color comparison has been performed based on experience and senses so far. Further, by eliminating color troubles and failures at the time of purchasing a product in a store or in online shopping, consumers' lives are improved.

In the case of using a built-in camera of a smartphone or the like, or a digital camera to communicate colors requested by a client to a printing site of a printing company, it is possible for anyone to certainly and easily communicate colors by using a card-type small-sized chart. Colorimetric values obtained by performing colorimetry of a small-sized color chart using a built-in camera of a smartphone or the like, or a digital camera are compared with corresponding colors of a second small-number-of-specific-colors chart or a first large-number-of-specific-colors chart to use the comparison for color adjustment or confirmation of change in colorimetric values over time.

The card-type small-sized color charts must hold reference neutral points (a paper white part) of a medium, gray gradation, and values of R, G, B, C, M and Y or gradations thereof and have the same colorimetric values as color patches which are specific colors existing in the large-number-of-specific-colors chart.

Types of liquid crystal displays used for smartphones are classified in "the IPS type", "the VA type", "the organic EL" and "the quantum dot type". They are different in color development and are quite different in color reproduction. None of them can reproduce correct colors. Color reproduction of a display (a monitor) on which colors of a small-number-of-specific-colors chart are individually generated for each manufacturer's display is recorded in advance at the time of conversion from an L*a*b* image to RGB though this is limited to a limited color reproduction space. Therefore, by performing colorimetry by a colorimetric device for monitor or a camera to create a monitor profile, constant color reproduction can be obtained. The monitor profile can be easily usable by being installed together with a color conversion engine (CCE) dedicated for smartphones.

In order to enable the above, when a smartphone is substituted for a colorimetric device, color matching among various kinds of devices is performed by performing color conversion from RGB to L*a*b*, or from L*a*b* to CMYK or vice versa, using a color conversion engine called CMM (Color Matching Module), such as ColorSync2.0 (2.0 or more) or ICM2.0 or more, and a lookup table (LUT) on which color reproduction characteristics of various kinds of input devices and output devices, or small-sized displays are recorded with a CIELAB color space called an ICC profile. However, this mechanism is not incorporated in the operating system of the smartphone at present.

Therefore, by incorporating the CCS instead of the CMM into a smartphone together with dedicated applications, it is enabled to use a camera and a display mounted on the smartphone as a correct colorimetric device and color display apparatus, and it is also enabled to, even between smartphones from which functions required for color evaluation are different or between remote places, confirm color difference or share colors to be seen.

A method for creating an input profile for a camera of a smartphone and correcting colorimetric values using a specific color chart is basically the same as "the method for converting colorimetric values using a camera or a smartphone" in FIG. 27 described before. However, in the case of performing color correction of a camera of a smartphone that an individual purchased, it is expected that the individual cannot cope with difficult work and a high-level reference color chart. Therefore, a small-number-of-specific-colors chart configured with reference colors of "C, M, Y, R, G, B+black+white", gradation of each color of C, M, Y, R, G, and B, and gray gradation is used; a rough input reference color chart showing a basic color reproduction range of the camera is attached; and the individual is recommended to use software for easily creating a colorimetric value table only by performing photographing by the camera of the smartphone. Meanwhile, using the colorimetric value table of the high-precision color chart and the color conversion engine dedicated for smartphones described above that have been installed together with the software, a colorimetric value table of a rough (small-number-of)-specific-colors chart is converted to a colorimetric value table of the specific color chart created from a large-number-of-specific-colors chart by obtaining new color coordinates subdividing the colorimetric value table of the rough specific color chart by conversion from a reference color chart having a lot of color patches based on color coordinates of colorimetric data of the high-precision color chart described above.

By using the colorimetric value table of the specific color chart having a lot of colorimetric values created in this way and a colorimetric value table by a high-precision spectrophotometer or the like, it is possible to obtain correct color coordinate conversion (colorimetric values) by the CCE. Further, since a spectral characteristics correction table for illumination light to be used can be freely and automatically selected by accessing a database on the network prepared in advance, it is possible to respond to a wide range of illumination environments.

In order to perform color reproduction of an image on a smartphone screen, a tablet PC screen and a monitor screen connected to a PC, a specific color chart of data, an image obtained by photographing the chart or a small-sized card-type specific color chart, specific color charts of one or more pieces of data obtained by photographing the chart, and an image obtained by photographing the chart are displayed on each monitor screen. Then, colorimetric data is acquired from images photographed by a different CIEXYZ input machine, a BT.2020 input machine and an RGB digital camera by each of the methods stated before, and the data is converted to L*a*b* values, and the L*a*b* values are converted to colors of a reference image by the CCE and color-corrected.

In the present color conversion system, conversion to different color reproduction is basically possible from an input image of any color reproduction. Therefore, as application thereof, application to color-blind people will be described next. Non-handicapped people can perceive all colors with all the three colors of red (long wavelength light), green (medium wavelength light) and blue (short wavelength light). Color-blind people are classified into abnormal trichromatism in which one kind among red, green and blue is not normal, abnormal dichromatism in which color is established only by two kinds and monochromatism having one kind. Therefore, a specific color chart is created for colors that color blind people can see. Color blind colors are classified into, for example, "1. can't see it", "2. can see it though blurred", "3. can almost see it" and "4. can see it well". A color blind examinee writes the above numerals on color numbers of specific colors. Based on this, a color blind chart is created for each individual. A chart the colors of which can be seen as well as possible is created. That is, the chart is created by multiplying the color blind colors by color correction densities reversely corresponding to 1. can't see it, 2. can see it though blurred, 3. can almost see it and 4. can see it well. Color correction of printed matter to be printed is performed based on this color blind person profile (showing all colors in a color range recognized by the color blind person). Thereby, it becomes possible to create a book or printed matter that color blind people can recognize characters and images in colors that are difficult for the color blind people to discriminate without a problem.

Application Example

A further application example of the present system will be described below. The application example described below is preferably implemented using the present system similarly to each embodiment and operation examples described above.

(1) Color Adjustment Box Utilizing the Present System

A color adjustment box is installed for each output machine such as one printing machine, or one printer or the like. The color adjustment box has information such as a colorimetric value table required for color management specific to each output machine and performs color adjustment and color management. When performing color adjustment of a plurality of output machines by color adjustment boxes, a reference output machine is set, and a target color management table of a specific color chart outputted by the output machine is created. This target color management table is set as a reference color management table and is used for color adjustment for outputting the same colors as the reference output machine. By performing color conversion processing with a color management colorimetric value table specific to an output machine and the reference color management table, it becomes possible to cause an output machine in which a color adjustment box of another output machine is installed to perform output with the same colors.

Thus, the color adjustment box is an apparatus for easily performing color adjustment of colors of pictures of printed matter or the like printed by another output machine, based on colors of pictures of one piece of printed matter or the like, and is applied when color management is performed in a development department and advertisement department of a general company, an advertising agency, a printing company, a painting company, a dyeing company and the like which require color management.

1. Preliminary Basic Checks (1) Colorimetric values for color chips of a large-number-of-specific-colors chart obtained by performing colorimetry of a reference chart by a dedicated colorimetric device are stored into a storage device of a color adjustment box as a colorimetric value table.

(2) Colorimetric values for color chips obtained by inputting the same large-number-of-specific-colors chart by an RGB input apparatus such as a scanner or a camera are stored into the storage device of the color adjustment box as a colorimetric value table.

(3) The above two colorimetric value tables are compared for each corresponding color to create a colorimetric value table for color correction, and the colorimetric value table for color correction is stored into the storage device of the color adjustment box.

Thereby, color conversion and color management for print color reproduction by a specific output means (a printer or a printing machine) with L*a*b* values obtained by performing colorimetry an image inputted by an RGB input apparatus such as a scanner or a camera by a dedicated colorimetric device are enabled.

Next, a reference output machine for color management is set from among a plurality of output machines. That is, color conversion is performed so that colors outputted from other output machines are the same as colors outputted by the set output machine. In a case where a plurality of printing machines and proofers are provided, by installing a dedicated color adjustment box for each of the apparatuses to control color reproduction among the apparatuses, individual color management is performed by performing data management for color matching among the apparatuses, and a responsible person performing color quality management himself. In actual operation, color conversion and color management are performed at least by connecting the color adjustment boxes to a LAN or a wide area network via a communication apparatus (such as a router) to share a reference color management table.

2. Basic Operations

Based on a colorimetric value table for color correction of a dedicated colorimetric device stored in a color adjustment box, printed matter (a picture) of a printer is inputted by an RGB input device such as a scanner or a camera, and obtained L*a*b* values are color-corrected to L*a*b* values obtained by a reference color management table.

That is, conversion to CMYK values that can be color-reproduced by an output machine to be used is performed for each pixel to create CMYK image data.

3. Steps to Utilize Color Adjustment Box

Figure 28:
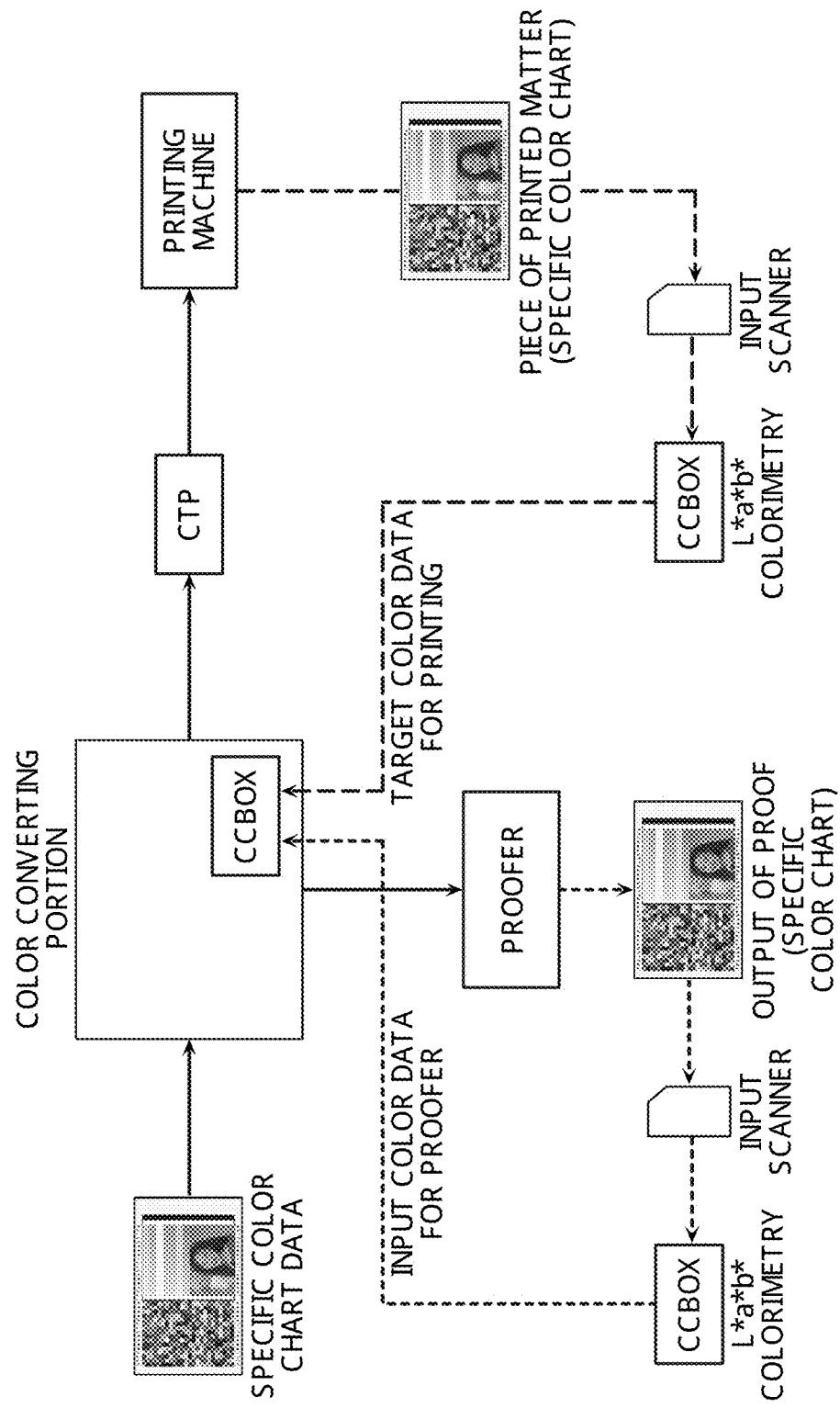
FIG. 28 is a diagram showing a utilization method using a color adjustment box according to the one embodiment.

Steps to utilize a color adjustment box are as follows. First, an example of adjusting colors of a color proofer to colors of printed matter will be described. The utilization steps using the color adjustment box are shown as in FIG. 28.

First, specific color chart data (CMYK data) is printed under reference printing conditions (paper, ink and a printing machine). Similarly, a specific color chart outputted by a proofer is inputted to a color adjustment box by an RGB scanner or the like which has been calibration-adjusted.

Next, colorimetry of image data of the inputted two specific color charts is performed by a colorimetric apparatus, and colorimetric value tables for the two specific color charts are created. Next, when the proof colorimetric value table is set as an input color table, and the colorimetric value table of the printed matter as a target color table in the color adjustment box, an L*a*b* color space for each of the two color tables is generated in the CCE inside the color adjustment box, and color conversion to the target color table from colors of the input color table becomes possible.

Then, when CMYK image data to be outputted as a proof is inputted to the color adjustment box, the CMYK image data is converted to an L*a*b* image inside the color adjustment box, and colors of pixels of the proof (L*a*b* values) are converted to colors (L*a*b* values) of the printed matter. Furthermore, the colors (L*a*b* values) of the pixels of the proof (L*a*b* values) are converted to CMYK % values for reproducing the same colors by printing. When color conversion of all the pixels ends, the L*a*b* values for printing are converted to CMYK data for performing color reproduction on the proof in order to reproduce the colors of the printed matter on the proof.

In the case of only an image, color correction can be performed only with "the color adjustment box". However, by using a RIP mounted with the CCE, color correction can be also performed for high-resolution outline parts of a figure and a logo.

4. Color Preflight Function of Color Adjustment Box

As another function of the color adjustment box, there is provided a function referred to color preflight, which is for confirming whether colors reproduced by a printer A (or a color sample) can be reproduced by a printer B (or a printing machine) in advance. This function is capable of automatically perform colorimetry of 10,000 points on the whole surface of an image with matrix colorimetry which can be used not only for a specific color chart but also for a picture and capable of manually adding colorimetry points. Thereby, for "an average color difference" or color difference of individual colors, "ΔE" or "CIEDE2000" are used, for example, to display colors having a large color difference of ΔE 4.0 or more as a list or display the value of color difference of each color. Furthermore, a color correction table is created to perform correction to correct L*a*b* values by "a color correcting portion for L*a*b* image".

If such a color that color matching by the color preflight function of the color adjustment box is difficult is detected in advance, the color correction method enables such color correction that similar images are obtained when seen by eyes to be performed not only for a proof but also for printed matter by selecting color correction parameters from among various color correction parameters.

As for selection of how correction is to be performed, for example, by making classifications of "L* value is high (light), but color is deep (brilliant)", "L* value is low (dark), but color looks brilliant", "color with the same L* value (brightness) looks brilliant" and the like and, furthermore, setting intensity of correction, color correction can be executed.

When, in a case where a color sample is a piece of printed matter with the color gamut of the CMYK process ink, the color preflight is used for a CMYK image, difference in gradation reproduction from 0% to 100% is displayed for each CMYK by a curve of a graph or displayed by difference in the halftone dot % values as color reproduction of a print image for a proof image. Furthermore, by creating a correction curve and performing gradation correction for the CMYK image, it can be automatically performed to make the CMYK image closer to a targeted print image. Main functions of the color adjustment box are as follows:

(1) To perform correct color adjustment and color conversion by an RGB input machine.

(2) To perform color judgment about whether a color obtained by colorimetry is within a color difference range set in advance.
(3) To perform color space judgment about whether a color obtained by colorimetry can be reproduced by printing.
(4) To perform monitor simulation about what color is obtained by mixing ink targeting a color obtained by colorimetry and display L*a*b* values and CMYK %.

A basic configuration of the system of the color adjustment box is as follows:

A computer, a monitor, the CCE color conversion software (including the color preflight function), specific color charts (for data and printed matter), an input device and various colorimetric color tables, and various profiles.

(2) Function of Shading Correction of the Whole Surface of an Image by a Scanner or a Camera A problem that, when there is only a slight sensitivity difference for each cell of a light receiving sensor of an input device such as a scanner, unevenness occurs in white or black on the whole input surface of an input image, and correct colorimetry cannot be performed is improved. For this purpose, there is provided a function of correcting unevenness, the function performing shading correction of eliminating the unevenness not only for white and black but also gray gradation and a CMYKRGB color solid so that such colorimetric values that not only the density but also the color of the whole surface of image are constant can be obtained.

In the case of an input image by a scanner, a paper sheet the whole surface of which is in the same color (each of white, gray, black, C, M, Y, R, G, B or the like) is scanned by a scanner adjusted by calibration. Furthermore, filtering processing with reciprocals of densities is performed for scanning unevenness of density and color on the whole surface for each color for the purpose of equalization of the input image, and, thereby, the unevenness is removed.

In the case of an input image by a one-shot camera, if the camera is a one-shot camera capable of inputting the whole surface of a picture by performing photographing once, a paper sheet the whole surface is in the same color (white, gray, black, C, M, Y, R, G, B or the like) is photographed with a light source with an incidence angle of 45 degrees and a good color rendering property to eliminate unevenness in density and color on the whole surface. Shading correction of the peripheral part is performed for each pixel, with average L*a*b* values of a central part of each color as reference values.

(3) Hybrid Image Comparison

Halftone dot % values are used for CMYK digital image data, which is an original image for printing. However, since data obtained by converting an analog image such as a piece of printed matter, by inputting with a scanner is an RGB image, color comparison between both images cannot be easily performed. To enable image comparison between digital image data and an analog image inputted by a scanner or the like will be called "hybrid image comparison". In order to perform "the hybrid image comparison", color image data of 8-bit image with 50 dpi to 300 dpi obtained by performing RIP processing of DTP data for printing and an image with the same resolution obtained by inputting a proof print outputted by a specific printing machine or printer, by a scanner or a camera are compared. At this time, the scanned image or piece of printed matter of the proof print is influenced by the density of white and dot gain of the medium, and the 8-bit image obtained by performing RIP processing is not influenced by the medium. Therefore, it becomes possible to compare the images by matching color reproduction on the color spaces by applying the profile of the medium.

(4) CMYK Density Conversion

In an offset printing machine, there is a region in which a print surface referred to as an ink zone is divided in a dozen or so columns to perform color control of the whole print surface. Colorimetry of a picture of each of the ink zones, and a density value of each CMYK color ink is calculated from L*a*b* colorimetric values for each ink zone to perform printing ink adjustment. That is, in the present system, a print picture is divided according to the width of the ink zone from the central part of a print surface of a printing machine, and an L*a*b* value, which is a colorimetric value of each pixel of the print picture, is converted to CMYK halftone dot % by an ICC profile. Then, aggregation for each ink zone is performed to calculate an average halftone dot density % value, and printing is performed. By this work, it also becomes possible to predict the solid density of each ink.

However, even if a color with a density of 100% or more exists on calculation, a value of 100% or more cannot be obtained by color conversion by an ICC profile. Therefore, there is a problem that a density value in the case of being printed with a density higher than a reference density is converted to a relatively low density value. Therefore, in the present system, there is provided a conversion process for performing printing with densities set for CMYK inks (example: C=1.5, M=1.4, Y=1.3 and K=1.9), calculating difference between obtained L*a*b* values of each pixel and L*a*b* values of each pixel obtained by performing profile conversion of CMYK data of a digital image, and, in the case of L*a*b* larger than reference values, performing correction so that CMYK values become values of 100% or more. Thereby, it is possible to increase the precision of conversion from a CMYK % value to a density value of each CMYK solid part. In the case of predicting the density of a solid part (a 100% part) from colorimetric values of a picture, it is further possible to, by converting only a picture part of a piece of printed matter except for a paper white part where ink is not applied, to CMYK % for each pixel and performing aggregation, eliminate an error at the time of performing calculation processing using a table for converting halftone dot % to a density value.

(5) Judgment of Acceptance of Color Evaluation of Reference Color and Comparison Color In conventional printing, color management has been performed using a chart such as a color bar intended to obtain stable color reproduction in a printing machine. Since high-precision colorimetry of a picture surface can be performed even if a general-purpose input device is used, in the present system, it is easily enabled to realize color evaluation and color management by pictures which has been originally required, and generally spread color evaluation by numerical values close to visual inspection.

Furthermore, by digitizing and visualizing color evaluation by visual inspection, judgment of acceptance of colors of a piece of printed matter is realized. As for the acceptance judgment, numerical levels for acceptance and rejection are set with numerical values that are convincing to a print orderer, a salesman in charge of printing, and a printing operator. At the same time, judgment methods by color materials such as various paper sheets, color temperatures according to light sources, and the like are prepared, and such a method is selected that difference does not occur in judgment criteria no matter who performs color judgment work. Judgment methods may be combined.

First, an image obtained by inputting the same picture printed on a medium, color patches or a piece of printed matter or the like (including dyed matter, painted matter and a monitor image) to be a color sample as a digital image, and the same image for performing color judgment are inputted, and the two images are overlapped at a pixel level. Next, from the two images, difference between colors of compared parts is obtained as L*a*b* values and color difference. An allowable range of color difference and an evaluation light source set based on agreement with a client in advance are set based on the values, and color evaluation is performed. If the values are below reference values as a result of performing acceptance judgment under the conditions, "accepted" is displayed; or, "◎ or ○" or numerical ranks such as "A/AA/AAA" is displayed according to an average color difference of all comparison positions. If the values are beyond the reference values, "rejected" is displayed, or, according to the average color difference of all the comparison positions, "Δ or x", or "B, C or D" or the like is displayed so that judgment that is easily understandable to anyone is performed. If there is a color that cannot be reproduced by printing, color difference may be displayed by a numerical value and in a warning color so that a person can perform re-judgment.

(6) Apparatus for Performing Color Evaluation and Character/Stain Inspection at Once In quality management of printing, color managing is performed by attaching a color strip chart for performing printing in a manner that a constant ink density is obtained, which is called a color bar, to one end of a periphery of a piece of printed matter. It is also necessary to perform "an inspection of character loss, stain and the like" at the same time (the color bar is a color chart on which various color patches, each of which is formed by a solid of each CMYK ink, are arranged in line, and is used for color management of a printing machine. It is also referred to as a control strip.)

In order to perform the two inspections, a camera or the like is mounted on a printing machine, and an inline system for performing quality management during printing using an image obtained by photographing an image or a color bar is implemented. However, it is not possible to perform color management of pictures. In many cases, color management of pictures is performed by visual inspection. Even though automatization of a printing machine has progressed, final confirmation of color management is performed by human eyes, and it is a problem that color judgment criteria differ according to persons. The present system is based on the image matching technique and colorimetry/color evaluation/color judgment technique. Since an input image is captured to perform color evaluation, an image inspection based on color difference can be performed by the same colorimetry/color evaluation/color judgment technique. That is, since "color evaluation" and "density inspection for character loss, stain and the like" can be simultaneously performed by the color management technique of the present system, the first two different inspections based on the color management technique can be performed. It becomes possible to realize a high-precision quality inspection without increasing the burden on a printing operator almost at all.

Figure 29:
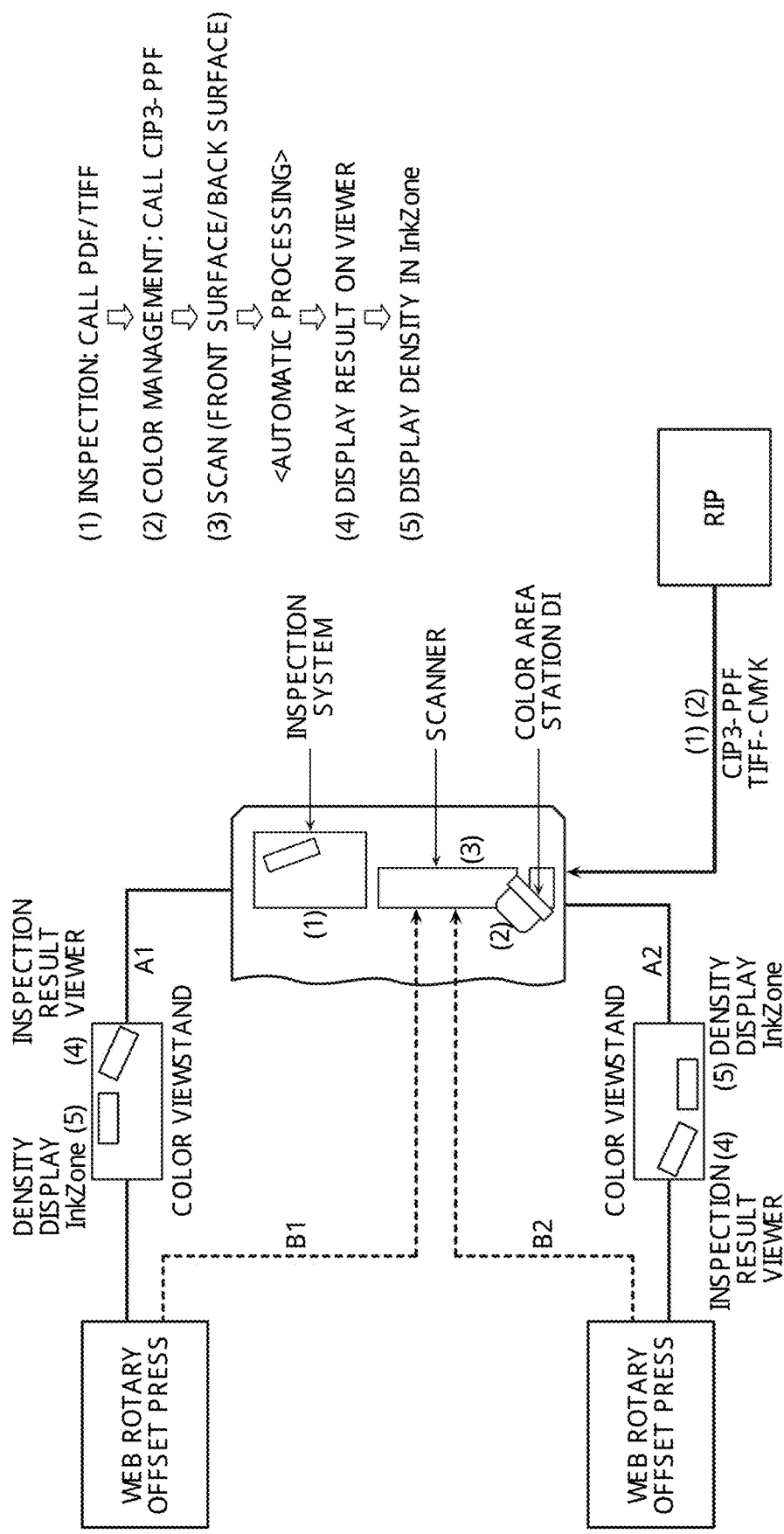
FIG. 29 is an operation flow diagram showing a method for performing color evaluation and character/stain inspection at once according to the one embodiment.

"An operation flow diagram for performing color evaluation and character/stain inspection at once" shown in FIG. 29 shows a flow of an inspection and color management being automatically performed.

(1) Pieces of printed matter (B1 and B2) inputted by a scanner are processed by a dedicated inspection system for performing a print inspection. The images inputted to an input folder of the inspection system are automatically transferred to an input folder of a color management system. By sharing and using the same images, the following become possible:

(2) A comparison inspection with a PDF or TIFF reference image called to the inspection system (3) The two processes including color comparison with a CIP3-PPF image called to the color management system are simultaneously and efficiently advanced in cooperation. Furthermore, a result of comparison inspection with the reference image is displayed.

(4) The CMYK ink density for each ink zone of a viewer and a printing machine is displayed.

(5) By installing a monitor at a control device (a color viewstand) of the printing machine, transmission to control devices of two printing machines is performed, and comparison/confirmation with the pieces of printed matter and control of the printing machines can be performed at one place.

(7) Remote Medical Diagnosis Apparatus

A remote medical diagnosis apparatus refers to a sensor-equipped communication/photographing box apparatus for photographing a face and skin color by a video camera from a remote place, and a doctor making a diagnosis based on information about a pulse and an electrocardiogram. Remote medical diagnosis apparatuses are installed in a medical institution and a remote village without a doctor, or in a medical institution and a mobile vehicle body, such as a car or a train, the medical institution and the remote village, or the medical institution and the mobile vehicle body being mutually connected via wired or wireless communication means so that a doctor makes a diagnosis from a remote place. Basic components of the remote medical diagnosis apparatus are: an illumination device for making an accurate color judgment based on the basic techniques of the present system, a digital camera or RGB digital video camera with a 4K or 8K color gamut, a microphone, a speaker (or an earphone), medical devices, communication equipment, and devices for causing the data of the devices to be stored and communicated. A remote medical diagnosis is made based on accurate color information about the face and body of a patient.

(8) Management of Painting Unevenness and Painting by Robot for Car Painting and Home Appliances In painting work by a painting robot, input of an image of a painting surface and creation of a shadowless state of illumination are performed, and color judgment of painting and color unevenness is performed under an equalized illumination environment, directly by the painting robot or by a separately installed painting unevenness/painting color inspection apparatus based on the basic techniques of colorimetry, color evaluation and color judgment of the present system. If there is color difference, correction data for the color difference is transmitted to the painting robot. If the color difference is below an allowable value set in advance, an acceptance judgment is made. Furthermore, it is recommended to prepare an illumination condition of an angle at which color unevenness or scratches can be easily found so that evaluation is performed under the illumination condition. Furthermore, a color temperature of an actual operation environment of outside, morning, afternoon, evening or the like is converted by an illumination apparatus to create illumination close to a natural environment so that judgment under the environment can be performed.

The robot is used for fields requiring accurate color recognition other than painting.

For example, by inputting (photographing) a target video or a target image, for example, by a 4K single-lens camera in the case of a plane, and by a 4K twin-lens camera in the case of a solid, and performing conversion to L*a*b* values, which are absolute values, by the color conversion technique of the present system, accurate color judgment can be performed. Since the L*a*b* values are the world's reference values, color evaluation is used for fields requiring color evaluation as accurate "eyes" of the robot.

(9) High-Precision Partial Picture Surface Colorimetric Apparatus Using Range of Central Part of Angle of View of Camera In order to perform colorimetry of the whole surface of the angle of view with accurate values using a camera, it becomes necessary to perform not only "correct lighting (how to apply illumination light)" and "shading correction of white, black and gray gradation" but also such high-level and troublesome correction that color shift of a color space configured by each color of R, G, B, C, M and Y in addition to white, black and gray gradations is corrected for the whole screen in pixel units.

Therefore, by using only an image of a high-precision stable range at the central part of the angle of view of the camera, and performing conversion of colorimetry-target matter to an L*a*b* image and conversion to a color space configured with L*a*b* values obtained by performing colorimetry by a reference colorimetric device, with a specific color chart and the CCS within the range without density/color unevenness almost at all, shading correction is simplified, and, moreover, color comparison between a reference image and a comparison image can be easily performed.

In the case of performing color correction of a camera, a database of colorimetric value tables by various input devices, such as a web server, is installed in advance first, and a colorimetric value table obtained by converting a large-number-of-specific-colors chart photographed by the same camera in advance from RGB to L*a*b*, and a colorimetric value table obtained by performing L*a*b* colorimetry of the same large-number-of-specific-colors chart by a reference colorimetric device are downloaded. Next, by photographing a small-number-of-specific-colors chart including the same colors as the large-number-of-specific-colors chart, and performing mapping processing for allocating a color space of the large-number-of-specific-colors chart to the small-number-of-specific-colors chart, a large-number-of-specific-colors chart adjusted to reproduction characteristics of the camera to be used is created. By setting these charts for the CCS, accurate colorimetry becomes possible.

In the case of actually performing colorimetry of a picture, a reference color sample or proof is set on a flat table first. Then, while an illumination source and a video image of a handy camera or a smartphone being seen, the illumination source, and the handy camera or the smartphone being fixed to a camera stand such as a tripod, the camera stand is moved so that a frame indicating "a range within which colorimetry is possible" displayed at the center of the display of the camera is located at a part of the picture targeted by colorimetry. Next, a smaller frame indicating "a colorimetry point" displayed at the center of the frame is accurately moved, and photographing is performed. Some positions to be targeted by colorimetry are photographed in this way. The size of the colorimetry point can be freely set by specifying the number of pixels along the XY axes of a camera image.

Next, a piece of printed matter or the like to be compared is set, for example, on a board placed on the same table, and photographing is performed by causing the piece of printed matter or the like to move on the board so that "the colorimetry point" of a picture is included in the frame indicating "the range within which colorimetry is possible" displayed at the center of the display of the camera similarly. In order to suppress the amount of data, a range within which an image shape can be recognized may be set by a frame so that an unnecessary peripheral part of the photographed image may be automatically cut.

Horizontal and vertical displacement and inclination of a photographing range relative to the reference image generated at the time of photographing an image of the piece of printed matter or the like to be compared, or image distortion due to unevenness of the original are automatically corrected by the image matching processing software, and comparison results of colorimetric values, color difference and the like is displayed.

The colorimetry system described above enables downsizing and lower pricing of high-precision color comparison of a picture, making use of the picture surface colorimetry technique and, in the future, generally provides the concept of "a ruler of color".

The camera for performing colorimetry of the central part of the lens is not limited to a 4K or 8K camera but may be a general-purpose digital camera, a video camera or a camera attached to a smartphone. It is recommended to perform photographing by attaching a tripod or four legs, and an LED light to the camera.

As described above, it is understood that the present system can be used not only for color adjustment of printed matter but also for various useful purposes.

The invention claimed is:

1. A color conversion system comprising:
a colorimetric input machine having a first color gamut, inputting an image of an object, and performing colorimetry of the object to output a first colorimetric value;
an input portion to which the first colorimetric value is inputted;
a converting portion converting the first colorimetric value to a second colorimetric value; and
an output portion outputting the second colorimetric value; wherein
the converting portion stores:
a first colorimetric value table having color information about each measurement light source to be used at the time of performing colorimetry by the colorimetric input machine; and
a second colorimetric value table having color information about each measurement light source to be used at the time of performing colorimetry by a reference dedicated colorimetric device having a second color gamut; and
the converting portion converts the first colorimetric value to the second colorimetric value by causing colorimetric values of the first colorimetric value table to correspond to colorimetric values of the second colorimetric value table, and wherein
the colorimetric input machine inputs a reference image and a comparative image to be compared with the reference image, and
the converting portion converts a first colorimetric value of the reference image to a second colorimetric value of the reference image and a first colorimetric value of the comparative image to a second colorimetric value of the comparative image.

2. The color conversion system according to claim 1, comprising the dedicated colorimetric device, wherein the second color gamut is a device-independent color gamut.

3. The color conversion system according to claim 1, wherein
the first colorimetric value table has a first color chart having color patches of the first color gamut; and
the second colorimetric value table has a second color chart having the second color gamut that includes an equal number of or more colors than colors included in the color patches of the first color gamut.

4. The color conversion system according to claim 3, wherein the first or second color chart includes a gradation chart in which color continuously changes.

5. The color conversion system according to claim 3, wherein the first color chart or the second color chart includes a spot color chart.

6. The color conversion system according to claim 5, wherein the spot color chart is configured with a mount and a plurality of spot color chips pasted on the mount.

7. The color conversion system according to claim 3, wherein the colors existing in the second color gamut include the colors existing in the first color gamut.

8. The color conversion system according to claim 1, wherein the first colorimetric value table and the second colorimetric value table further have color information about each of media, glossinesses of the media, color materials, spectral values of measurement light sources or color temperatures of measurement light sources at the time of performing colorimetry by the colorimetric input machine and the dedicated colorimetric device.

9. The color conversion system according to claim 1, comprising
the converting portion having a third colorimetric value table having specific color information that is neither in the first colorimetric value table nor in the second colorimetric value table; wherein
the first colorimetric value is converted to the second colorimetric value by referring to the third colorimetric value table.

10. The color conversion system according to claim 1, wherein the colorimetric input machine is an RGB input machine.

11. The color conversion system according to claim 2, wherein the dedicated colorimetric device is a spectrophotometer, a spectral densitometer, an integrating sphere spectrophotometer or a CIEXYZ input machine.

12. The color conversion system according to claim 1, wherein
by a colorimetric input machine on a comparison side, the first colorimetric value of the comparison side obtained by performing colorimetry of a color chart is converted to the second colorimetric value of the comparison side;
on a reference side, the first colorimetric value of the reference side obtained by performing colorimetry of the color chart using a colorimetric input machine different from the colorimetric input machine of the comparison side is converted to the second colorimetric value of the reference side;
the second colorimetric value of the comparison side and the second colorimetric value of the reference side are compared to take difference; and
the dedicated colorimetric device of the reference side is adjusted so that the second colorimetric value of the reference side becomes substantially the same value as the second colorimetric value of the comparison side.

13. The color conversion system according to claim 1, wherein
a plurality of the dedicated colorimetric devices have a plurality of the second colorimetric value tables that are obtained by performing colorimetry under the same colorimetric conditions; and
by performing statistical processing of a plurality of the second colorimetric values that are calculated for each of the plurality of second colorimetric value tables, the plurality of second colorimetric values are converted to fourth colorimetric values that are $L*a*b*$ values.

14. The color conversion system according to claim 13, wherein the fourth colorimetric values are further converted to fifth colorimetric values that are RGB values.

15. The color conversion system according to claim 13, wherein
a predetermined CMYK conversion profile is caused to be registered with the colorimetric value tables; and
the fourth colorimetric values are converted to sixth colorimetric values indicated by CMYK halftone dot % values according to the CMYK conversion profile.

16. The color conversion system according to claim 1, wherein
the input portion and the converting portion are provided in the colorimetric input machine;
the colorimetric input machine comprises an image capturing portion capturing an image and inputting the image to the input portion; and
the first colorimetric value becomes a value obtained by further performing RGB conversion of what is obtained by color-converting the second colorimetric value to a reference value obtained by statistical processing using various kinds of dedicated colorimetric devices in compliance with ISO, based on a predetermined color temperature.

17. The color conversion system according to claim 16, wherein the first colorimetric value is a colorimetric value by 8K of ITU-R Recommendation BT.2020 standard, having a color space larger than a device-dependent RGB color space.

18. The color conversion system according to claim 1, comprising a first sever storing a plurality of the first colorimetric value tables transmitted from a plurality of the colorimetric input machines, the color conversion system being configured to be capable of performing transmission/reception of data with the first server via a network.

19. The color conversion system according to claim 1, comprising a second sever storing a plurality of the second colorimetric value tables transmitted from a plurality of the dedicated colorimetric devices, the color conversion system being configured to be capable of performing transmission/reception of data with the second server via a network.

20. The color conversion system according to claim 1, further comprising
a RIP apparatus performing image conversion from vector data to raster data based on the second colorimetric value, wherein
at the time of performing the image conversion, the RIP apparatus refers to the second colorimetric value table to perform color correction simultaneously when creating the raster data or at the time of generating a PDF image.

21. The color conversion system according to claim 1, further comprising a RIP apparatus connected to the output portion, the RIP apparatus performing image conversion from vector data to raster data based on the second colorimetric value, wherein
the RIP apparatus outputs the converted raster data to the converting portion via the output portion and causes the converting portion to refer to the second colorimetric value table to perform color correction again.

22. The color conversion system according to claim 1, further comprising an inspecting portion inspecting the object, wherein
the inspecting portion inspects an abnormality of the object and outputs a result of the inspection.

23. A color conversion apparatus for converting a first colorimetric value of a first color space by a colorimetric input machine to a second colorimetric value of a second color space by a reference dedicated colorimetric device, the first colorimetric value being outputted at the time of inputting an image of an object and performing colorimetry of the object by the colorimetric input machine, the second colorimetric value being outputted from the dedicated colorimetric device, the color conversion apparatus comprising:
an input portion to which the first colorimetric value is inputted;
an output portion outputting the second colorimetric value;
a converting portion converting the first colorimetric value to the second colorimetric value; wherein
the converting portion creates:
a first colorimetric value table having color information about each measurement light source to be used at the time of performing colorimetry by the colorimetric input machine,
a second colorimetric value table having color information about each measurement light source to be used at the time of performing colorimetry by the dedicated colorimetric device, and
the converting portion stores the first colorimetric value table and the second colorimetric value table, and converts the first colorimetric value to the second colorimetric value by causing color values of the first colorimetric value table to correspond to color values of the second colorimetric value table, and wherein
when the colorimetric input machine inputs a reference image and a comparative image to be compared with the reference image, the converting portion converts a first colorimetric value of the reference image to a second colorimetric value of the reference image and a first colorimetric value of the comparative image to a second colorimetric value of the comparative image.

24. A color conversion method for converting a first colorimetric value of a first color space by a colorimetric input machine to a second colorimetric value of a second color space by a reference dedicated colorimetric device, the first colorimetric value being outputted at the time of inputting an image of an object and performing colorimetry of the object by the colorimetric input machine, the second colorimetric value being outputted from the dedicated colorimetric device, wherein the color conversion method converts the first colorimetric value to the second colorimetric value by:
creating a first colorimetric value table having color information about each measurement light source to be used at the time of performing colorimetry by the colorimetric input machine;
creating a second colorimetric value table having color information about each measurement light source to be used at the time of performing colorimetry by the dedicated colorimetric device;
storing the first colorimetric value table and the second colorimetric value table and converting the first colorimetric value to the second colorimetric value by causing color values of the first colorimetric value table to correspond to color values of the second colorimetric value table; and
when the colorimetric input machine inputs a reference image and a comparative image to be compared with the reference image, converting a first colorimetric value of the reference image to a second colorimetric value of the reference image and a first colorimetric value of the comparative image to a second colorimetric value of the comparative image.

25. The color conversion method according to claim 24, wherein
at least a third colorimetric value table outputting the second colorimetric value is further created.

* * * * *